Figure 1:
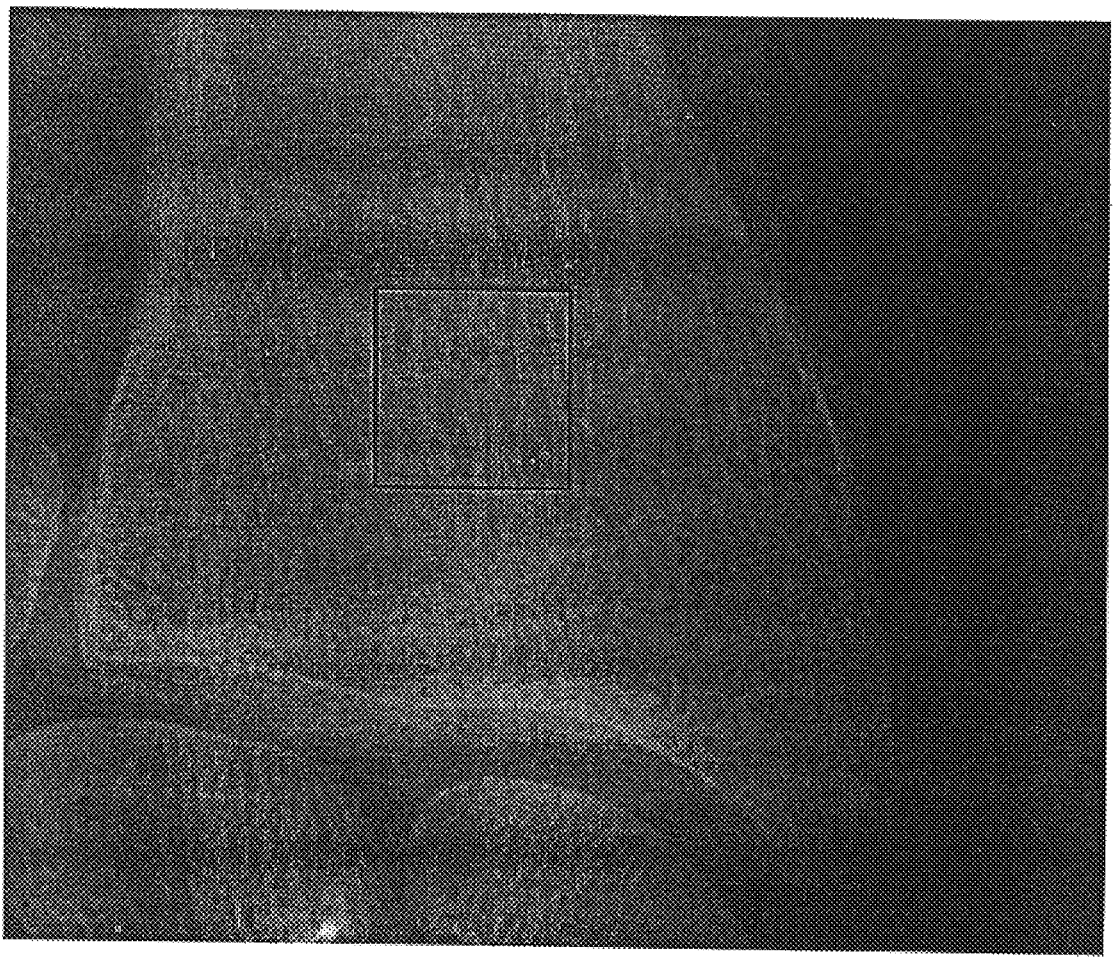

United States Patent [19]

Grunkin et al.

[11] Patent Number: 5,915,036
[45] Date of Patent: Jun. 22, 1999

[54] METHOD OF ESTIMATION

[75] Inventors: Michael Grunkin, Copenhagen; Knud Erik Fredfeldt, Jyllinge; Lars Hyldstrup, Charlottenlund; Knut Conradsen, Birkerød, all of Denmark

[73] Assignee: Eskofot A/S, Ballerup, Denmark

[21] Appl. No.: 08/591,617

[22] PCT Filed: Aug. 21, 1995

[86] PCT No.: PCT/DK95/00338

§ 371 Date: Jan. 11, 1996

§ 102(e) Date: Jan. 11, 1996

[30] Foreign Application Priority Data

Aug. 29, 1994 [DK] Denmark .................................. 0996/94
May 19, 1995 [DK] Denmark .................................. 0578/95

[51] Int. Cl.⁶ ............................................. G06K 9/52
[52] U.S. Cl. .......................... 382/132; 382/280; 382/286
[58] Field of Search ................................... 382/128, 132, 382/275, 276, 279, 280, 281, 286, 263, 264; 378/54; G06K 9/52

[56] References Cited

U.S. PATENT DOCUMENTS

| | | | |
|---|---|---|---|
| 4,616,318 | 10/1986 | Crawford | 370/54 |
| 4,721,112 | 1/1988 | Hirano et al. | 378/54 |
| 4,771,467 | 9/1988 | Catros et al. | 382/130 |
| 4,811,373 | 3/1989 | Stein | 378/54 |
| 4,851,984 | 7/1989 | Doi et al. | 382/132 |
| 4,903,203 | 2/1990 | Yamaghita et al. | 382/132 |
| 4,916,615 | 4/1990 | Chittineni | 364/421 |
| 4,922,915 | 5/1990 | Arnold et al. | 382/128 |
| 4,941,474 | 7/1990 | Pratt, Jr. | 128/660.01 |
| 5,010,504 | 4/1991 | Lee et al. | 387/275 |
| 5,072,430 | 12/1991 | Eckernas et al. | 368/10 |
| 5,170,651 | 12/1992 | Wehrli | 70/493 |
| 5,172,695 | 12/1992 | Cann et al. | 372/54 |
| 5,187,731 | 2/1993 | Shimura | 378/257 |
| 5,247,560 | 9/1993 | Hosokawa et al. | 378/54 |
| 5,247,934 | 9/1993 | Wehrli et al. | 128/653.2 |
| 5,291,537 | 3/1994 | Mazess | 378/54 |
| 5,335,260 | 8/1994 | Arnold | 378/56 |
| 5,582,323 | 12/1996 | Kurtenbach | 221/2 |

FOREIGN PATENT DOCUMENTS

| | | |
|---|---|---|
| 0 204 844 | 12/1986 | European Pat. Off. . |
| 0 228 785 | 7/1987 | European Pat. Off. . |
| 0 574 183 | 12/1993 | European Pat. Off. . |
| 90/10859 | 9/1990 | WIPO . |
| 91/09495 | 6/1991 | WIPO . |
| 92/02808 | 2/1992 | WIPO . |

OTHER PUBLICATIONS

"Fundamentals of Digital Image Processing," Anil K. Jain, University of California, Davis.
"Digital Image Processing," William K. Pratt, University of Southern California.
"Image Processing, Analysis and Machine Vision," Milan Sonka et al.
"Two–Dimensional Signal and Image Processing," Jae S. Lim, Massachusetts Institute of Technology.
"Fractal Geometry and Vertebral Compression Fractures," Journal of Bone and Mineral Research, vol. 9, No. 11, pp. 1797–1802, 1994.
"The Use of Fractal Analysis to Reveal Remodelling in Human Alveolar Bone Following the Placement of Dental Implants," Archives of oral Biol., vol. 40, No. 1, pp. 61–72, 1995.

(List continued on next page.)

*Primary Examiner*—Kim Yen Vu

[57] ABSTRACT

A method is described for estimating the bone quality of a vertebrate on the basis of two-dimensional image data comprising information relating to the trabecular structure of at least part of a bone of the vertebrate, the image data being data obtained by exposing at least the part of the bone to electromagnetic radiation, the method comprising subjecting the image data to a statistical analysis comprising deriving features from a parametric estimate of a power spectrum and/or deriving features from a transform similar to a distance transform—but in a number of directions.

41 Claims, 28 Drawing Sheets

OTHER PUBLICATIONS

"Quantitative Microdensitometric X-ray Analysis of Vertebral Trabecular Bone," Radiology, vol. 88, pp. 794–796, 1967.

"Radiographic Trabecular Quantitation of Human Lumbar Vertebrae in Situ, I. Theory and Method for Study of Osteoporosis", Investigative Radiology, vol. 2, pp. 272–289, 1967.

Radiographic Trabecular Quantitation of Human Lumbar Vertebrae in Situ, II. Relation to Bone Quantity, Strength and Mineral Content (Preliminary Results), Investigative Radiology, vol. 2, No. 5, pp. 339–352, 1967.

"Prediction of Vertebral Body Compressive Fracture Using Quantitative Computed Tomography," The Journal of Bone and Joint Surgery, vol. 67–A, No. 8, Oct. 1985.

"Architecture and Vertebral Fracture," Calcif Tissue Int., vol. 53 (Suppl. 1), pp. 139–142.

Multifractal Radiographic Analysis of Osteoporosis, Med. Phys. vol. 21, pp. 503–508, 1994.

Knoglevaev I. Farver, Ingenioren, No. 14, Apr. 8, 1988.

J.F. Veenland, E.S. Gelsoma, Ald Beckers, C. van Kuijk, J.L. Grashuls, Investigation of Bone Structure for Texture Analysis, 10th International Bone Densitometry Workshop, Apr. 1984.

Hagiwara et al., Dual X-ray Absorptiometry Forearm Software: Accuracy and Intermachine Relationship, Journal of Bone and Mineral Research, vol. 9, No. 9, 1994, pp. 1425–1427.

Peter J. Burt, Fast Filer Transforms For Image Processing, Computer Graphics and Image Processing 16, 20–51(1981), pp. 20–51.

Hayes et al., Biomechanics of Fracture Risk Prediction of the Hip and Spine by Quantitative Computed Tomography, Radiologic Clinics of North America, vol. 29, No. 1, Jan. 1991, pp. 1–18.

Majumdar et al., Application of Fractal Geometry Techniques to the Study of Trabecular Bone, Med. Phys. 20(6), Nov./Dec. 1993, pp. 1611–1619.

A. M. Parfitt, Implications of Architecture for the Pathogenesis and Prevention of Vertebral Fracture, Bone 13, pp. S41–S47(1992).

Spadaro et al., Cortical and Trabecular Bone Contribute Strength to the Osteopenic Distal Radius, Journal of Orthopaedic Research, vol. 12.

Journal of Micrscopy, vol. 00,P1 00, 0000 1990, pp. 00, Mar. 12, 1990, A Direct Method for Fast Three-Dimensional Serial Reconstruction, Odgaard,A.,pp. 1–8.

Journal of Bone and Mineral Research,vol. 5,No. 3,1990, A New Method for Automatic Recognition of the Radiographic Trabecular Pattern, Wil.G.M. Geraets et al,pp. 227–233.

Journal of Biomedical Computing, Variogram Methods for the Analysis of Bony Trabecular Shadows in Plain Ragiographs, pp. 1–25.

Symp. Zool. Soc.Lond (1981) No. 46. 127–167, Beyond Biometrics: Studies of Complex Biological Patterns, C.E.Oxnard et al,pp. 126–163.

Computer Aided Analysis of the Radiographic Trabecular Pattern, W.G.M. Geraets, pp. 1–117.

Computerized Radiographic Analysis of Osteoporosis: Preliminary Evaluation, Jul. 6, 1995, Philip Caligiuri et al, pp. 471–474.

Characterization of Vertebral Strength Using Digital Radiographic Analysis of Bone Structure, C.B. Caldwell et al, pp. 611–615.

Steiniche et al., Marked Changes in Iliac Crest Bone Structure in Postmenopausal Osteoporotic Patients Without any Signs of Disturbed Bone Remodeling or Balance, Bon, vol. 15, No. 7, pp. 73–79.

Buckland–Wright et al., Fractal Signature Analysis of Macroradiographs Measures Trabecular Organization in Lumbar Vertebrae of Postmenopausal Women, Calcif Tissue Int (1994), pp. 106–112.

Burt et al., The Laplacian Pyramid as a Compact Image Code, IEEE Transactions on Communications, vol. Com–31, No., Apr. 1983, pp. 532–540.

Meier, et al, "Digital Bone Structure Analysis from Computer Tomographs of the Human Lumbar Spine", Dept. of Clinical Radiology, Germany, 1995.

Lectures from 11th International Bone Densitometry Workshop, 24–28, Sep. 1995, Oregon.

Chung, et al., "On the fractal nature of trabecular structure", Med. Phys. 21(10),Oct. 1994.

Derisquebourg, et al., "Automated Computerized Radiogrammetry of the Second Metacarpal and its Correlation with Absorptiometry of the Forearm and Spine", Calcif Tissue Int. (1994) 54:461–465.

Rehman, et al., "Age related histomorphometric changes in bone in normal British men and women", J. Clin Pathol (1994) 47:529–534.

Schnitzler, et al., "Comparison of the Radiographic Vertebral Trabecular Pattern with the Vertebral Fracture Prevalence and Spinal Bone Density", Osteoporosis Int. (1993).

Mundinger, et al., "Quantitative image analysis . . . ", The British Journal of Radiology (1993), 66:209–213.

Weinstein et al., "Decreased Trabecular Width and Increased Trabelucar Spacing Contribute to Bone Loss with Aging", Bone (1987), 8:137–142.

Durand et al., "Cancellous Bone Structure: Analysis of High–Resolution CT Images with the Run–Length Method", Journal of Computer Assisted Tomography, (Jan./Feb. 1991), 15(1):133–139.

Bay, "Texture Correlation: A Method for the Measurement of Detailed Strain Distributions Within Trabecular Bone", Journal of Orthopaedic Research (1995) 13:258–267.

Ruttiman, et al., "Fractal dimension from radiographs of peridental alveolar bone", Oral Surg Oral Med Oral Pathol (1992) 74:98–110.

Benhamou, et al., "Fractal Organization of Trabecular Bone Images on Calcaneus Radiographs", Journal of Bone and Mineral Research, vol. 9, No. 12, 1994.

Chen, et al., "Fractal Analysis of Trabecular Patterns in Projection Radiographs An Assessment," Investigative Radiology, vol. 29, No. 6, 624–629.

Garrahan, et al., Measurement of Mean Trabecular Plate Thickness by a New Computerized Method, Bone (1987), 8:227–230.

Vesterby, et al., Biologically Meaningful Determinants of the in Vitro Strength of Lumbar Vertebrae, Bone (1991) 12:219–224.

Vesterby, et al., "Marrow Space Star Volume in the Iliac Crest Decreases . . . ", Bone (1991).

Vesterby et al., "Normal Postmenopausal Women Show Iliac Crest Trabecular Thickening on Vertical Sections", Bone (1989) 10:333–339.

Ito, et al., "Trabecular Texture Analysis of CT Images in the Relationship with Spinal Fracture", Radiology (1995) 194:55–59.

Zhu, et al., "Multiplanar Variations in the Structural Characteristics of Cancellous Bone", Bone, vol. 15, No. 3, 251–259, 1994.

Cheng, et al., "Automated segmentation of regions of interest on hand radiographs", Med. Phys. 21(8), Aug. 1994.

Chang, "Computer–aided diagnosis: Detection and characterization of hyperparathyroidism in digital hand radiographs", Med. Phys., vol. 20, No. 4, Jul./Aug. 1993.

"A digital image processing approach to diagnosis of osteoporosis", Twentieth Asilomar Conf. on Signals, Systems & Computers, pp. 631–634, Nov. 10–12, 1986, Pacific Grove CA.

"Variogram methods for the analysis of bony trabecular shadows in plain radiographs", Int. J. of Bio–Medical Computing, vol. 35, No. 2, Mar. 1994.

International Search Report, Dec. 21, 1995.

Modern Spectral Estimation: Theory and Application, Steven M. Kay.

Image Analysis And Mathematical Morphology, vol. 1, Jean Serra.

Fig. 24 A
| $r_i \in N$ | $\Theta_i$ | 64x64 samples $\left[\overline{\Theta}_i - \dfrac{2\hat{\sigma}\Theta_i}{\sqrt{1000}} \;;\; \overline{\Theta}_i + \dfrac{2\hat{\sigma}\Theta_i}{\sqrt{1000}}\right]$ | 128x128 samples $\left[\overline{\Theta}_i - \dfrac{2\hat{\sigma}\Theta_i}{\sqrt{1000}} \;;\; \overline{\Theta}_i + \dfrac{2\hat{\sigma}\Theta_i}{\sqrt{1000}}\right]$ |
|---|---|---|---|
| AR(-1,0) | -0.22314 | [-0.22320;-0.22121] | [-0.22356;-0.22260] |
| AR(0,-1) | -0.12118 | [-0.12232;-0.12024] | [-0.12178;-0.12075] |
| MA(-1,0) | 0.11535 | [0.11464;0.11672] | [0.11473;0.11570] |
| MA(0,-1) | 0.24066 | [0.23982;0.24175] | [0.24035;0.24131] |
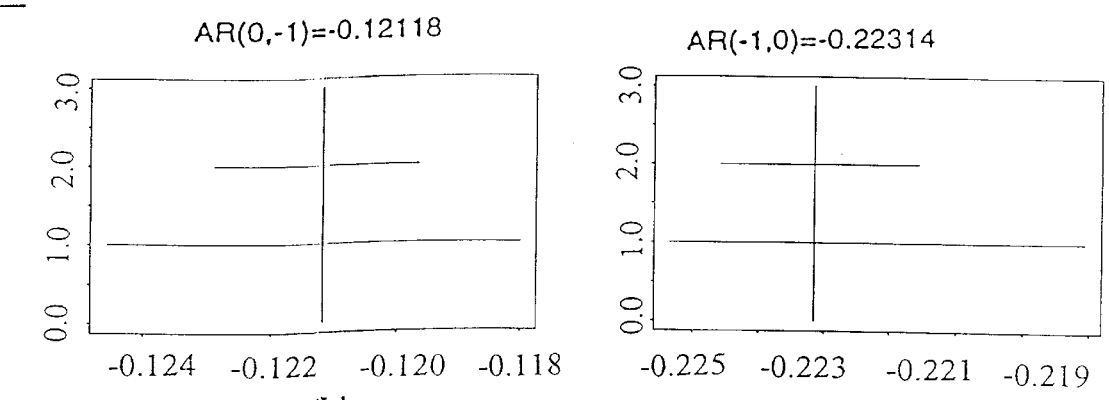
Fig. 24 B
Fig. 24 C
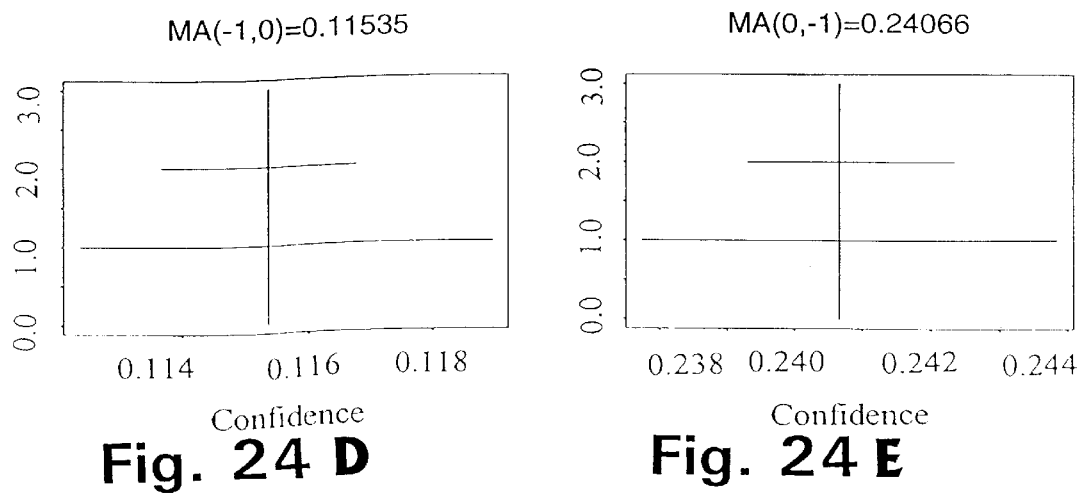
Fig. 24 D
Fig. 24 E

METHOD OF ESTIMATION

The present invention relates to the field of non-invasive determination of bone quality of vertebrates. This determination may be used in the diagnosis of, e.g., osteoporosis and other bone diseases which cause bone fragility and, thus, increase the risk of bone fracture.

Accelerated bone loss leading to osteoporosis is a common phenomenon in women after menopause. Women often ignorantly suffer from accelerated bone loss, and the reduced strength of the bones is not discovered until a bone is broken or a vertebra collapses due to a load which a healthy bone or vertebra should be able to withstand. Thus, a large part of the osteoporotic patients are not aware of the reduced strength of their bones until a fracture reveals the disease and the extent thereof.

Today, osteoporosis affects more than one third of elderly women in the industrialized part of the world. The prevalence of this disease is still increasing, partly caused by the increase in the proportion of elderly people, partly for unexplained reasons. In the lesser developed parts of the world, like South-east Asia and South America, it is predicted that osteoporosis will become an enormous socio-economic burden within the next 20–30 years. However, if individuals at risk of developing osteoporosis can be identified, preventive measures can be applied. This requires a reliable, cheap and safe method for identification of those at risk.

Since the risk of osteoporosis is closely related to the bone resistance to fracture, bone strength or bone quality measurements are likely to supply the essential information.

Since the means of preventing osteoporosis are much more efficient than those of treating osteoporosis, identification of individuals at risk of developing this disease is crucial. Only by early prevention of osteoporosis, the individual as well as the socio-economic consequences of the disease may be minimized.

The method according to the invention provides a method for detection of reductions in bone quality, such as architecture and strength, at an early stage. Thus, the method of the invention provides a tool of screening potential patients for bone diseases and, thus, provides the possibility of early detection of bone diseases at a stage in which no symptoms of disease are noted by the patient.

A typical measure of bone strength has been the Bone Mineral Density (BMD) of the bone. BMD measurements are typically obtained by X-ray of a bone together with a standard wedge. Having determined which part of the wedge attenuates the X-ray beam to the same degree as the illuminated bone, a measure of BMD may be obtained.

A more sophisticated method of determining BMD is by X-ray absorptiometry of two different wavelengths. Using two wavelengths enables the method to compensate for the effects of soft tissue etc. around the bone and, thus, to obtain a more exact determination of the X-ray attenuation of the bone.

However, as will be clear from the following, the Bone Mineral Density of a bone is not necessarily connected to the actual strength of the bone. The reason for this is to be found in the structure of a bone of a vertebrate.

A bone of a vertebrate consists of a cortical outer layer and a cancellous inner structure. Omission of the cancellous inner structure of a bone would result in a quite fragile bone. The cancellous inner structure of the bone consists of so-called trabeculae. Thicker vertical trabeculae are positioned in the bone in the direction of the main load (main compression or pull in the bone), and thinner, horizontal trabeculae interconnect the vertical trabeculae.

Thus, the main density of a bone is constituted by the cortical layer and the vertical trabeculae. This is quite natural, as the bone reserves the largest part of the material to withstand the most common loads. A BMD measurement determining the density of a bone will therefore primarily estimate the amount of bone in the cortical layer and the vertical trabeculae and, thus, only to some degree the ability of the bone to withstand the loads to which the bone is adapted.

However, when loads are applied not in the direction of the vertical trabeculae, the structure of the bone would be fragile without the thinner, horizontal trabeculae which interconnect the vertical trabeculae. The horizontal trabeculae define the ability of the bone to withstand loads not in the direction of the vertical trabeculae. Thus, the strength of the bone in directions not in the direction of the vertical trabeculae is defined by a very small part of the bone mass.

Different bones vary in the relation between cortical and trabecular bone structures. Furthermore, the architecture of the trabeculae vary according to the potential loading of this part of the bone. The number and diameter of longitudinal trabeculae and the presence of transverse trabeculae are also of fundamental importance for the fragility of the bone. These differences are of major importance for the strength of the bone, but they can only to a minor extent be detected by BMD measurements.

Since trabecular bone has a greater surface area/weight ratio, it is to a higher extend exposed to accelerated bone loss than the cortical bone. Therefore, osteoporotic fractures are mainly seen in bones with predominantly trabecular structure, such as the distal forearm, proximal humerus, thoracic and lumbar spine as well as the femoral neck. Changes in BMD related to loss of trabecular bone severely underestimates the loss of resistance to fracture. As a consequence, BMD measurements of patients with osteoporotic fractures reveal a major overlap with BMD measurements of normal subjects of the same cohort.

The above information explains why persons with low energy fractures may have normal BMD values when compared to agematched normal controls. Thus, one may wish to distinguish between bone quantity and bone quality, where the bone quality is more closely related to the mechanical or bio-mechanical strength of the bone.

A measure of the overall bone strength may naturally be obtained from a bone specimen taken from the potential patient and subjected to mechanical testing. However, this requires bone biopsy, which is painful and implies a minor risk of complications. Thus, in order to have a comfortable, cheap, fast and safe screening of the very large group of potential patients (most women after menopause), the estimation of the bone quality should be performed non-invasively in a safe and fast manner.

The present invention offers a non-invasive method which provides measures of the overall strength of bones and which is safe, comfortable for the potential patient, fast and cheap.

In "A New Method for Automatic Recognition of the Radiographic Trabecular Pattern" Wil G. M. Geraets et al., Journal of Bone and Mineral Research, Vol. 5, No. 3, 1990, pp 227–233, a method of recognizing the trabecular pattern from X-ray pictures is disclosed. According to this method, two types of noise are removed from an X-ray picture which has been scanned into an image memory: high-frequency noise is removed by using a median filter, and low-frequency noise is removed by using a local averaging operation on the image.

After noise reduction a segmentation of the image data is performed whereby the image is binarized and subsequently eroded (by using a median axis transform) so as to retain only central lines having a thickness of 1 pixel. A total of 7 features are derived from the segmented and the eroded images. These features are subsequently correlated to the Bone Mineral Density measurements of the bones.

However, due to the almost insignificant correlation between the image features obtained and the BMD measurements in the above-mentioned reference, it is evident that a higher correlation and, thus, a more precise estimate of the bone quality is required.

In "computerized Radiographic Analysis of Osteoporosis: Preliminary Evaluation", Plilip Caligiuri et al, Radiology 1993, 186;417–474, a method in which X-ray images of the lumbar spine are scanned analyzed. In this reference, the power spectrum was obtained and the Root Mean Square (RMS) and the First Moment (FMO) thereof were compared to typical BMD measurements performed on the bones. It was concluded that both BMD did not correlate well with FMO and RMS and that this may be due to FMO and RMS containing additional information. In this reference, only the power spectrum and features derivable therefrom were investigated.

The present invention provides a method and a system for providing an easily performed, but highly reliable estimation of the bone quality.

In a first aspect, the present invention relates to a method for estimating the bone quality of a vertebrate, on the basis of two-dimensional image data comprising information relating to the trabecular structure of at least a part of a bone of the vertebrate, the image data being data obtained by exposing at least the part of the bone to electromagnetic radiation, the method comprising subjecting the image data to a statistical analysis comprising a background correction procedure in which low frequent intensity variations not related to the trabecular structure of the bone is reduced relative to image data related to the trabecular structure of the part of the bone, an image manipulation and feature extraction procedure wherein at least the local image intensity information as well as variation in the local intensity are utilized to extract information related to the trabecular structure of the part of the bone, the image manipulation and feature extraction procedure comprising subjecting the image data to at least one of the following procedures:
(a) obtaining an estimate of the parametric estimate of the power spectrum of the image data and extracting features relating to the energy distribution of the parametric estimate,
(b) obtaining, on the basis of image data on which a Fourier method has been used to emphasize the information in the image data relating to the trabecular structure, an estimate of a grey-level co-occurrence matrix and extracting at least one feature on the basis of the estimated co-occurrence matrix,
(c) obtaining an estimate of the projected trabecular pattern of the image data by using a Fourier method to emphasize the information in the image data relating to the trabecular structure and subjecting the manipulated image data to a morphological operation, and extracting features relating to the trabecular structure from the estimated projected trabecular pattern,
(d) obtaining, on the basis of a frequency analysis of the image data, features relating to the periodicity of the trabecular structure of the part of the bone, and an estimation procedure in which the bone quality of the vertebrate is estimated on the basis of the derived features and optionally other features related to the bone or the vertebrate and a predetermined relationship between the values of such features and reference bone quality parameters.

As indicated above, in the present context "bone quality" is not equalled to "bone quantity", such as Bone Mineral Density, as even a small loss of bone quantity may lead to a large loss of bone quality if the bone loss has taken place at critical positions in the trabecular structure. Thus, in the present context "bone quality" is a measure closely related to the risk of fracture of the bone, as it has been demonstrated in stress/strain evaluations of bone biopsies in which the microscopic structure is also evaluated (See, e.g., Lis Mosekilde relating to this issue).

Even though the bones and, thus, the trabecular structures are inherently three-dimensional, a projection of this structure into two dimensions, such as a radiographic image, yielding a so-called projected trabecular pattern, conveys sufficient information about the trabecular structure and, thus, the bone quality to give a satisfactory estimate of the bone quality.

Information relating to the trabecular structure may be local variations in, e.g., grey level information or any other information from which features relating to the trabecular structure may be derived.

Low frequency intensity variations in the image data will naturally depend on how the image data are obtained. If the image data are obtained on the basis of radiographic images, the low frequency intensity variations may be due to, e.g., scattering of the electromagnetic radiation, anatomic structures surrounding the illuminated part of the trabeculae such as cortical bone, fat tissue and muscles of varying thickness as well as, e.g., inhomogeneous X-ray illumination of the part of the bone.

According to the first aspect of the present invention, local image intensity information and variation in the local intensity are utilized to extract information relating to the trabecular structure of the part of the bone. In, e.g., digitized radiographic images, local image intensity information may be the individual pixel values, whereas variation in the local intensity is related to the textural information contained in, e.g., inhomogeneities in the image data.

The extracted features resulting from the image manipulation and feature extraction procedure quantify properties of the trabecular structure and, thus, of the bone quality. The extracted features are subsequently introduced into an estimation procedure in which a predetermined relationship between features and bone quality enables the estimation procedure to estimate the bone quality of the vertebrate.

In the present context, to "emphasize" information, such as magnitude information, means to give prominence to prevailing frequency information. This may be performed by either enhancing the prominent information or by reducing the less dominant information—optionally both.

According to the first aspect of the invention, an estimate of the bone quality is obtained in an estimation procedure on the basis of a predetermined relationship between features obtained and reference bone quality parameters. This predetermined relationship is typically established through statistical modelling, where explanatory variables (image features and optionally other explanatory features relating to the bone quality) are used to model corresponding reference bone quality data (response variable).

As described above, even though bone quality is not equal to bone quantity in the present context, the reference bone quality parameters are preferably parameters related to the strength of the bone rather than, e.g., BMD or BMC which, as explained above, relate to the density of the bone rather than the strength thereof. However, to provide even higher diagnostic sensitivity, combination of the present invention with a measurement of BMC/BMD is contemplated to be useful. BMC/BMD measurements can be obtained either by the above-mentioned two-wavelength-technique or they may, if the image data are obtained on the basis of an X-ray image, be available from the same image data, where, e.g., a standard aluminum wedge has been illuminated together with the bone in question.

At present, the most common way of obtaining non-invasive information about the bone quantity and bone quality is based on X-ray illumination. X-ray images may easily be used to generate the image data for use in the present invention. As it is preferred to perform the statistical analysis on a computer, the analogue X-ray image may be digitized and introduced into a computer by scanning the X-ray image.

Naturally, the resolution of the X-ray film used to obtain the X-ray image will have an effect on the quality of the image data. Thus, it is presently preferred that the resolution of the X-ray film is at least 4 pairs of lines per centimeter, such as at least 5 pairs of lines per centimeter. Even though this may be sufficient for obtaining a satisfactory estimation of the bone quality, it is preferred that the resolution of the X-ray film is at least 10 pairs of lines per centimeter, such as at least 25 pairs of lines per centimeter, preferably at least 50 pairs of lines per centimeter. It is possible to obtain resolutions of the X-ray film up to at least 100 pairs of lines per centimeter, such as at least 250 pairs of lines per centimeter and probably as high as 500 pairs of lines per centimeter, such as at least 600 pairs of lines per centimeter. Naturally, a resolution of this preferred size will ensure that a large amount of information is present in the X-ray image.

Naturally, it is preferred that the scanning of X-ray images is performed with a sufficiently large resolution in order to ensure that a minimum relevant information of the X-ray image is lost in the transfer to the image data. Thus, it is preferred that the scanning has been performed at a resolution of at least 10 lines per cm, such as at least 25 lines per cm, preferably at least 100 lines per cm, such as at least 200 lines per cm, such as at least 250 lines per cm.

Furthermore, it is preferred that the resolution of the scanner is better than 4 true bits per pixel, such as better than 6 true bits per pixel. preferably better than 8 bits per pixel.

Naturally, in order to have the scanner actually scan the image, it should be able to transilluminate the radiographs.

The ESKOSCAN 2450 from Eskofot A/S has been found to fulfill the above criterias and to be highly suited for use in the method of the invention.

It is presently preferred that the background correction procedure comprises at least reducing or optionally removing low frequency information having a frequency significantly lower than the spacing of the projected trabeculae. As described above, this low frequent spectral content of the image data is typically caused by cortical bone, fat tissue and muscles of varying thickness as well as, e.g., inhomogeneous X-ray illumination of the part of the bone. Naturally, this type of undesirable effect is unavoidable when obtaining non-invasive image data on the basis of X-ray radiographs. However, other non-invasive image acquisition techniques, such as, e.g., MR and CT imaging may generate image data not automatically or not to the same degree "suffering from" this type of undesired effect.

Even though it is difficult to exactly quantify the limit between undesired low frequency information and the desired higher frequency relevant information independently of the image resolution, it is presently preferred that information having frequencies half or less than the spacing of the projected trabeculae is at least reduced or optionally removed. More preferably, information having frequencies being a quarter or less, such as a tenth or less than the spacing of the projected trabeculae is at least reduced or optionally removed.

One preferred way of reducing or preferably removing the low frequency information is using a background correction procedure comprising generating secondary image data as a result of performing a median filtering with a predetermined kernel size and subtracting this result from the original image data. One of the advantages of using a median filter is that this operation is edge preserving.

Another way of reducing or preferably removing the low frequency information is using a background correction procedure comprising generating secondary image data as a result of performing a mean filtering with a predetermined kernel size and subtracting this result from the original image data. A mean filtering is typically much faster than the median filtering. However, the mean filtering is not edge preserving. Edges generated in this part of the process may have an adverse effect and generate false or erroneous information later in the process, leading to wrong estimates of the bone quality.

It is typically preferred that the kernel size is at the most ½ of the image data, such as at the most ¼ of the image data, preferably at the most 1/10 of the image data, more preferably at the most 1/20 of the image data.

A third way of reducing or preferably removing the low frequency information is using a background correction procedure comprising globally fitting a two-dimensional polynomial to the image data and generating background corrected image data on the basis of the residuals of the fitting procedure. Apart from potential difficulties in determining the optimal order of the polynomial, which the person skilled in the art will know, this method potentially offers an extremely fast background correction of image data.

It is contemplated that a suitable order of the polynomial may be at the most 15, such as at the most 10, more preferably at the most 5.

Having performed a background correction of the image data, an image manipulation and feature extraction procedure is performed in order to obtain features quantifying textural properties of the trabecular structure.

An important textural property relating to the bone quality is the degree of anisotropy of the projected trabecular pattern. This property may be described in an intuitively appealing way using the power spectrum of the image data. The power spectrum may be obtained using direct methods, auto-covariance methods or parametric methods.

Classical spectral estimation, however, which comprises direct methods and auto-covariance methods, typically gives relatively non-consistent spectral estimates with a poor resolution. Alternatively, smoothing methods may be employed. This, however, brings about the well-known variance/resolution trade-off.

Therefore, parametric spectral estimation is used according to the invention as this estimator is a consistent spectral estimator with superior resolution properties.

One way of obtaining the parametric estimate of the power spectrum is subjecting the image data, optionally weighted with a window, to a Fast Fourier Transformation. This is a so-called direct method of which there are several variants, where the most popular probably is the so-called Welch method.

Another way of obtaining the parametric estimate of the power spectrum is subjecting an estimate of the auto-covariance function of the image data, optionally weighted with a window, to a Fast Fourier Transformation.

As mentioned above, the parametric methods potentially offer a higher resolution than the classical methods. The basic principle of parametric methods is to identify an appropriate model of the image data, which is assumed to be a homogeneous texture, and subsequently estimate the parameters of the model. Having estimated these parameters, the parametric estimate of the power spectrum of the fitted model may be obtained. In one dimension, this type of spectral estimate has proven itself superior to the classical spectral estimates.

The methods, on the basis of which the parametric estimate is obtained are at present preferably chosen from the group consisting of: causal Simultaneous Auto-Regressive Moving Average (SARMA) models, non-causal SARMA models, Gaussian Markov Random Field models and Maximum Entropy Spectral Estimates.

When considering spatial data, such as image data, causality is not natural. Abandoning causality, however, leads to serious problems in the estimation of the parameters as the Least Squares estimator is no longer consistent. Therefore, it is often preferred to superimpose an artificial directionality on the image data. Thus, having a causal model, the Least Square estimation principle may be applied.

However, a disadvantage of superimposing an artificial directionality on the image data is the so-called "directional bias" which may be quite conspicuous in, e.g., the estimate of the parametric estimate of the power spectrum. Consequently, the use of causal models in the present context is not an obvious choice. This problem is partly solved using the "parallel-resistor" averaged spectral estimator introduced by Chan in ("Two-dimensional Spectral estimation from Auto-regressive Models with varying Areas of Support" from 1981).

Hitherto, when considering non-causal models, one has been forced to consider the Maximum Likelihood Estimator, which gives a number of practical problems for the following reasons:

The Likelihood function includes the determinant of the Jacobian matrix which is of the size $M^2 \times M^2$ (where M in the 2-D situation is the side length of the image). This determinant is a complicated non-linear function of the model parameters.

Even if assumptions are made about the image (e.g. torus) that offers an analytical expression for the above-mentioned determinant, the computational load will still be very large.

Close to non-stationarity, the Likelihood function is extremely rippled. This will often cause the non-linear optimization routine to find a sub-optimal solution to the estimation problem. It is not feasible/possible to test for this in two dimensions or more, due to the computational effort required.

For the above-mentioned reasons, the Maximum Likelihood estimation is not a practical way of obtaining estimates of the model. Other estimation principles may, of course, be more practical alternatives.

At present, it is preferred that the method on the basis of which the parametric spectrum is obtained, is a non-causal SARMA model using the so-called MORSE estimator. This estimator will be described further below.

Having obtained the parametric estimate of the power spectrum of the image data, one or more features are extracted which quantify properties of the bone quality.

The distribution of the energy in the parametric estimate of the power spectrum relates directly to the anisotropy of the image data. Thus, several types of features may be proposed which quantify this anisotropy.

At present, it is preferred to obtain at least one feature related to parameters of a contour encompassing at least a predetermined percentage of the energy of the parametric estimate of the power spectrum.

This the contour may, e.g., is determined by
(a) defining a contour, in terms of one axis in each dimension, around the centre of the parametric estimate of the power spectrum, all points on the contour having substantially the same distance to the centre of the parametric estimate of the power spectrum, and the contour encompassing less than the predetermined percentage of the energy of the parametric estimate of the power spectrum,
(b) for each dimension of the data calculating the percentage of the energy of the parametric estimate of the power spectrum encompassed by a dilated contour in which the axis in the dimension in question is increased by a predetermined distance,
(c) increasing the axis of the contour, in the dimension in which the increase in energy encompassed by the dilated contour is the largest, by the predetermined distance and
(d) repeating steps (b) and (c) until the percentage encompassed by the contour exceeds or equals the predetermined percentage.

The distribution of energy in the parametric estimate of the power spectrum is typically oblong. Tests have shown that the distribution of the energy in the parametric estimate of the power spectra of osteoporotic patients differ significantly from those of non-osteoporotic persons. This difference may, e.g., be seen in a difference in the area covered by or the elongatedness of the above-mentioned contour.

One way of obtaining suitable features from the contour is to define the shape of the contour and subsequently derive features from parameters of the contour.

A suitable way of defining the contour is to define the axes of the contour so that these are orthogonal and directed along principal directions of the parametric estimate of the power spectrum.

A natural shape of this contour may be an ellipsoidal contour and one or more features may be derived from the semi-axes thereof. However, a rectangular contour may also be used.

The above-mentioned method of defining the contour is preferably performed so as to obtain the smallest possible contour of the desired shape. This will ensure that the contour is uniquely defined and that the features derived from parameters of the contour relate as well as possible to the anisotropy of the image data.

An alternative way of extracting information in the frequency domain is to derive information from e.g. the height, width or total area under peaks of a smoothed periodogram. From this information, features relating to periodicity of the trabeculae may be derived. In this manner, information relating to a periodicity of the trabeculae is obtained by performing a-frequency analysis of the image data.

Several other ways of extracting features from the parametric estimate of the power spectrum may be used, such as fitting a Gaussian to the normalized parametric estimate of the power spectrum and deriving features from this Gaussian. Other methods are using rings and wedges as described by Weszka et al. (1976).

An image manipulation and feature extraction method alternative to or supplementing the above use of the parametric estimate of the power spectrum is to estimate the projected trabecular pattern of the image data by using a Fourier method to emphasize the information in the image data relating to the trabecular structure and subjecting the manipulated image data to a morphological operation, and extracting features relating to the trabecular structure from the estimated projected trabecular pattern.

The emphasizing procedure is essential in order to bring out the projected trabecular pattern in a robust manner. To this end, Fourier methods have proven suitable, and it is preferred that the Fourier method comprises subjecting the image data to Fourier transformation, performing a subsequent mathematical transformation of the Fourier transformed data, converting the transformed data back into the spatial domain.

Naturally, the subsequent mathematical transformation may be linear or non-linear.

Even though it is preferred that the subsequent mathematical transformation is performed by raising the magnitude of the Fourier transformed data to a power larger than 1, such as a power in the range of 1.1–10, preferably 1.5–4, such as about 2.0, also other transformations, such as other types of filtering, may be performed.

In order to further emphasize the information relating to the trabecular structure, a third mathematical transformation may be performed in order to preserve only part of the magnitude information of the transformed data. This may, e.g., be removal of at least part of the information in the magnitude of the spectrum.

Having emphasized the information in the image data relating to the trabecular structure, the resulting image data is preferably subjected to grey-scale morphological operations in order to prepare the data for feature extraction.

At present, the purpose of the grey-scale morphological operations is to extract a binary representation of the projected trabecular pattern (PTP). The foreground colour represents the trabeculae, whereas the background colour represents the cavities.

The above PTP is preferably obtained using the so-called morphological top-hat operation followed by a thresholding. The result of these operations is preferably further "cleaned" by removing small isolated clusters of pixels.

On the basis of the PTP obtained, a number of different features may be obtained. In the following, the generation of just a few of the vast number of possible features is described.

One method of generating features from the PTP is performing an operation (the so-called "distance transform") comprising determining, for each background pixel, the distance according to a given metric from the background pixel to the nearest foreground pixel. The features extracted from this operation are indeed intuitively appealing as they relate directly to the inter-trabecular distance.

The above metric is presently the Euclidian distance. However, other metrics may eventually prove more suitable in the present context.

Features based on the distance transform may, e.g., be derived from a mean value and/or standard deviation and/or the coefficient of variation and/or skewness and/or kurtosis of the determined distances.

Another method of generating features from the PTP is performing an operation (hereinafter referred to as "star area transform") comprising determining a measure for each background pixel based upon determining the distance from the background pixel to the nearest foreground pixel in a number of given directions in the image data.

Again, features derivable from the star area transform may, e.g., relate to a mean value and/or standard deviation and/or the coefficient of variation and/or skewness and/or kurtosis, optionally the maximum distance, of the determined measures.

In addition to the above-mentioned features derivable from the image data, it may be preferred to input additional data into the estimation procedure. It is evident that a large number of features which relate to the illuminated bone, but which are not derivable from the image data, may enhance the precision of the estimation of the bone quality.

As the present method may be used to estimate the bone quality of any bone from any vertebrate, additional information as to the age and/or sex, and/or species, and/or race and/or the specific bone considered in the vertebrate, and/or a estimated Bone Mineral Density, and/or a estimated Bone Mineral Content, may be included in the estimation procedure.

Even though the BMD may be introduced in the estimation procedure, this measure may also optionally be determined from the image data. BMD may be estimated by including data from a reference object in the exposure of the bone to the electromagnetic radiation and on the basis of the absorption of the electromagnetic radiation of the bone and of the reference object.

The purpose of the estimation procedure is to estimate given bio-mechanical properties of the bone on the basis of the introduced features extracted from the image data and other explanatory variables.

One way of obtaining an estimation procedure of the above type is to have the estimation procedure based on a statistical model, taking into account the correlation structure in the data set, so as to assign appropriate weights to the significant features in accordance with the predetermined relationship.

The above-mentioned model may be determined in a number of ways. However, establishing a model of this type requires obtaining corresponding values of all relevant features and a response variable relating to the bio-mechanical property which is to be estimated by the estimation procedure. The bio-mechanical property in question may be an absolute or a relative measure of the bone quality.

Examples of interesting bio-mechanical properties of bone are the mechanical bone strength, and/or a Bone Mineral Density measurement, and/or a Bone Mineral Content measurement, and/or a score value by a skilled radiologist. Naturally, the method of the present invention will output a value corresponding to the calibration of the method: if the method is calibrated towards a strength parameter, the output of the method will relate to the strength of the bone in question.

An important purpose of the present invention is to provide a method for evaluating bone strength and fracture risk of significant clinical value, thus to provide a higher estimation of fracture risk than the best technique available today, the Double X-ray Absorptiometry Bone Mineral Content measurements (DXA-BMC measurements).

As the calibration of the estimation procedure will determine the estimated parameter of the bone, this parameter should be chosen in a manner so that it correlates to the bone quality. The assessment of the extent to which the embodiments of the present invention are able to estimate bone quality may be performed by:

1. Cohort-studies, in which occurrence of new fractures are recorded and related to the initial estimation,
2. cross-sectional studies, in which fracture cases and age-and-sex-matched controls are compared to estimations obtained by the method according to the invention and optionally further to DXA-BMC measurements, or 3. by using bio-mechanical testing of bone specimens, preceded by estimating the bone quality according to the invention and optionally additionally DXA-BMC-measurements of the bone in question.

Using either distal radius, lumbar spine, femoral neck, or any bone in which two-dimensional image data comprising information relating to the trabecular structure the bone can be obtained, coherent values for determined bone strength, DXA-BMC and the estimate according to the present invention may be performed on the basis of human post-mortem bone samples or samples from other vertebrates.

The calibration of the method of the present invention may also be calibrated along the above-illustrated methods as these methods generate bone quality information and estimation on the basis of corresponding image data.

Bone strength may, e.g., be evaluated by directly measuring the plasticity and maximum load of a bone in a stress-strain diagram (See, e.g., Lis Mosekilde). These parameters are preferably obtained in both the direction of the vertical trabeculae and in the orthogonal direction in order to have the most complete estimate of the bone quality.

In the method of the invention, substantially all types of models may be used in the estimation procedure. At present, a preferred model is selected from the group consisting of: a General Linear Model, a Generalized Linear Model, an Artificial Neural Network, a Causal Probabilistic Net or Classification And Regression Trees.

As described above, the present method may be used to estimate the bone quality of bone in any vertebrate. Thus, the vertebrate may be a human, a horse, a great ape, a large ape, an anthropoid ape, a pig, a cow, etc, and the actual bone may naturally be virtually any bone in the vertebrate, such as radius, femur, corpus vertebrae, calcaneus, talus, os carpi, metatarsi, metacarpi, falanges, tibia, fibula, patella, ulna, humerus, mandible, clavicula, scapula, os coxae, os naviculare, Os cuboideum, os cuneiform I, os cuneiform II or os cuneiform III.

A second aspect of the present invention relates to a method for estimating the bone quality of a vertebrate, on the basis of two-dimensional image data comprising information relating to the trabecular structure of at least a part of a bone of the vertebrate, the image data being data obtained by exposing at least the part of the bone to electromagnetic radiation, the method comprising subjecting the image data to a statistical analysis comprising a background correction procedure in which low frequent intensity variations not related to the trabecular structure of the bone is reduced relative to image data related to the trabecular structure of the part of the bone, an image manipulation and feature extraction procedure comprising subjecting the image data to at least one of the following procedures:
(a) obtaining an estimate of the parametric estimate of the power spectrum of the image data and extracting features relating to the energy distribution of the parametric estimate,
(b) obtaining, on the basis of image data on which a Fourier method has been used to emphasize the information in the image data relating to the trabecular structure, an estimate of a grey-level co-occurrence matrix and extracting at least one feature on the basis of the estimated co-occurrence matrix,
(c) obtaining an estimate of the projected trabecular pattern of the image data by using a Fourier method to emphasize the information in the image data relating to the trabecular structure and subjecting the manipulated image data to a morphological operation, and extracting features relating to the trabecular structure from the estimated projected trabecular pattern,
(d) obtaining, on the basis of a frequency analysis of the image data, features relating to the periodicity of the trabecular structure of the part of the bone, and an estimation procedure in which the bone quality of the vertebrate is estimated with a Multiple Correlation Coefficient better than 0.5 on the basis of the derived features and optionally other features related to the bone or the vertebrate and a predetermined relationship between the features and reference bone quality parameters.

In fact, the bone quality of the vertebrate is preferably estimated with a Multiple Correlation Coefficient better than 0.55, such as better than 0.6. Naturally, the higher the Multiple Correlation Coefficient the higher the correlation between the actual-bone quality and the estimated bone quality. Thus, a Multiple Correlation Coefficient better than 0.65, such as better than 0.7, or better than 0.8, such as better than 0.85 is preferred in order to have as high a correlation to the actual value as possible.

In a third aspect, the present invention relates to a method for estimating Non-Causal Simultaneous Auto-Regressive Moving Average models in two or more dimensions, the method comprising optimizing a given direct measure of the flatness of the residual spectrum of the model. In the present context "optimizing a given direct measure of the flatness" means that the flatness is maximized.

Non-linear optimization procedures are typically used to maximize measures of the above type. A suitable non-linear procedure may comprise the following steps (a) generating a set of initial parameters for the model,
(b) generating the residual spectrum of the model on the basis of the parameters,
(c) obtaining the measure of the flatness of the residual spectrum,
(d) obtaining a new iterate of the parameters on the basis of the flatness measure and a search direction in parameter space,
(e) repeating steps (b)–(d) until given stop criterion is reached.

A number of measures of the flatness of the residual parametric estimate of the power spectrum may be chosen. A well known measure of flatness of probability distributions is the so-called entropy. Therefore, in the present context, the entropy is measured on the normalized residual parametric estimate of the power spectrum, disregarding the DC value.

Figure 2:
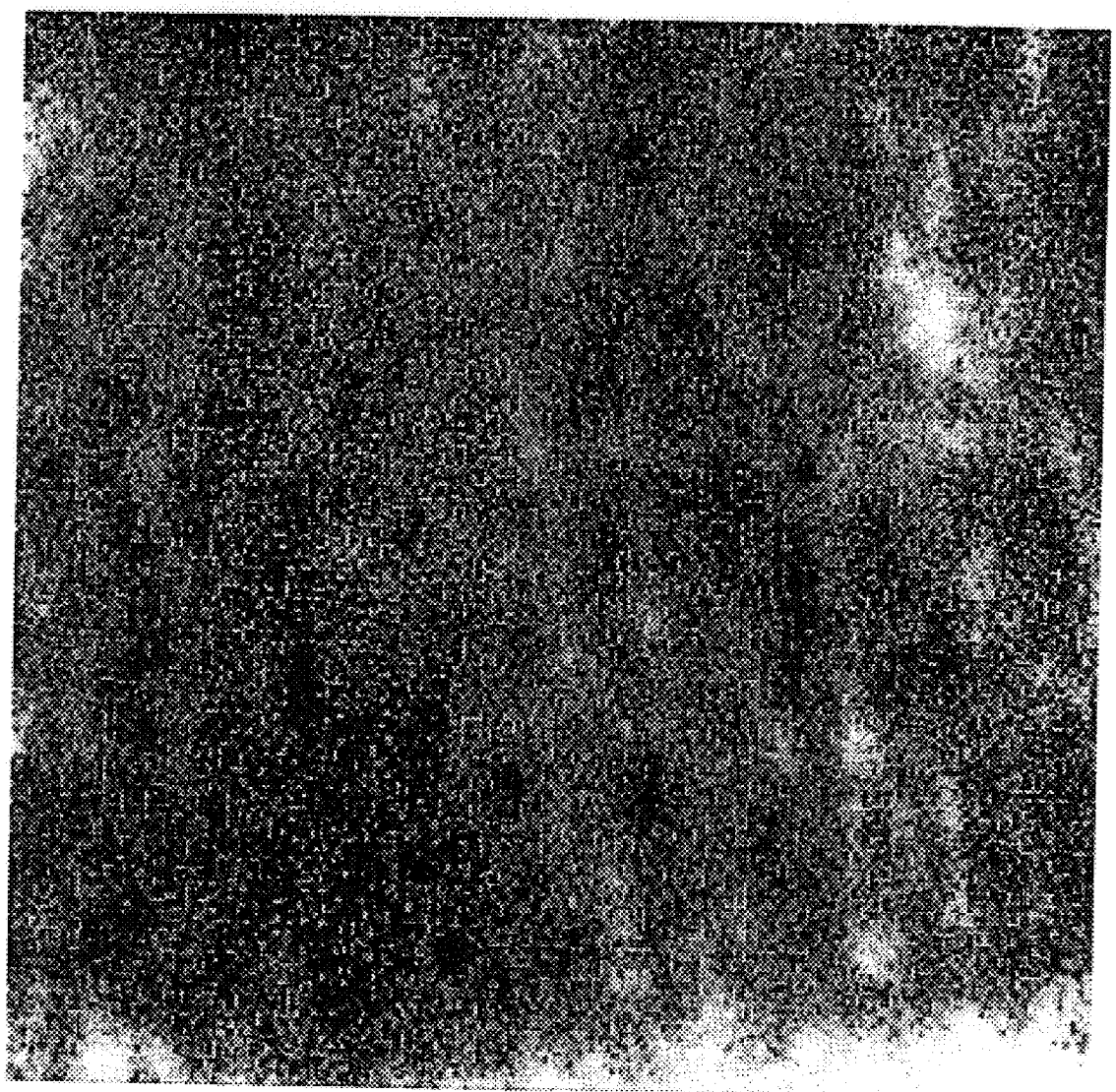
Figure 3:
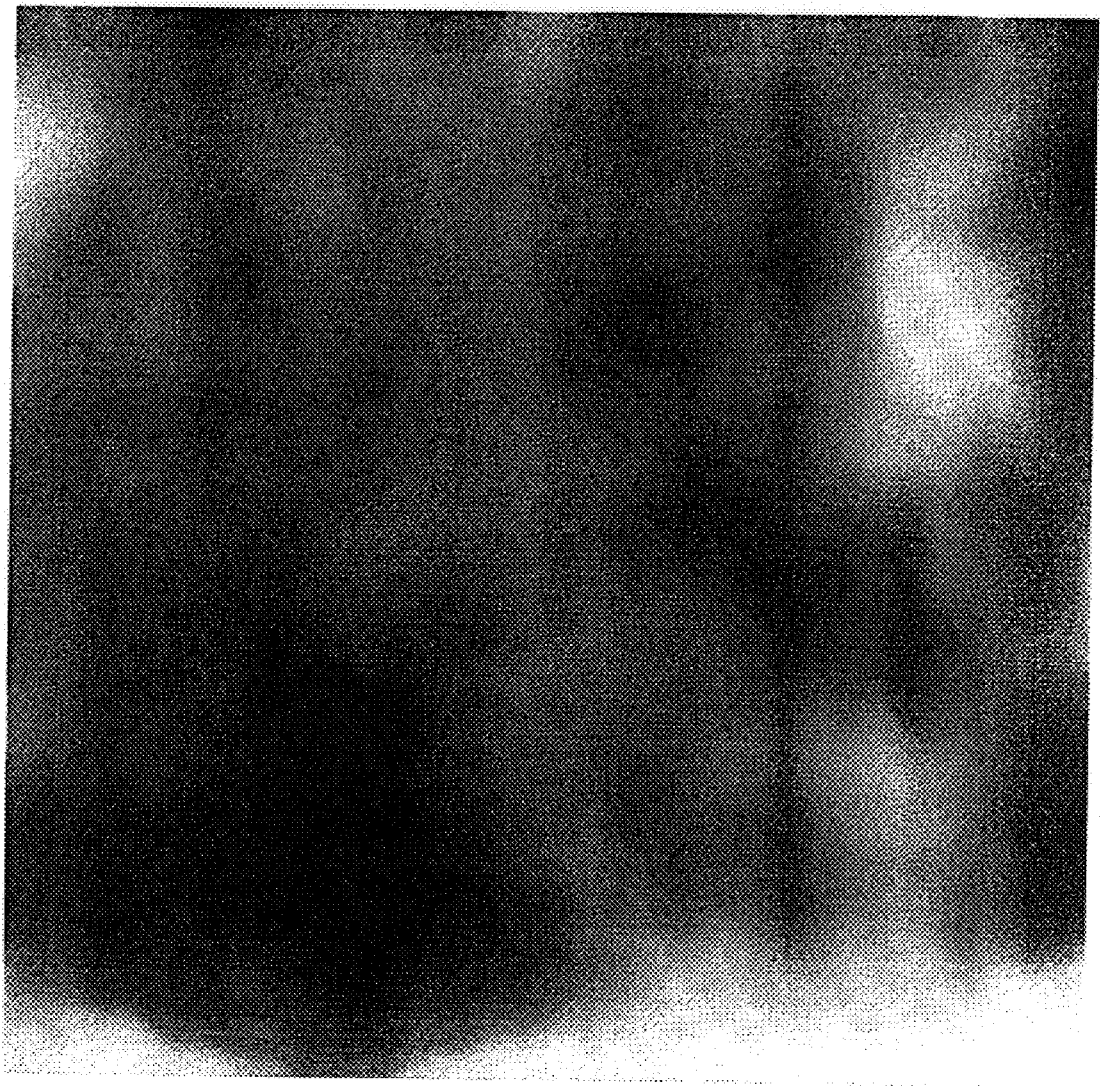
Figure 4:
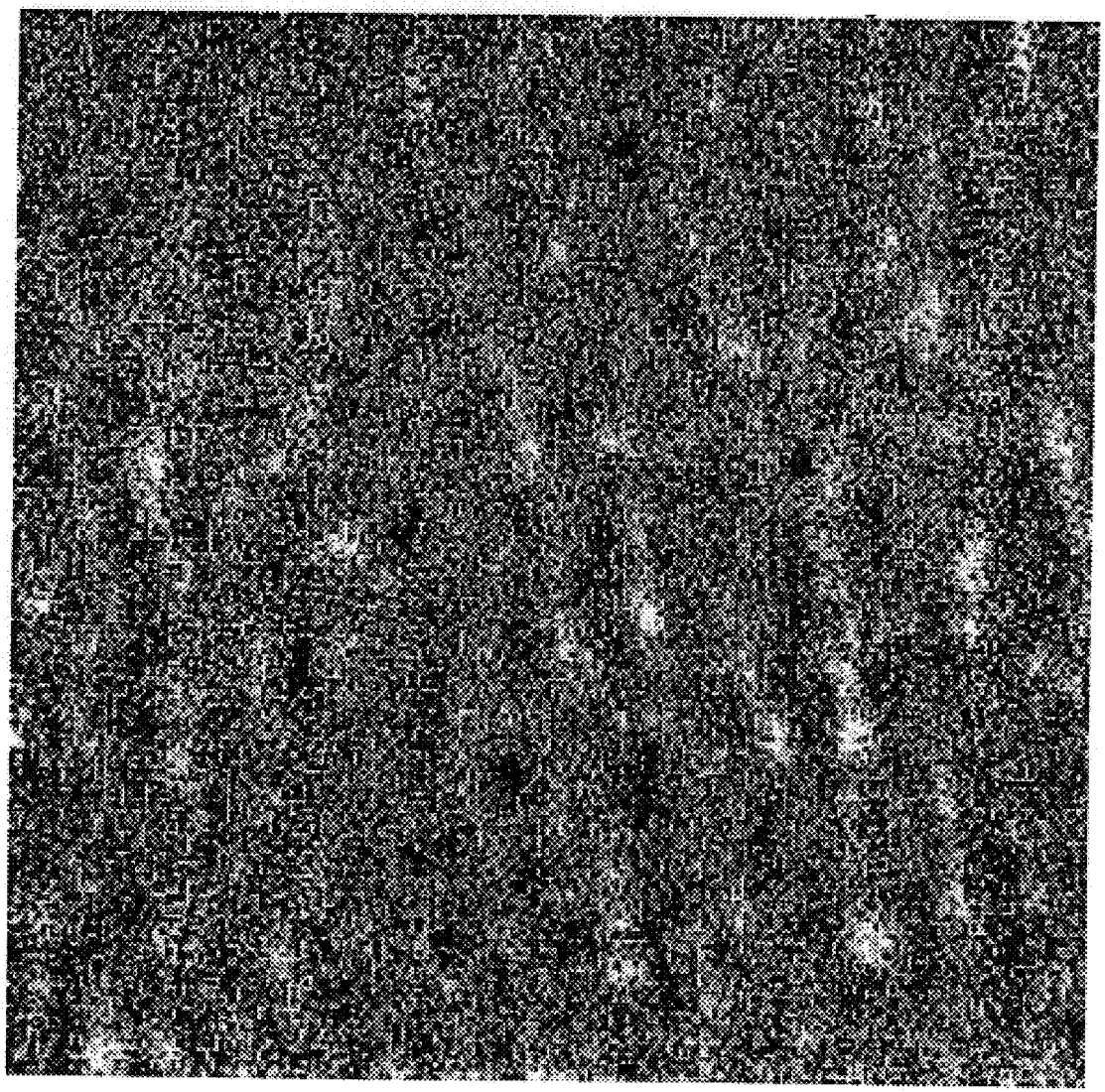
Figure 5:
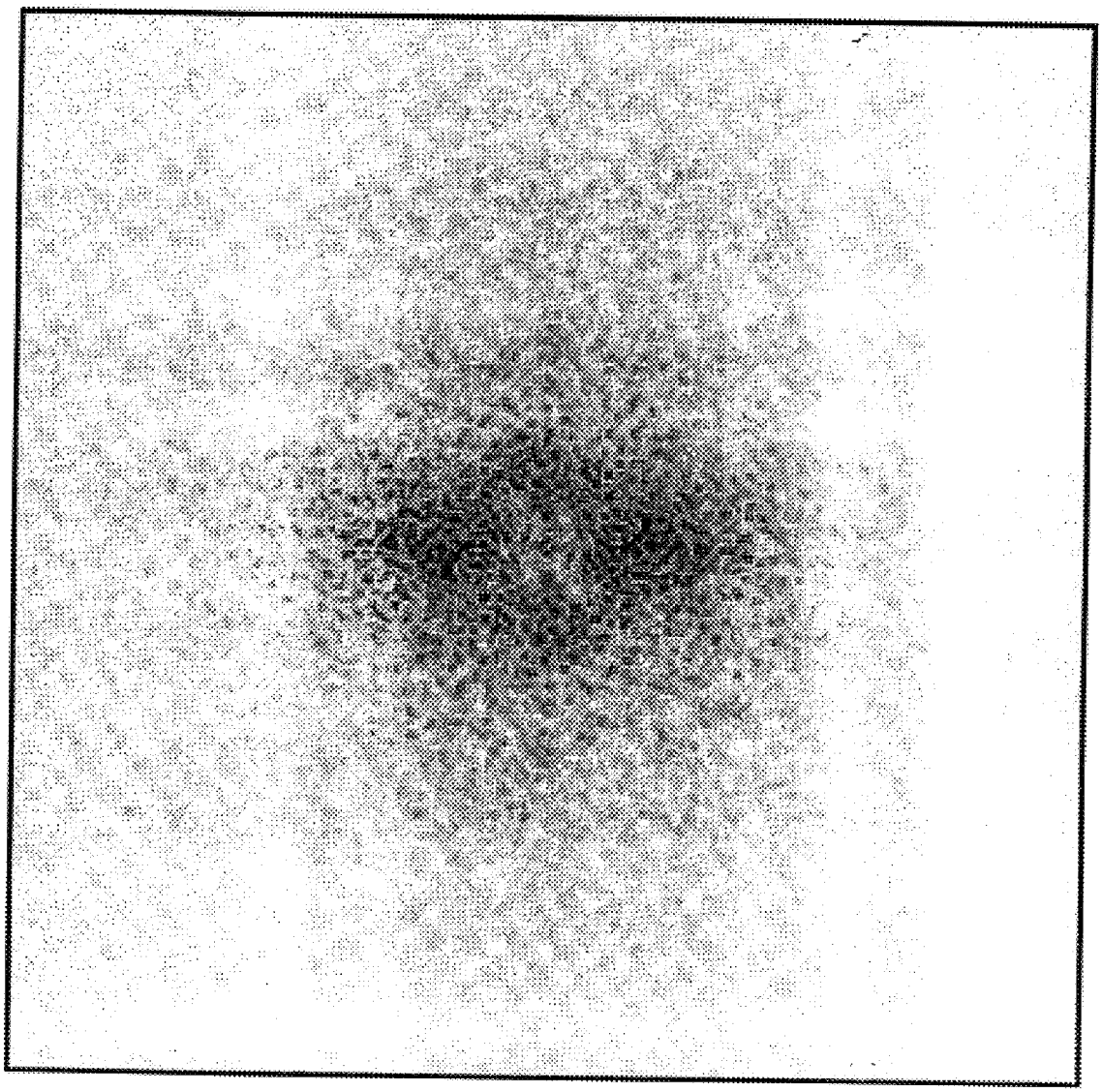
Figure 6:
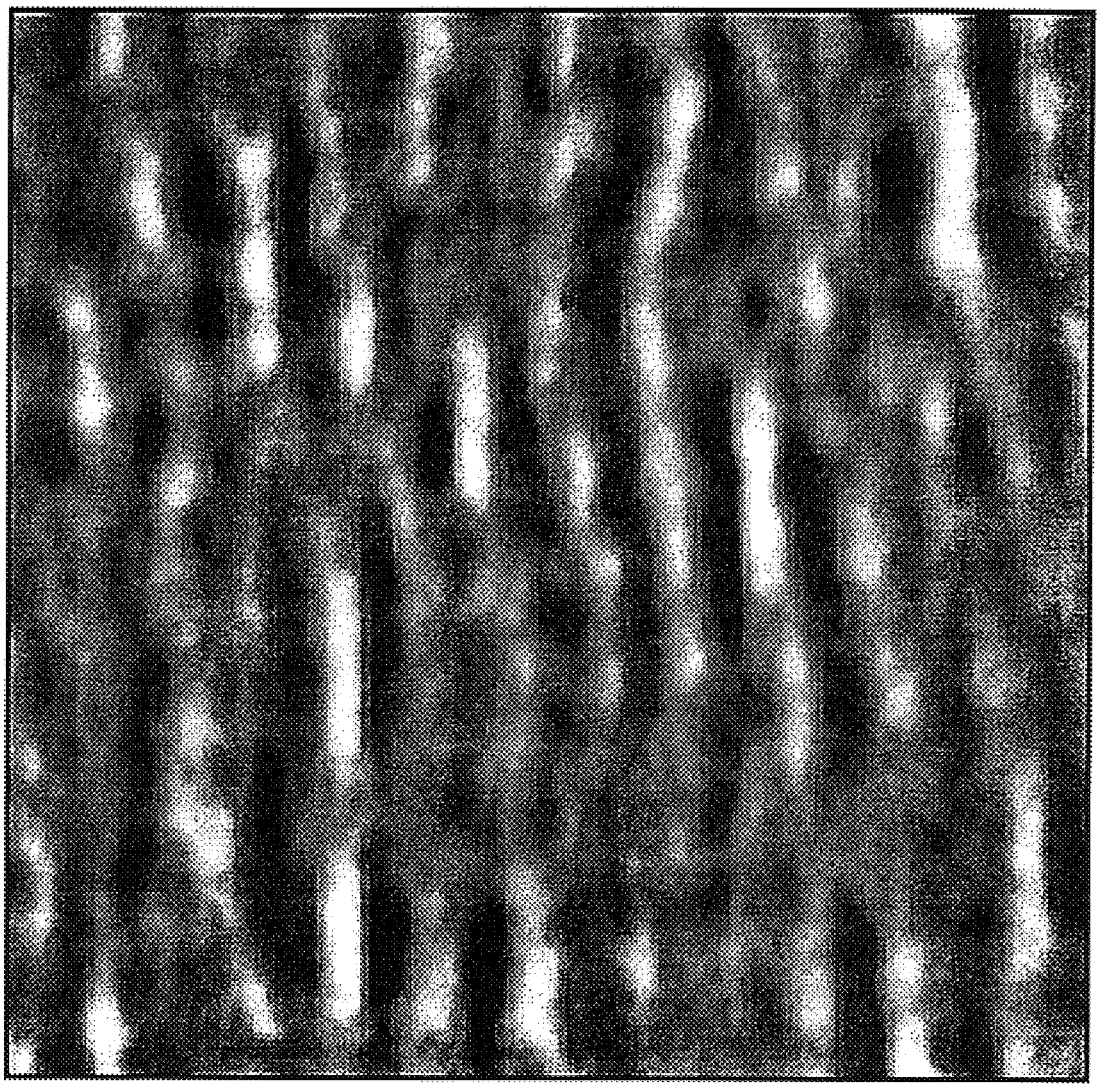
Figure 7:
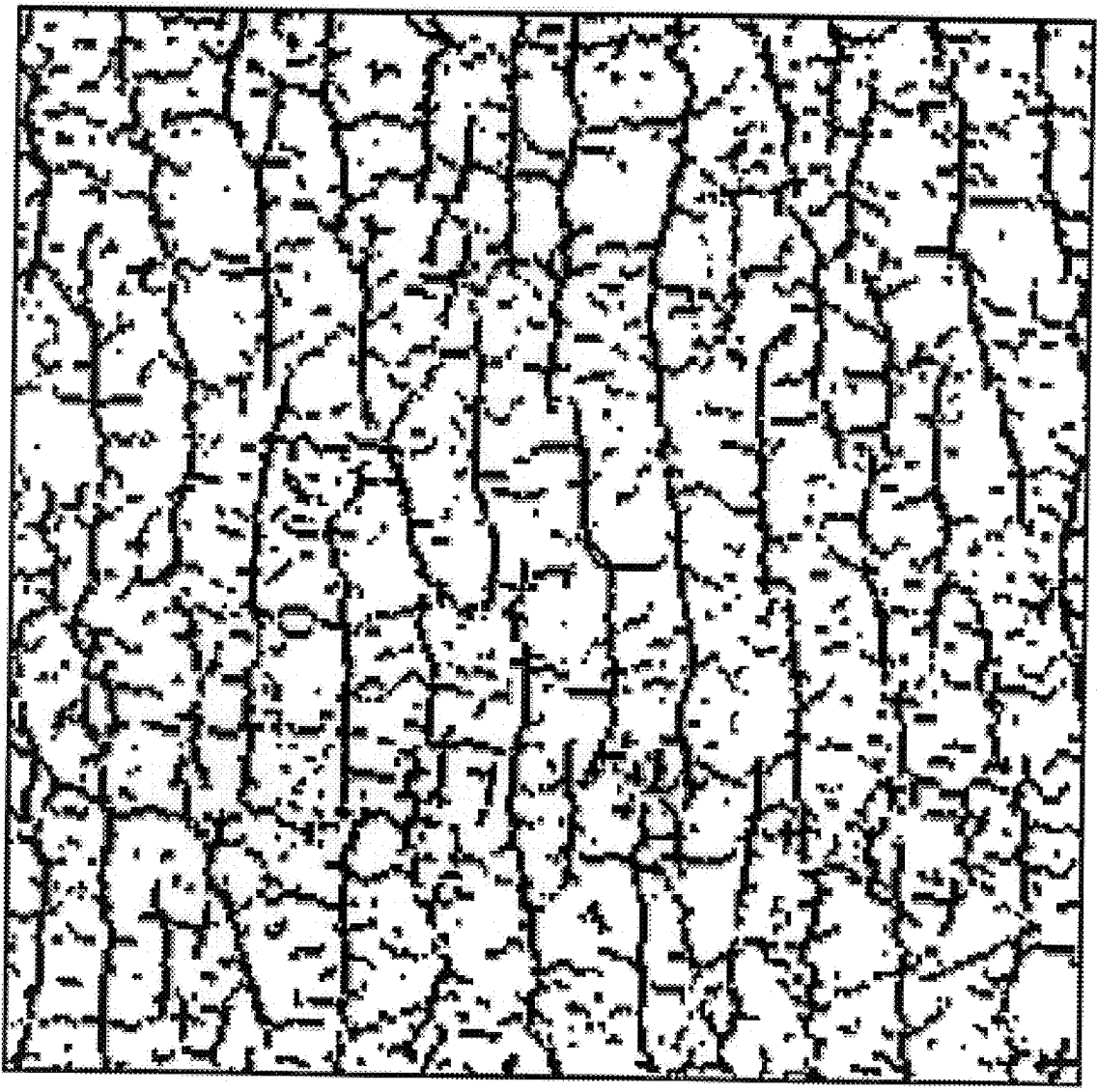
Figure 8:
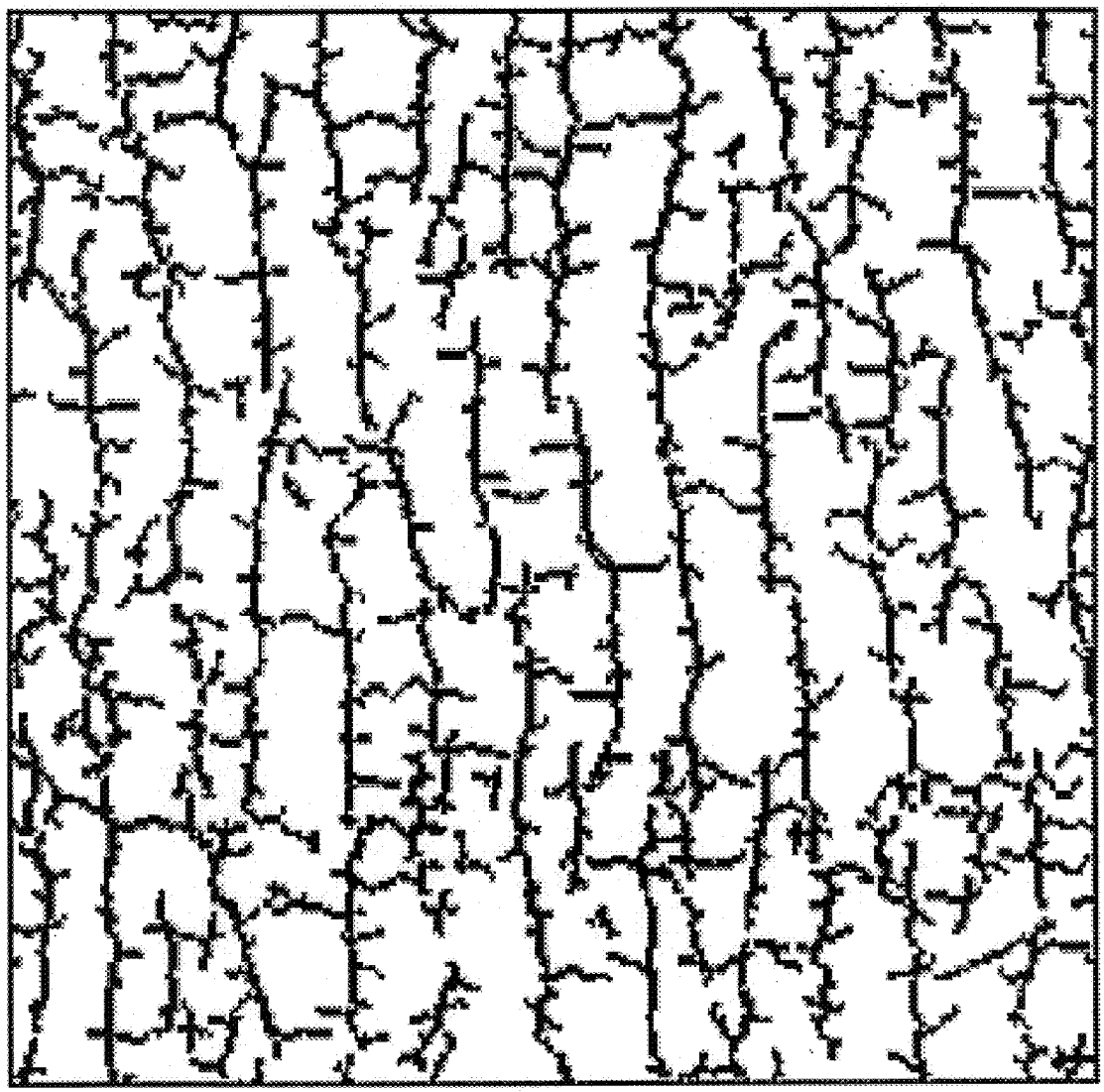
Figure 9:
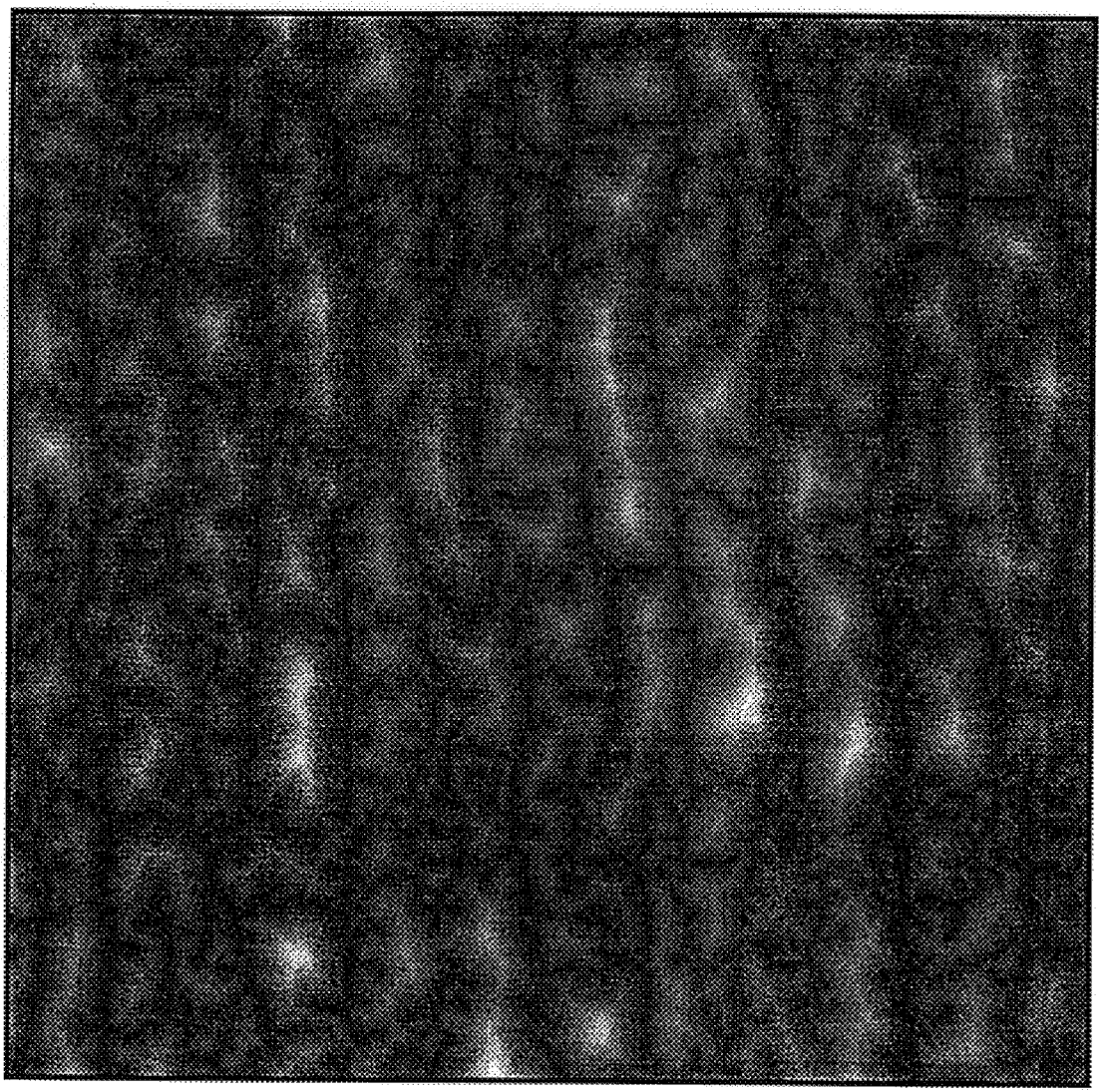
Figure 10:
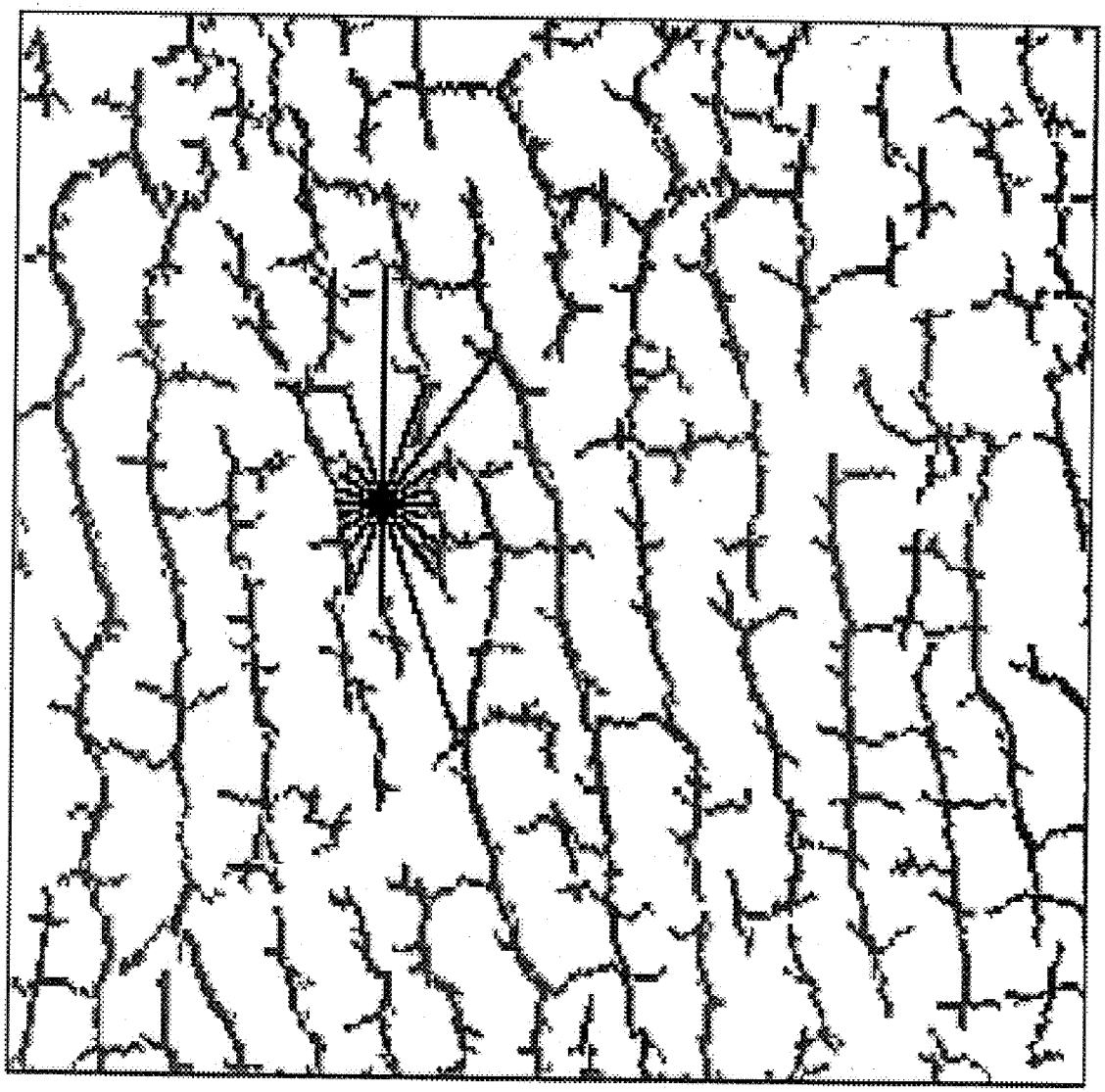

Preferred embodiments of aspects of the invention will now be described with reference to the drawings wherein FIG. 1 shows a typical radiographic image of a wrist, obtained by an ESKOFOT scanner (See Example 1), FIG. 2 shows an extracted sub-image of the image of FIG. 1, FIG. 3 shows the image of FIG. 2 after a median filtering with a 25×25 kernel size, FIG. 4 shows the final background corrected image, FIG. 5 shows the power spectrum of the background corrected image of FIG. 4, FIG. 6 shows the restored result of the image of FIG. 4 after having been subjected to an emphasizing procedure, FIG. 7 shows the result of a morphological top-hat operation on the restored image of FIG. 6, FIG. 8 shows the image of FIG. 7, wherein small isolated groups of pixels (noise) have been removed (this image is referred to as the projected trabecular pattern (PTP)), FIG. 9 shows the result of a distance transform calculated for the PTP of FIG. 8, FIG. 10 illustrates the star area transform for a single pixel.

Figure 11:
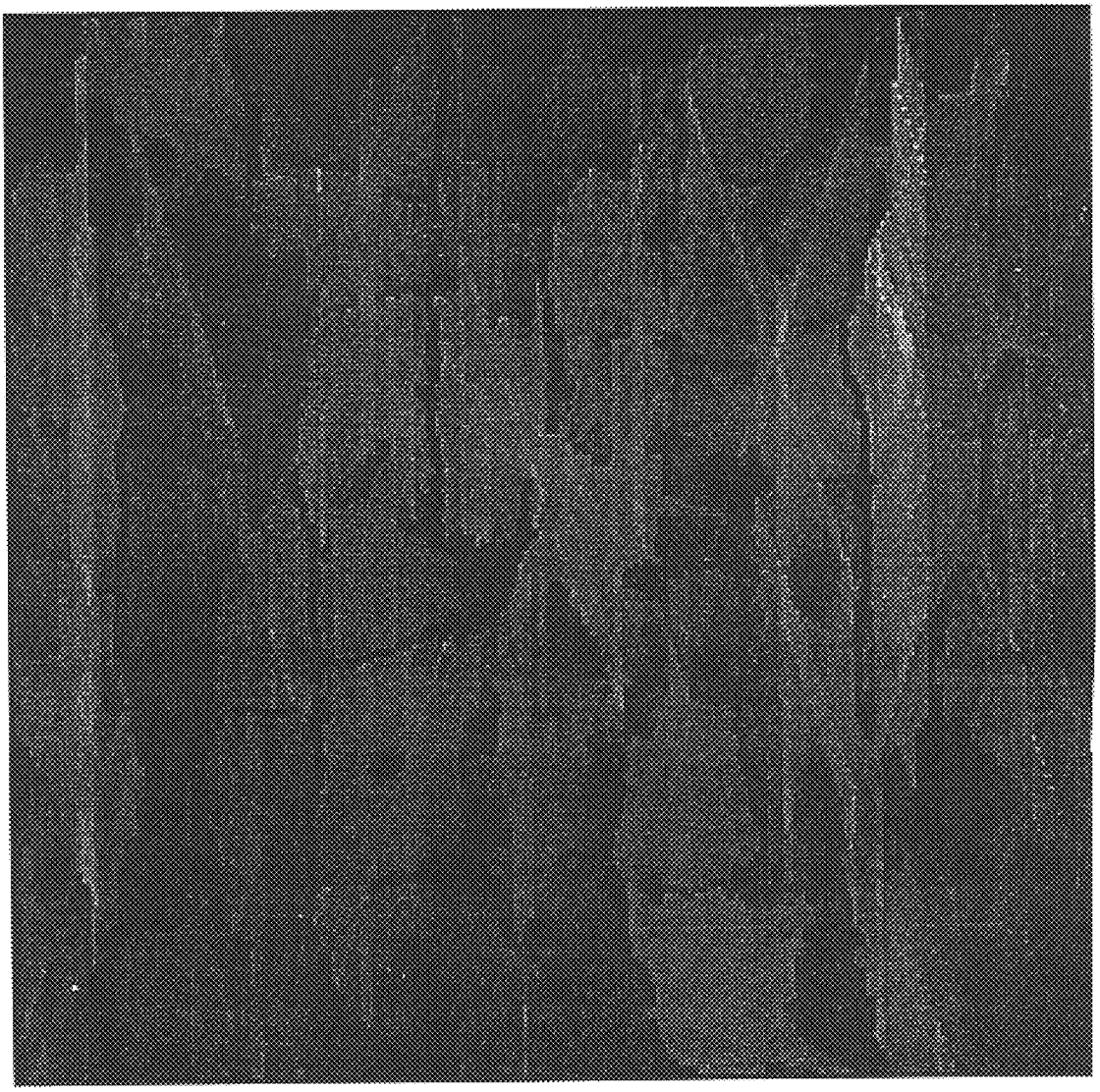
Figure 12:
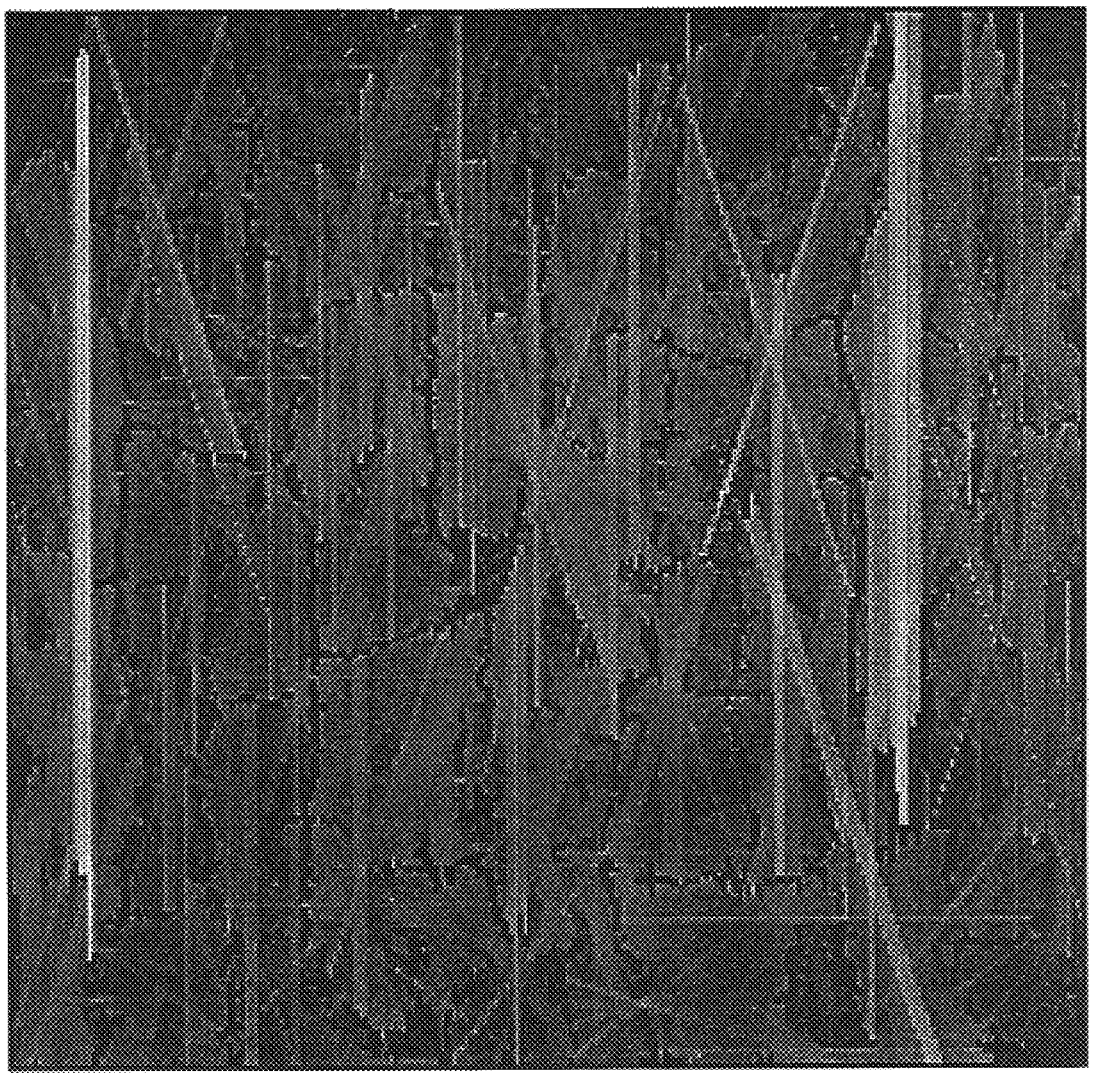
Figure 13:
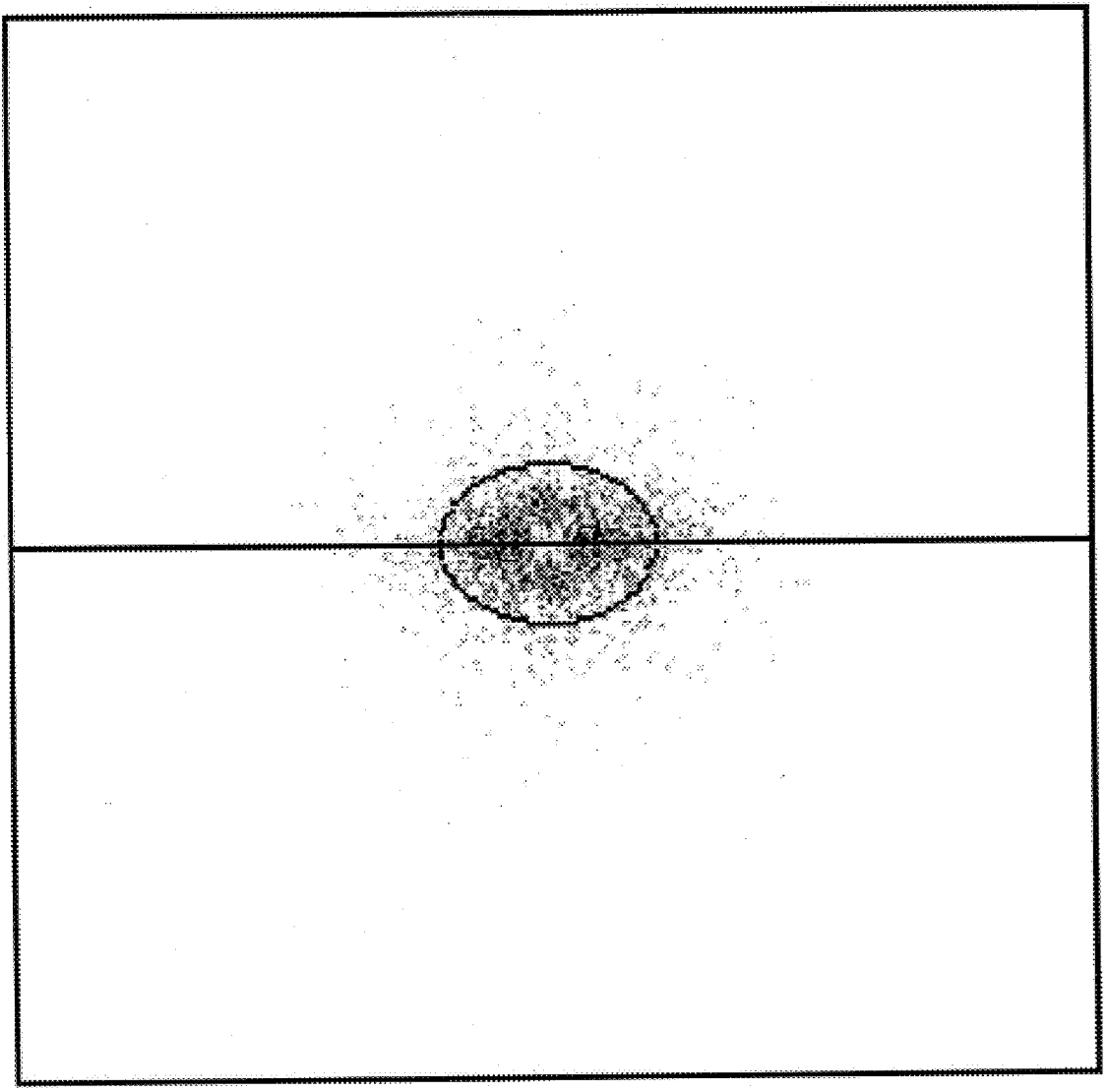
Figure 14:
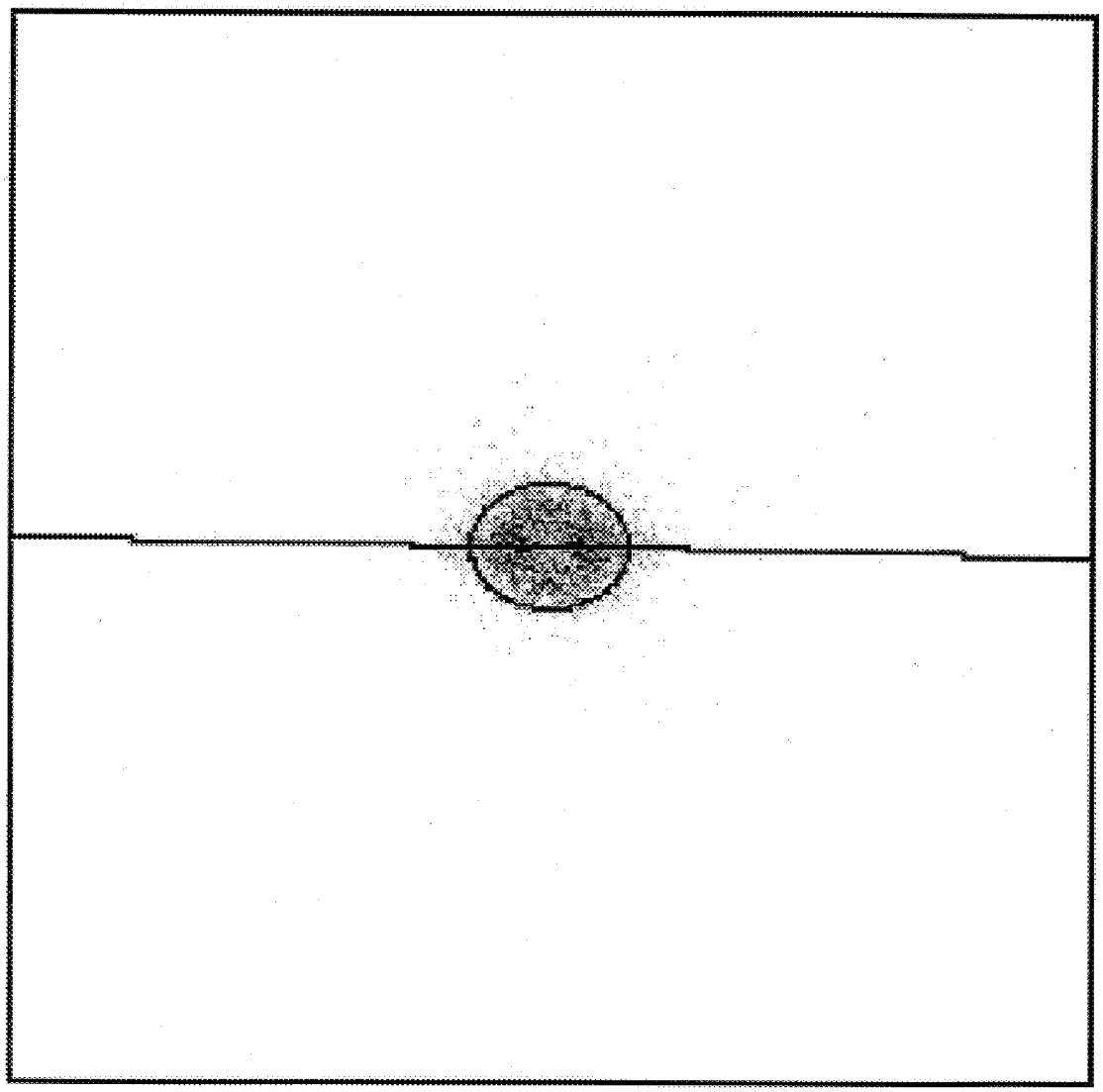
Figure 15:
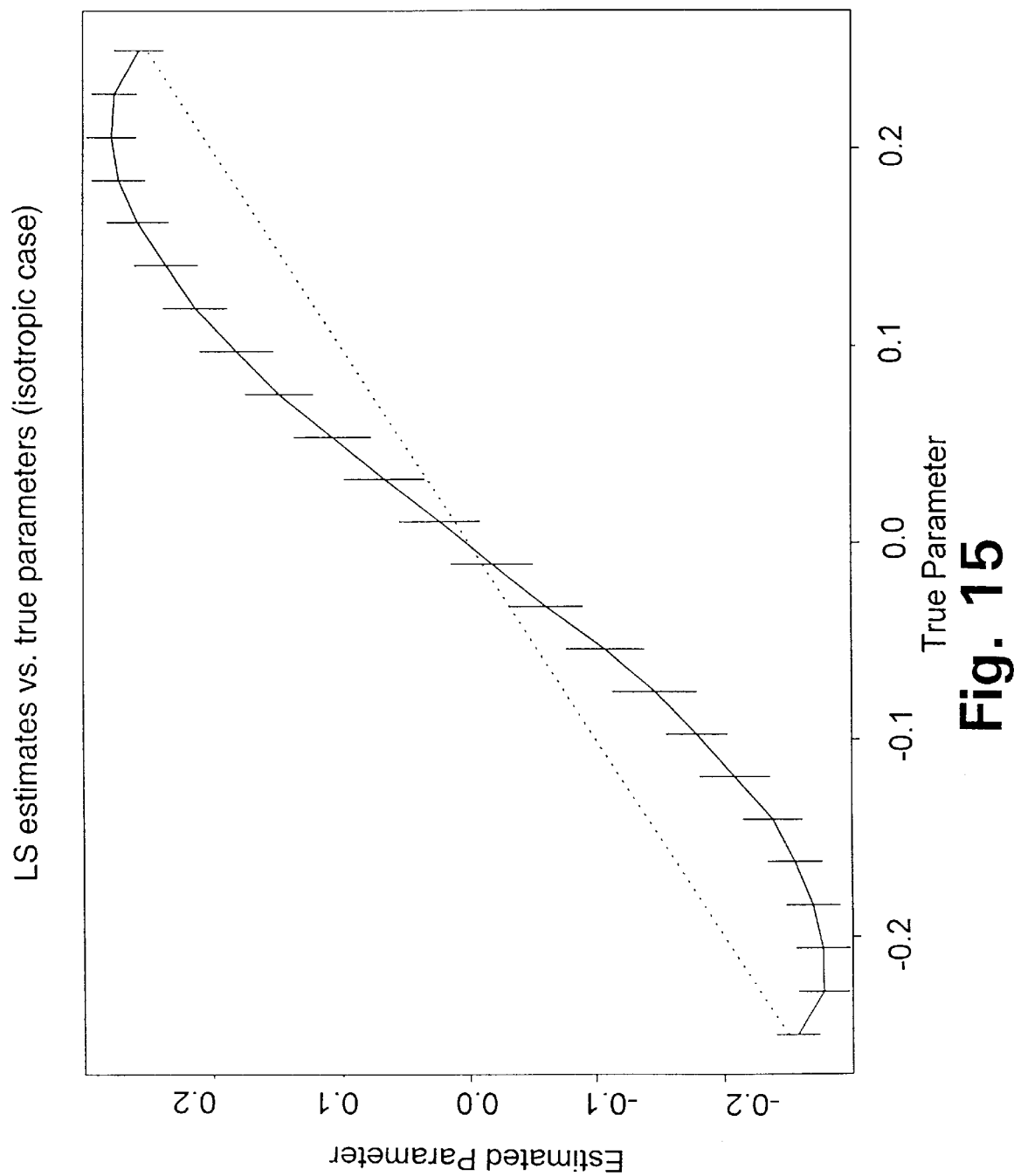
Figure 16:
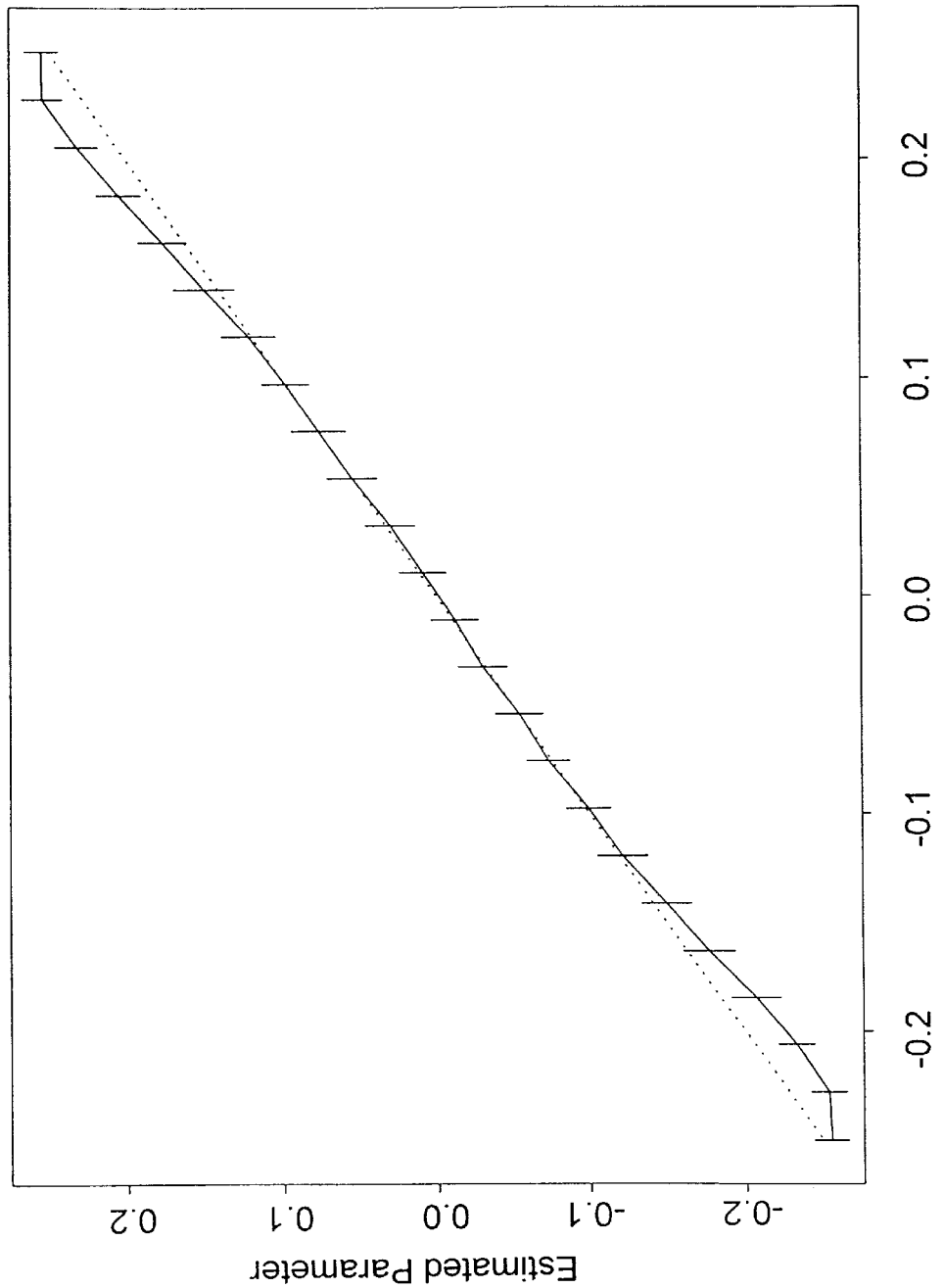
Figure 17:
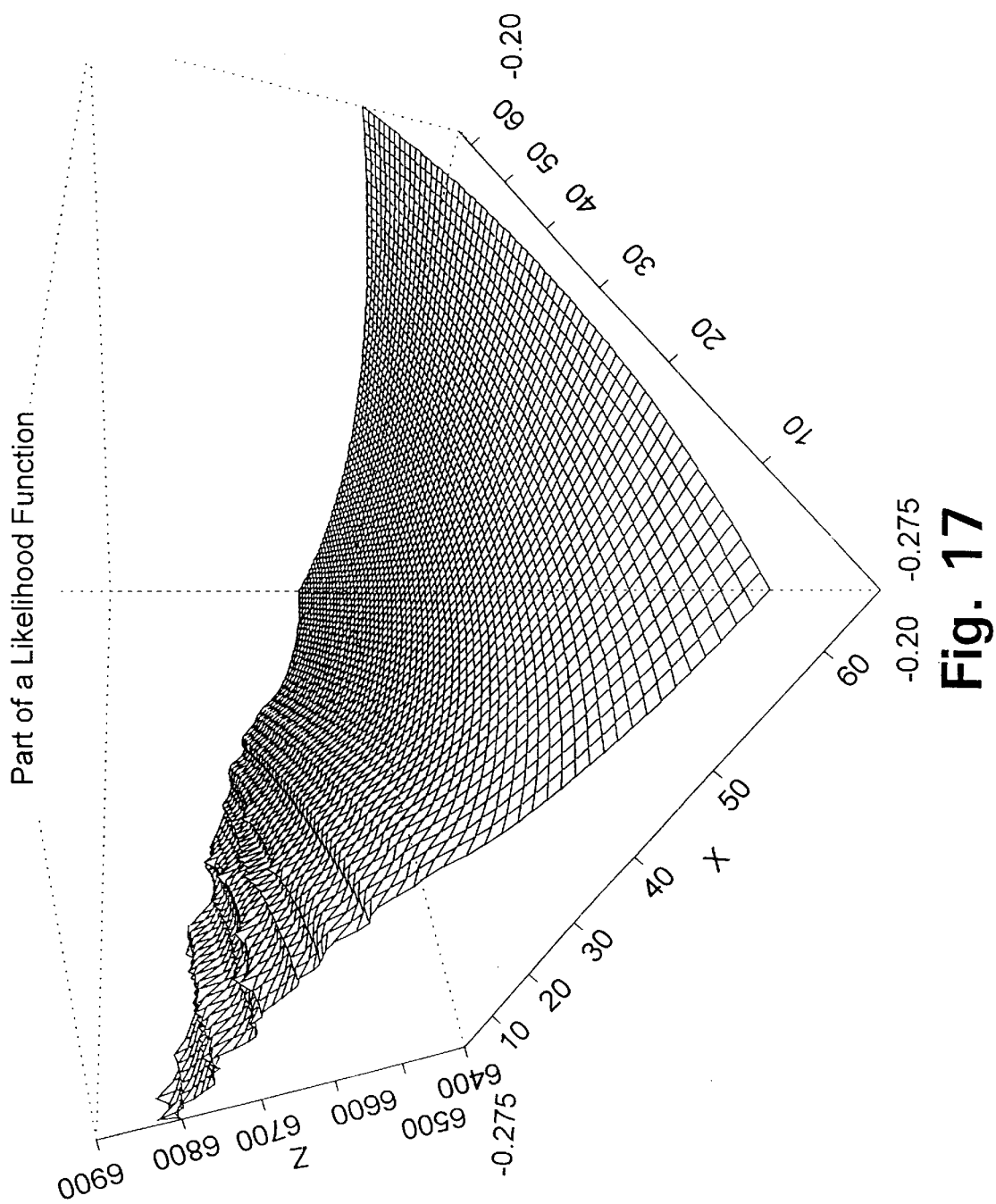
Figure 18:
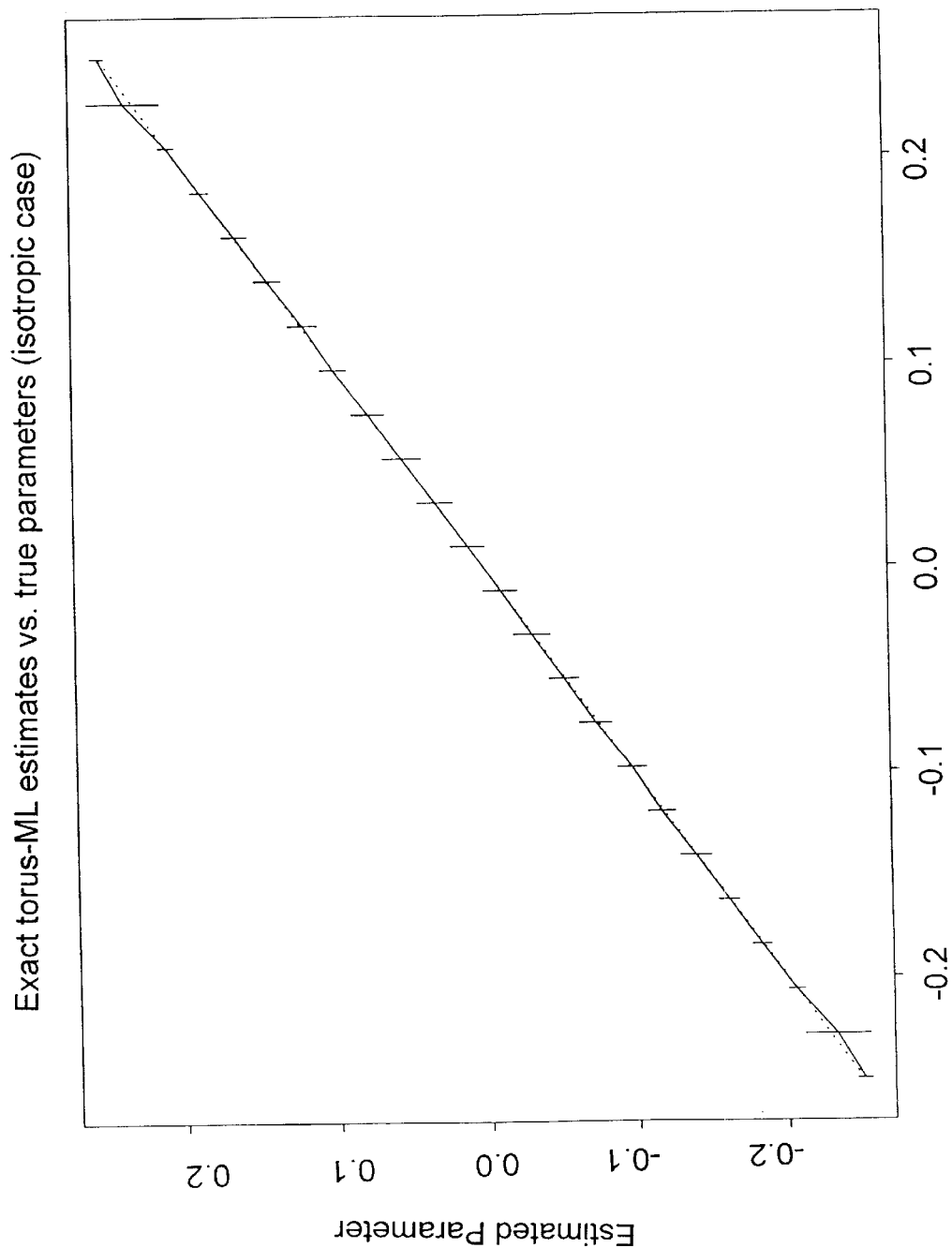
Figure 19:
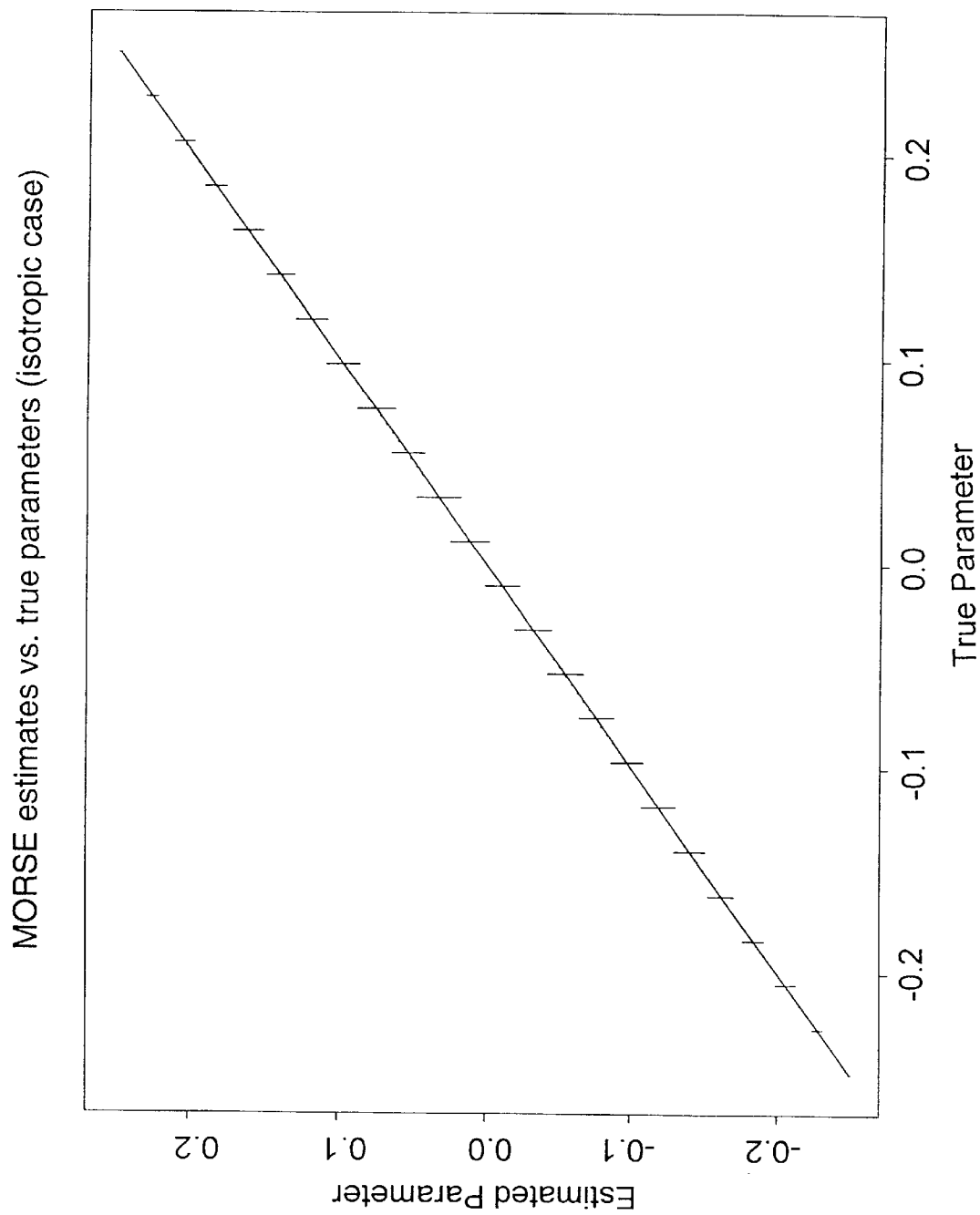
Figure 20:
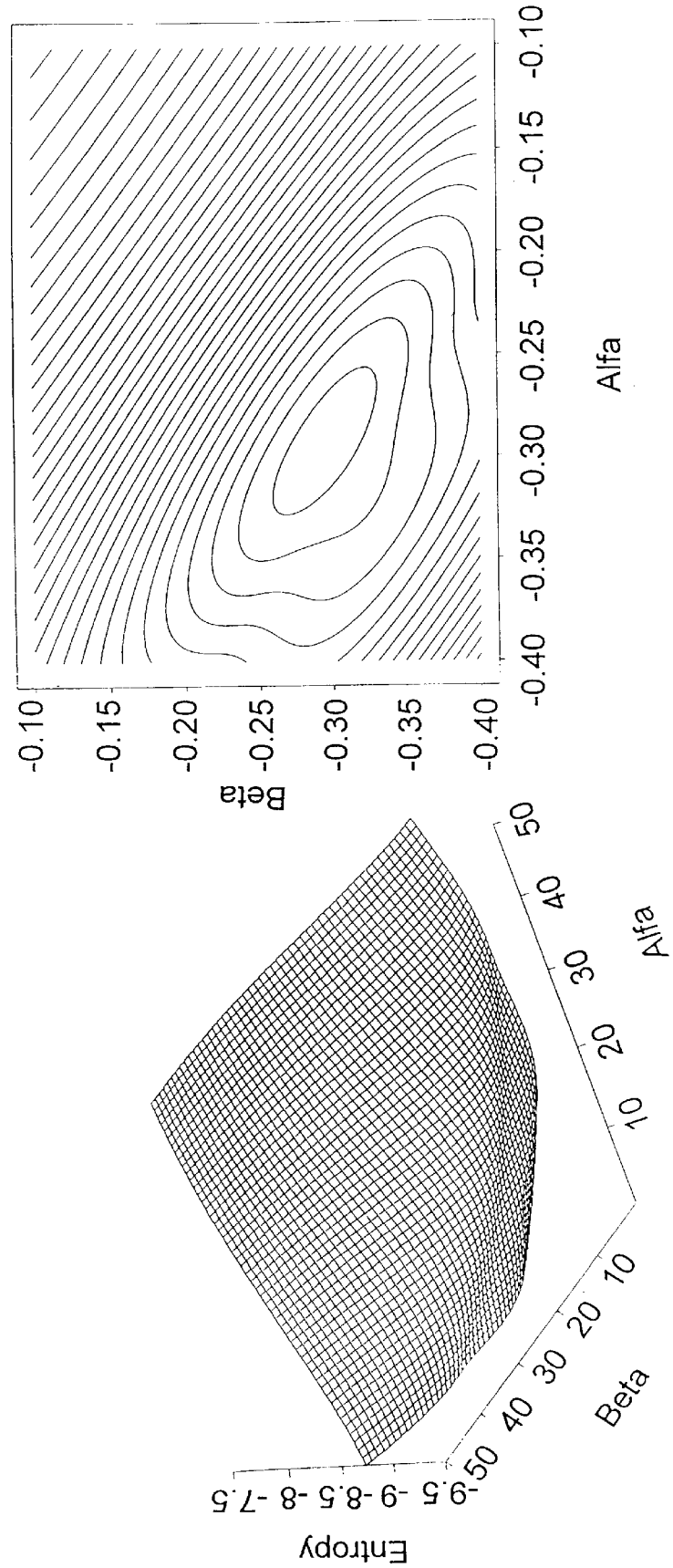
Figure 21:
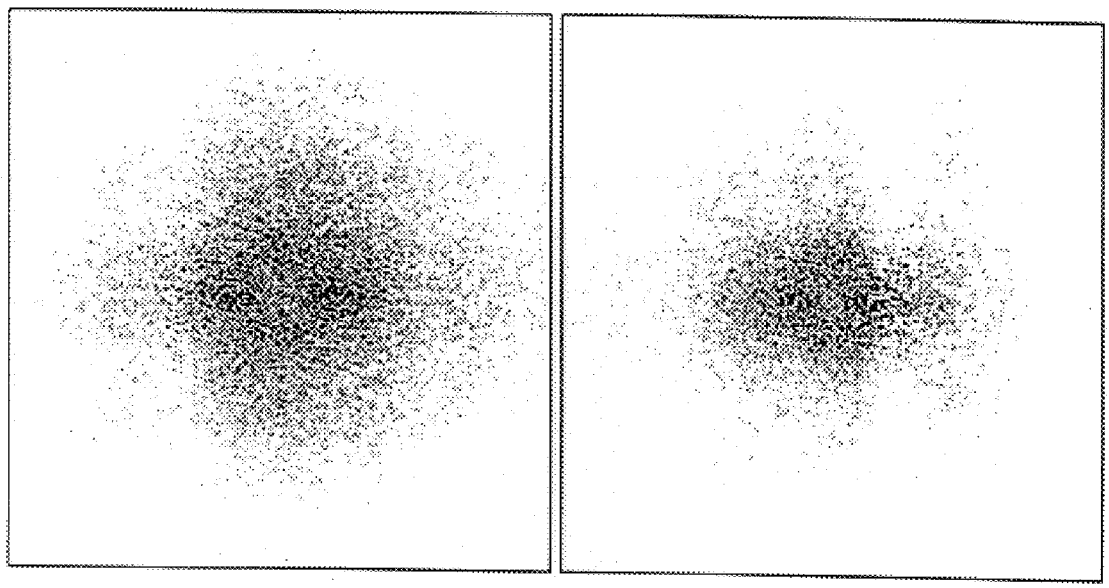
Figure 22:
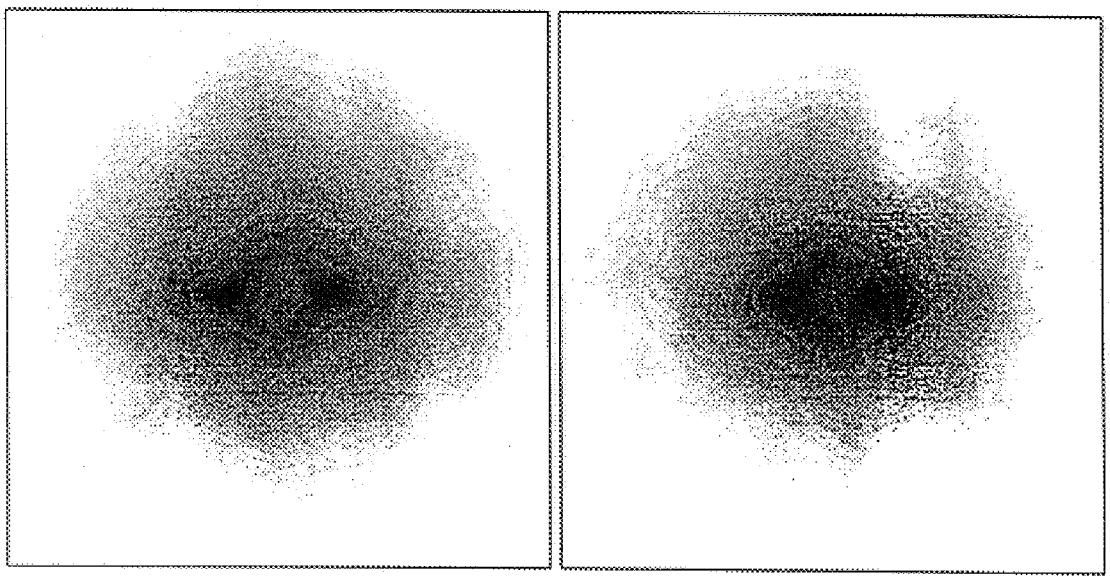
Figure 23:
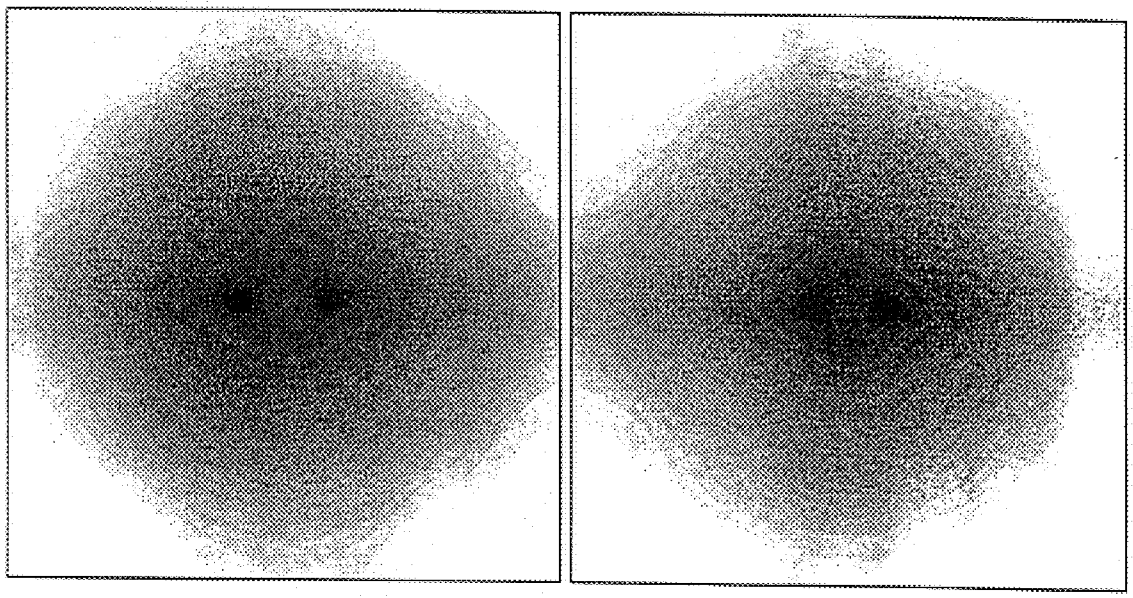
Figure 25:
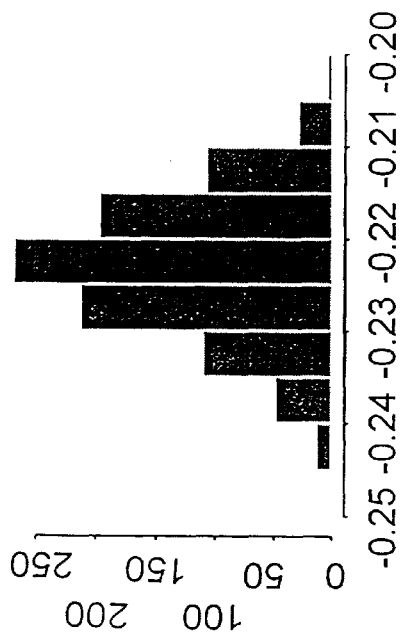
Figure 25:
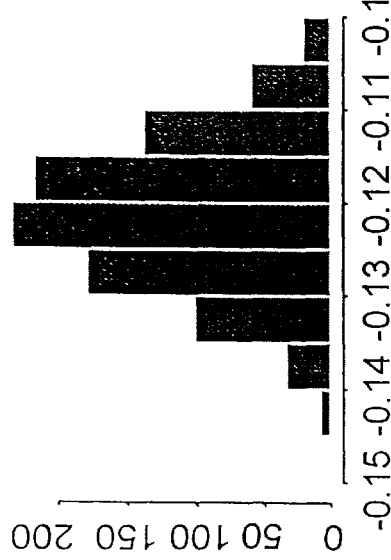
Figure 25:
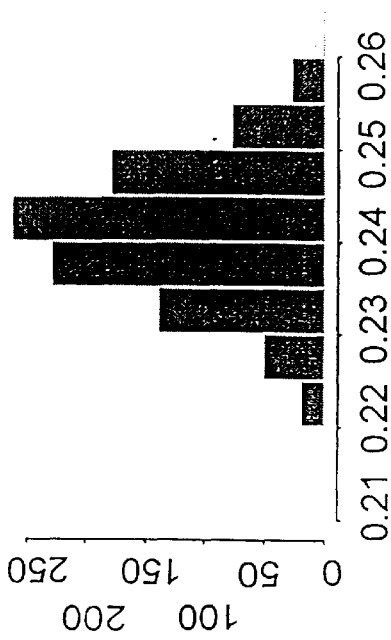
Figure 25:
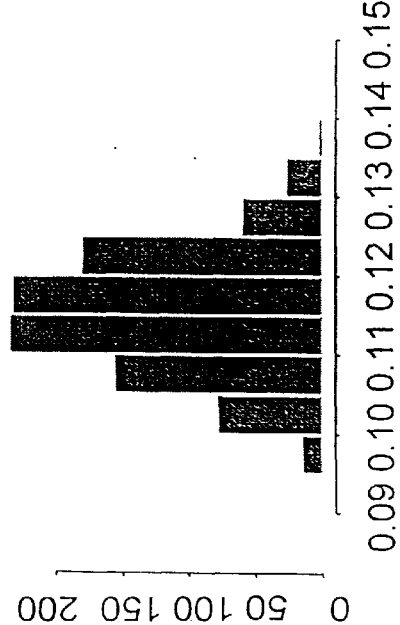
Figure 26:
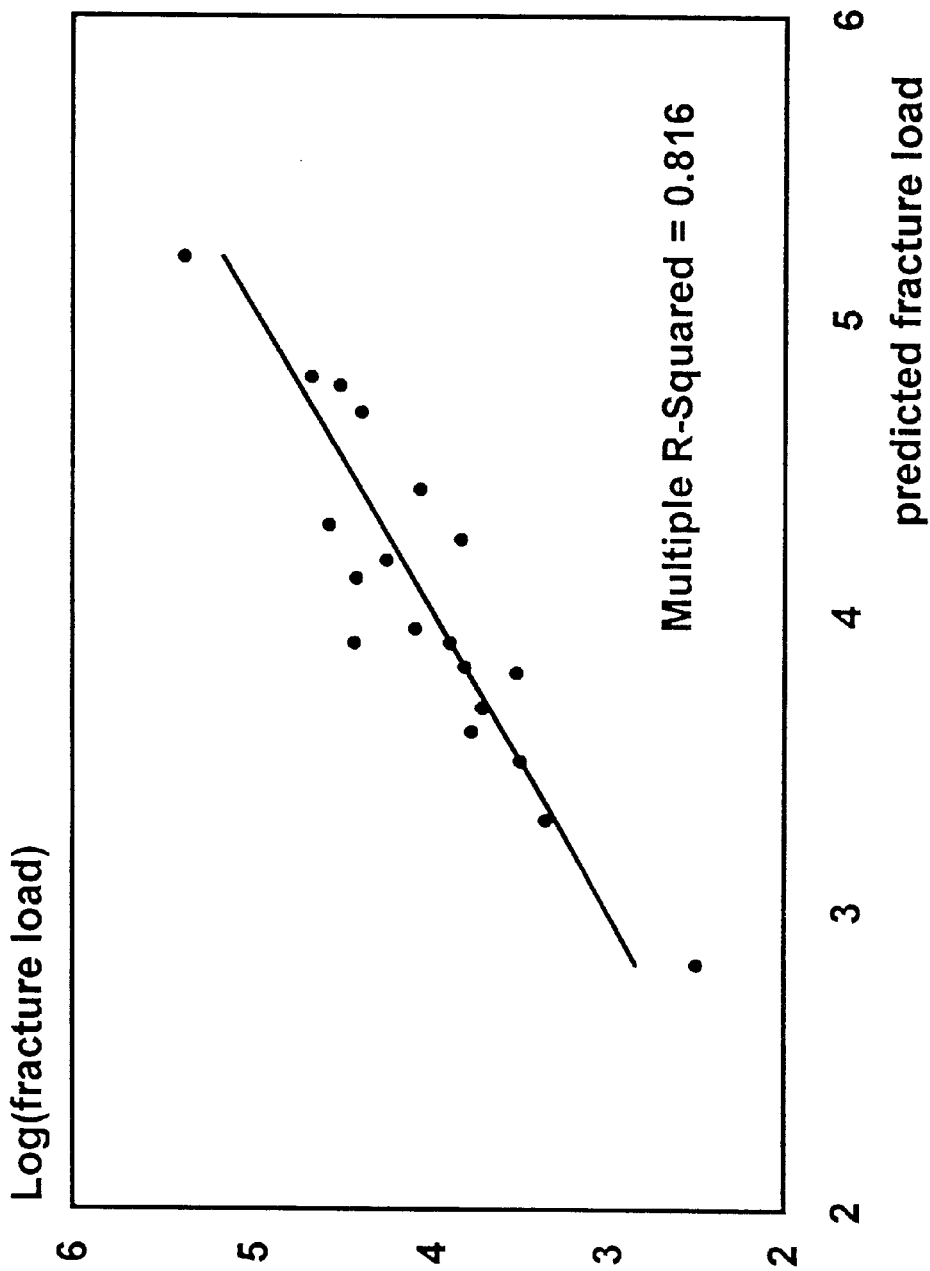
Figure 27:
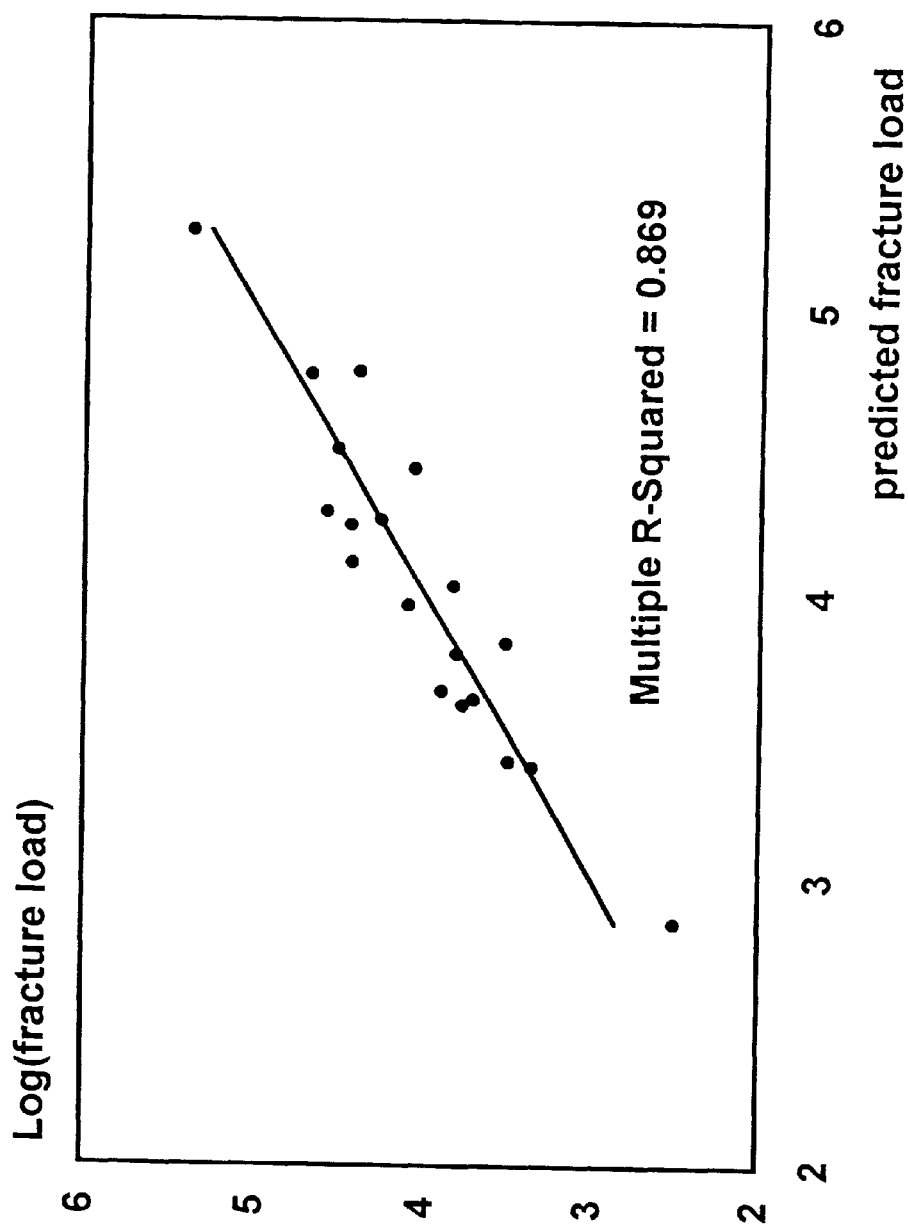
Figure 28:
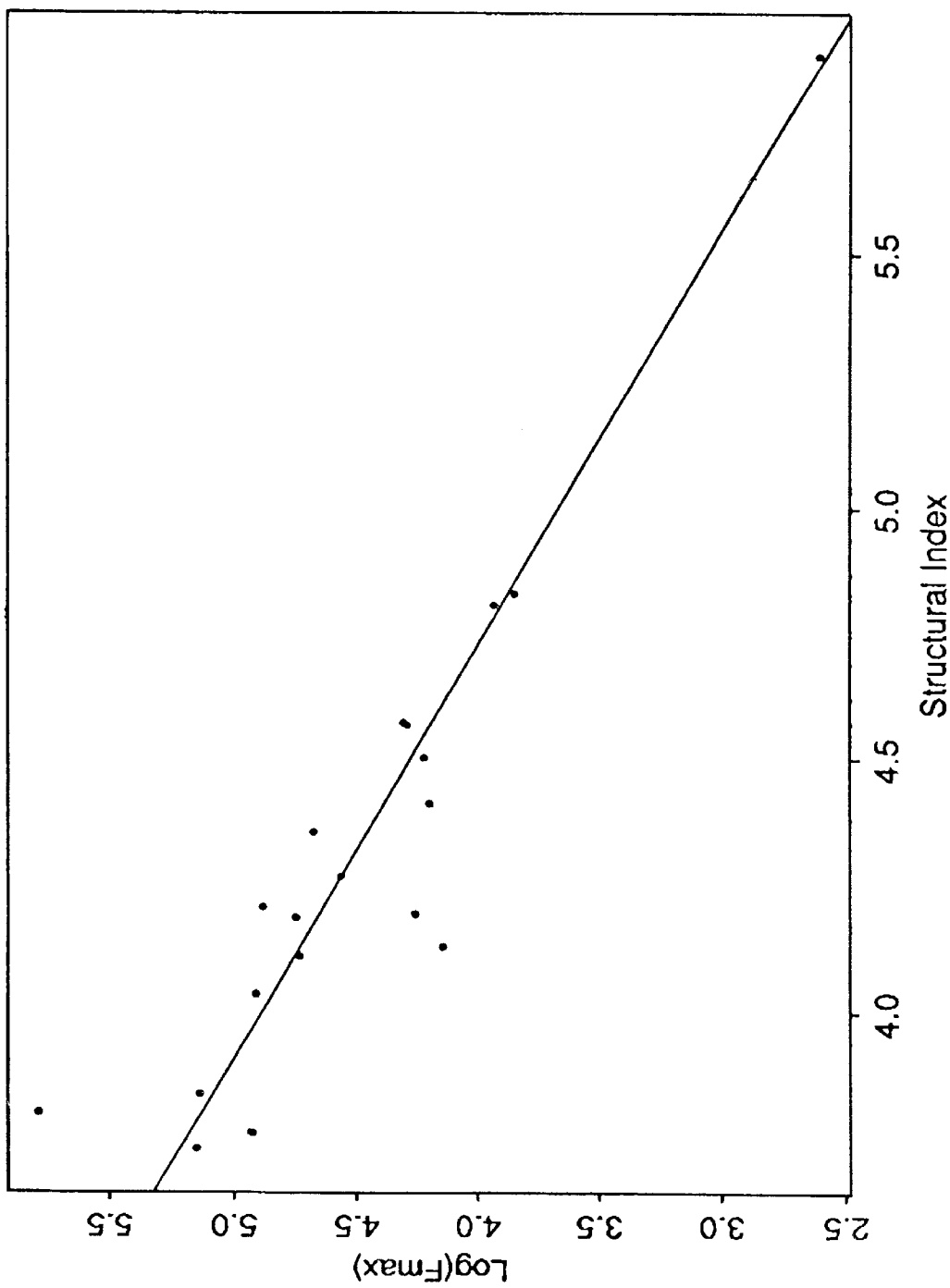

FIG. 11 shows the result of the star area transform of all background pixels in the PTP of FIG. 8, FIG. 12 shows the result of the maximum distance transform of the PTP of FIG. 8, FIG. 13 shows the smallest possible ellipse containing 70% of the spectral energy for a 'normal' patient, FIG. 14 shows the smallest possible ellipse containing 70% of the spectral energy for an osteoporotic patient, FIG. 15 illustrates the systematic bias of the LS estimates for simulated isotropic textures (the vertical lines along the curve outline the empirical confidence intervals for the mean of the estimated parameters, FIG. 16 illustrates the systematic bias of the approximative ML estimates (close to non-stationarity) for simulated isotropic textures (the vertical lines along the curve outline the empirical confidence intervals for the mean of the estimated parameters), FIG. 17 illustrates a part of the likelihood function for a first-order bilateral SAR model (given a realization of the process with the parameters $\alpha=\beta=-0.22735$. The likelihood is plotted in the interval $(\alpha,\beta)\epsilon[-0.275, -0.20]\times[-0.275, -0.20]$), FIG. 18 illustrates that good estimates may be obtained using the torus-ML estimator with the approximate ML estimates as initial values combined with a stationarity check (if a non-stationary solution model is found, the optimizer is restarted with new initial values; the vertical lines along the curve outline the empirical confidence interval for the mean of the estimated parameters), FIG. 19 illustrates that good estimates may be obtained using the MORSE estimator (the vertical lines along the curve is the empirical 95% confidence intervals for the mean of the estimated parameters), FIGS. 20A and 20B show the objective functional of the MORSE estimator close to non-stationarity (as opposed to, e.g., the ML-estimator, this objective functional is not rippled, which makes it much easier to perform the non-linear optimization), FIG. 21 illustrates the periodogram estimator of the power spectrum for a normal individual (left) and for an osteoporotic individual (right). The spectrum is shown in inverse so that the high intensity values are darker than the lower intensity values, FIG. 22 illustrates the parametric NSHP estimate of the power spectrum for a normal individual (left) and for an osteoporotic individual (right). The spectrum is shown in inverse so that the high intensity values are darker than the lower intensity values, FIG. 23 illustrates the parametric WQP estimate of the power spectrum for a normal individual (left) and for an osteoporotic individual (right). The spectrum is shown in inverse so that the high intensity values are darker than the lower intensity values, FIGS. 24A–24E summarize an experiment performed in order to describe the applicability of the MORSE estimator, FIGS. 25A–25D illustrate histograms based on parameters estimated for each of 1000 synthesized 128×128 textures, FIG. 26 illustrates optimal strengths plotted against the predicted strength, where age is not included in the model, FIG. 27 illustrates optimal strengths plotted against the predicted strength, where age is included in the model, and FIG. 28 illustrates the correlation of the logarithmic optimal fracture load and a single feature suitably chosen.

EXAMPLE 1

Textural Analysis of Bone Structure

In the following Example, a preferred embodiment of the method of the invention will be described wherein X-ray images of the distal radius and a vertebral body from the lumbar spine (L3) are restored using image processing. The restored images are used as a basis for extracting textural features that are shown to correlate well with the structure, the density and the fracture load of the trabecular bone. Several ways of extracting promising textural features are described. A model based on textural features (and possibly age and sex) is described and shown to discriminate well between osteoporotic and non-osteoporotic cases.

Obtaining Suitable Image Data

The X-ray images used in this Example were obtained using a standard X-ray instrument having a focus area of 0.6 mm$^2$, a tube voltage of 45 kV, a focus-to-foil distance of 100 cm, a single, fine X-ray foil (it should be noted that no foil is required), using a double emulsion film (it should be noted that a single emulsion film is equally applicable) and adjusting the MAS product to obtain a suitably exposed film.

The X-ray pictures were scanned into a computer using a ESKOFOT ESKOSCAN 2450 scanner capable of scanning up to 5000 lines/cm. However, at present 600 lines/cm was used. This scanner was found highly suited for the present use. A typical image is shown in FIG. 1.

The demands to a scanner suitable for this use are that it should naturally be able to transilluminate the X-ray film, it should preferably have a resolution better than the grains in the film/foil combination (so as to loose no information in the scanning procedure) and it should preferably generate grey-values of at least 8 true bits, in order to obtain a suitable dynamic range of the image data.

Spatial Texture Models

Preprocessing

In this study, only the textural information is taken into account. Therefore a sub-image is extracted in a region of the bone containing only trabecular bone, as e.g. shown in FIG. 2. Low frequent intensity variations due to, e.g., scattering of the radiation, anatomic structures as cortical bone, muscles, fat tissue of varying thickness etc., are removed by subtracting a median filtered version of the image (shown in FIG. 3) from the image itself (a technique known as "unsharp filtering"). In this case a 31×31 median filter is used. The background-corrected image is shown in FIG. 4. This image is very noisy and should be further processed prior to further transformations and subsequent feature extraction.

The noise in the image is clearly very high-frequent, whereas the information which is preferably considered (the trabecular structure) is of a more low-frequent nature.

The power spectrum of the extracted, background corrected sub-image is shown in FIG. 5. In the following, an emphasizing procedure will be described, which may not be generally applicable for removal of high-frequent noise, but tends to emphasize the dominating (in this case low-frequent) features in the images, while suppressing less dominating (in this case high frequent noise) features. This property makes it attractive for this specific purpose.

Algorithm 1

The following steps outline the restoration algorithm that removes high-frequent noise and emphasize the relevant structures in the image.

1. Perform a 2-D FFT and obtain the phase, $X_P(f_r, f_c)$, and the magnitude, $X_M(f_r, f_c)$.
2. The magnitude is raised to the power p:

$$S(f_r, f_c) = |X_M(f_r, f_c)|^p \qquad (1)$$

3. The histogram of $S(f_r, f_c)$ is stretched to match a Gaussian: $S_G(f_r, f_c)$
4. A context image, $C(f_r, f_c)$, is formed by thresholding $S_G(f_r, f_c)$ preserving T% of the pixels. Objects less than n pixels are removed from the thresholded image. (note that more than T% of the energy is preserved).
5. A 'new' magnitude image, $X_N(f_r, f_c)$, is formed using the context image and the power spectrum (not the magnitude):

$$X_N(f_r, f_c) = \begin{cases} S(f_r, f_c) & \text{if } C(f_r, f_c) = 1 \\ 0.0 & \text{otherwise} \end{cases} \qquad (2)$$

6. The new magnitude image $X_N(f_r, f_c)$ is combined with the phase image $X_P(f_r, f_c)$ and the restored image, $X_R(r,c)$, is obtained as the real part of the inverse Fourier transform. It is preferred to use thresholding in the range T=1–6 and p=1–2.

Note that the magnitude, raised to the power p, is used to form the new magnitude image. This may not be obvious, but it has been experienced that this in general provides very useful results. The reason for this is, that when the magnitude is raised to a given power larger than one, the parts of the spectrum that contain most of the energy tend to be emphasized whereas spectral components with less energy tend to be weakened further. The result of the emphasizing procedure using T=2 and p=2 is shown in FIG. 6.

Extraction of the PTP

In the following, various image transformations and textural features, extracted from transformed images, will be discussed. Several features are based upon an image subsequently referred to as the projected trabecular pattern (PTP) which is obtained as outlined below:

Algorithm 2

The steps outlined below describe the desired transformations of the restored image in order to measure a relevant set of features on the resulting PTP.

1. Perform the grey-scale morphological top-hat operation on the restored image. The top-hat operation is the original image minus an opened version of the image. This image is subsequently thresholded. The result of these operations is shown in FIG. 7.
2. This image clearly contains a lot of noise-pixels. Small isolated objects (in the present Example all objects less than 10 pixels) are removed. The resulting PTP is shown in FIG. 8.

Extraction of Statistical Features

Naturally, it is preferred to extract features that, in some sense, quantify the properties (such as structure and density) of the trabecular structure. Not surprisingly, the meshes of the PTP-net are much larger, and often broken, for osteopenic individuals than for non-osteoporotic individuals. This difference may be quantified in several ways. Such properties are, e.g., reflected in the average distance from each background pixel to the nearest foreground pixel (bone-pixel) in the projected trabecular pattern.

The size of the dark meshes in the pattern is a relevant parameter that is conveniently quantified by calculating the so-called distance transform for the projected trabecular pattern. The result of the distance transform on the PTP is shown in FIG. 9 and is denoted $X_D(r,c)$.

In addition, for each background pixel in the projected trabecular pattern, a line is drawn from the pixel, in a given direction, until a foreground pixel ('bone-pixel') is found. The distance between these pixels is measured. This is done for a fixed number of directions as illustrated in FIG. 10. After this, the average distance which is referred to as the star area, denoted $X_A(r,c)$, or the maximum star length which is denoted $X_X(r,c)$ may be calculated. These images are shown in FIG. 11 and FIG. 12 respectively.

A number of statistical moments may be calculated from the resulting images from the measured average, standard deviation, coefficient of variation and skewness for all background pixels:

$$\hat{\mu}. = \frac{1}{N} \sum_{r,c} \chi.(r, c) \qquad (3)$$

$$\hat{\sigma}. = \frac{1}{N} \sum_{r,c} (\chi.(r, c) - \hat{\mu}.)^2 \qquad (4)$$

$$c\hat{v}. = \frac{\hat{\sigma}.}{\hat{\mu}.} \qquad (5)$$

$$\hat{\gamma}. = \frac{\sum_{r,c} (\chi.(r, c) - \hat{\mu}.)^3}{\hat{\sigma}.^3} \qquad (6)$$

where the subscript denotes different transforms considered:

D: Distance transform

M: Mean value of star length

S: Standard deviation of star length

X: Maximum star length

A: Star area

We briefly outline the interpretation of the considered parameters:

The $\hat{\mu}.$ and $\hat{\sigma}.$ features are either related to the general mesh size (for D, M, A and X) or the degradation of the mesh (S). For example, larger mesh sizes are reflected in a larger value of $\hat{\mu}.$. Thus, for increasing values of $\hat{\mu}.$ and $\hat{\sigma}.$, the texture index should decrease.

The cv. feature is somewhat different. It measures the width of the empirical distribution in the transformed images. If all the distances are large, cv. would be small. The same thing would be the case, if all the distances were small. Typically, however, we find that the empirical distribution is wide, only if the PTP mesh is broken. Thus, for increasing values of $\hat{cv}.$, the texture index should typically decrease.

The $\hat{\gamma}.$ feature is also related to the mesh size. If the histogram of distances is heavier in the right side, $\hat{\gamma}.<0$. If the empirical distribution is symmetrical, $\hat{\gamma}=0$. For large meshes in the PTP, the distribution of distances would typically be skewed for large values. Thus, for increasing values of $\hat{\gamma}.$, the texture index should decrease.

Textural Features Extracted in the Spatial Frequency Domain

One would intuitively think that features measured in the frequency domain should carry relevant information about the trabecular structure. The trabecular structure for strongly osteoporotic patients is clearly more low frequent than that for 'normal' patients. In the present section, the considered Fourier features are not measured on the projected trabecular pattern. Instead, the features are measured on the spectrum of the background corrected image.

Preprocessing

Before estimating the spectrum, non-stationaries of the extracted image are removed by subtracting a 31×31 median filtered version of the image from itself as described above.

Spectral Estimation

As the main interest is directed toward the relatively low-frequent properties of the power spectrum, a weighed estimate of the dispersion may be used, where $p^*(u,v)$ is the normalized power spectrum taking a weight function into account:

$$p^*(u, v) = \frac{P(u, v) \cdot w(u, v)}{\sum_{(u,v) \neq (0,0)} P(u, v) \cdot w(u, v)} \qquad (7)$$

and $$w(u, v) = \frac{1}{u^2 + v^2} \qquad (8)$$

Given a positive definite symmetrical matrix $$\sum = \begin{pmatrix} \sigma_u^2 & \sigma_{uv} \\ \sigma_{uv} & \sigma_v^2 \end{pmatrix} \qquad (9)$$

the eigenvalues are:

$$\lambda_1 = \frac{\left(\sigma_u^2 + \sigma_v^2 + \sqrt{(\sigma_u^2 - \sigma_v^2)^2 + 4\sigma_{uv}^2}\right)}{2} \qquad (10)$$

$$\lambda_2 = \frac{\left(\sigma_u^2 + \sigma_v^2 - \sqrt{(\sigma_u^2 - \sigma_v^2)^2 + 4\sigma_{uv}^2}\right)}{2} \qquad (11)$$

and the corresponding (normalized) eigenvectors $$\underline{P_i}^T = \left( \frac{\sigma_{uv}}{\sqrt{\sigma_{uv}^2 + (\lambda_i - \sigma_u^2)^2}} ; \frac{\lambda_i - \sigma_u^2}{\sqrt{\sigma_{uv}^2 + (\lambda_i - \sigma_u^2)^2}} \right) \qquad (12)$$

An alternative estimate of the power spectrum may be obtained from the following process:

The probably best known estimator of the power spectrum is the periodogram estimator:

$$I(u, v) = \frac{1}{M^2} \left| \sum_{m=0}^{M-1} \sum_{n=0}^{M-1} y(m, n) \exp\left(-i2\pi\left(\frac{um}{M} + \frac{vn}{M}\right)\right) \right|^2 \qquad (13)$$

where (u,v) are spatial frequencies.

It is well known that this estimate is a non-consistent estimate of the power spectrum. For example, when the samples from a Gaussian white noise process are used, the periodogram estimate has a variance that is proportional to the variance of the white noise process.

One approach to variance reduction is to segment the data, such as in non-overlapping blocks, where the spectrum is estimated in each block, using this periodogram estimator, and obtaining the final estimate by averaging the periodograms of the blocks. In this manner, the variance is decreased by a factor equal to the number of blocks. Of course, this is at the expense of frequency resolution.

In the following, an iterative process is suggested for estimating the dispersion matrix, which estimate is more sensitive to the anisotropies reflected in the low frequency parts of the orientation of the texture.

Algorithm 3

The dispersion matrix of the approximating Gaussian is estimated iteratively in the following way:

1. $\Sigma_0 = I$
2. $i=1$
3. repeat
   3a. Estimate the dispersion:

$$\sum_i = \begin{pmatrix} \sigma_u^2 & \sigma_{uv} \\ \sigma_{uv} & \sigma_v^2 \end{pmatrix} \qquad (14)$$

where $$\hat{\sigma}_u^2 = \sum_u \sum_v u^2 p(u, v) w(u, v) \qquad (15)$$

$$\hat{\sigma}_v^2 = \sum_u \sum_v v^2 p(u, v) w(u, v) \qquad (16)$$

$$\hat{\sigma}_{uv} = \sum_u \sum_v uv p(u, v) w(u, v) \qquad (17)$$

and $$w(u, v) = (u, v) \sum_{i-1}^{-1} \binom{u}{v} \qquad (18)$$

3b. $i=i-1$ until $\|\Sigma_i - \Sigma_{i-1}\|_{max} < \delta$

From both these techniques, the principal direction of the power spectrum may be found using:

$$\alpha = \cos^{-1}\left( \frac{\sigma_{uv}}{\sqrt{\sigma_{uv}^2 + (\lambda_i - \sigma_u^2)^2}} \right) \qquad (19)$$

This principal direction may be used to find the ellipse with the smallest possible area, containing a fixed fraction of the energy of the original (non-weighted) power spectrum. The ellipse, rotated with the angle $\alpha$ around the origin, is expressed in polar coordinates:

$$R(\theta)^2 = \frac{a^2 b^2}{b^2 \cos^2(\theta - \alpha) + a^2 \sin^2(\theta - \alpha)} \qquad (20)$$

where a and b are the semi-major and semi-minor axis, respectively, and where the above-mentioned $\lambda$'s are the eigenvectors.

In the present Example, the semi-major and semi-minor axes may be found using the following scheme:

Algorithm 4

The steps outlined below are used to estimate the semi-major and semi-minor axis in the ellipse with the smallest possible area, containing a given fraction of the spectral energy. The angle with which this ellipse should be rotated around the origin is found as outlined above.

1. Start with the semi-minor and semi-major axis sufficiently small, e.g., a=b=10.
2. Increase a and b with one, and calculate the fraction of energy in each ellipse (rotated with the angle $\alpha$ around the origin).

3. The ellipse with the largest fraction of energy is chosen.
4. Repeat the steps 2 and 3 until the requested fraction of energy is reached.

The features considered here are the estimated values: $\hat{a}$, $\hat{b}$, $\hat{a}\cdot\hat{b}$, $\hat{b}/\hat{a}$ as well as the features $\lambda_1$, $\lambda_2$, $\lambda_2/\lambda_1$, $\rho=\sigma_{uv}/\sigma_u\sigma_v$, $\sigma_v^2/\sigma_u^2$, and:

$$\cos^{-1}\left(\frac{\sigma_{uv}}{\sqrt{\sigma_{uv}^2+(\lambda_i-\sigma_u^2)^2}}\right) \quad (21)$$

$$\frac{|\sigma_u^2-\sigma_v^2|}{\sqrt{(\sigma_u^2-\sigma_v^2)^2-4\sigma_{uv}^2}} \quad (22)$$

$$\sum_u\sum_v(u^2+v^2)p(u,v) \quad (23)$$

$$-\sum_u\sum_v p(u,v)\log(p(u,v)) \quad (24)$$

In FIG. 13, the estimated ellipse containing 70% of the energy (and the direction) is shown for a 'normal' patient. In FIG. 14, the 70% ellipse is shown for an osteoporotic patient. Clearly, the frequency content for the osteoporotic patient is a lot more low-frequent. This means that the energy is concentrated near the centre of the image and, consequently, the areas of the ellipses are very different although they contain the same fraction of energy.

Spatial Interaction Models

Above, it is described that a powerful set of features may be extracted in the spatial frequency domain. However, the performance of features extracted in the frequency domain depend heavily on the spectral estimator used. The periodogram is a non-consistent spectral estimator. This problem may be overcome by segmenting the data in non-overlapping segments, estimating the periodogram in each segment and finally averaging over these periodograms. The variance reduction is directly proportional to the number of segments. However, this is at the expense of frequency resolution.

In the following, we will consider two types of causal Simultaneous AutoRegressive (SAR) models to obtain parametric spectral estimates; the Non-Symmetrical Halfplane (NSHP) model and the Quarter-Plane (QP) model.

Assume a wide sense stationary, zero mean, stochastic process defined on a rectangular grid of pixel sites $\Omega=\{s=(s_r,s_c): 0\leq s_r\leq M, 0\leq s_c\leq N\}$, obeying a SARMA model defined as:

$$y_s + \sum_{r\in N_{AR}}\phi_r y_{s-r} = \epsilon_s + \sum_{r\in N_{MA}}\theta_r\epsilon_{s-r} \quad (25)$$

where $r=(r_r,r_c)\in N_{AR}$ or $N_{MA}$. $N_{AR}$ and $N_{MA}$ are the regions of support for the parameter arrays $\{\phi\}$ and $\{\theta\}$, respectively. We also refer to these sets a neighborsets which, in some sense, defines the order of the model.

The innovation process $\epsilon_s$ is assumed to be an IID $N(0,\Sigma_\epsilon^2)$ or Gaussian white noise sequence. If $N_{MA}=\Phi$, we have a pure SAR model, and if $N_{AR}=\Phi$, we have a pure SMA model.

In the following, we will focus on pure autoregressions, for the following reasons: The use of mixed SARMA models would probably give more parsimonious models, but the models required to capture the nature of the considered texture are of a such low order that parsimony in not really an important issue. It also turns out that the important feature presently is the shape of the spectrum in terms of e.g. peak locations. Also, the LS estimator for the pure SAR model is a set of linear equations, whereas non-linear optimization is required in order to obtain estimates of mixed SARMA models.

The (non-normalized) spectral density function is given as the squared modulus of the frequency response function multiplied by the noise variance:

$$P_y(f) = \sigma_\epsilon^2\left|1 + \sum_{r\in N_{MA}}\phi_r\exp(-2\pi i\cdot r^T\cdot f)\frac{1}{\left|1+\sum_{r\in N_{AR}}\phi_r\exp(-2\pi i\cdot r^T\cdot f)\right|^2}\right|^2$$

$$= \sigma_\epsilon^2(1+\underline{\theta}^T\underline{C}(N_{MA})_f(N_{MA})_f)^2 + \frac{(\underline{\theta}^T\underline{S}(N_{MA})_f(N_{MA})_f)^2}{(1+\underline{\theta}^T\underline{C}(N_{AR})_f(N_{AR})_f)^2+(\underline{\theta}^T\underline{S}(N_{AR})_f(N_{AR})_f)^2} \quad (26)$$

where the spatial frequencies $(f_r,f_c)=f\in\Omega_f$, and $$\Omega_f = (f=f_r,f_c) = \left(-\frac{1}{2}-\frac{r}{M},-\frac{1}{2}+\frac{c}{M}\right):(r,c)\in\Omega \quad (27)$$

The vector notation is defined as:

$$\phi=\text{col}[\phi_r,r\in N_{AR}] \quad (28)$$

$$\theta=\text{col}[\theta_r,r\in N_{MA}] \quad (29)$$

$$C(N.)_f=\text{col}[\cos(\omega(f,r)),r\in N.] \quad (30)$$

$$S(N.)_f=\text{col}[\sin(\omega(f,r)),r\in N.] \quad (31)$$

$$\omega(f,r)=2\pi(r_r\cdot f_r+r_c\cdot f_c) \quad (32)$$

So far, the question of causality has not been addressed. In two dimensions, the notion of causality is not natural. Abandoning causality, however, leads to a number of difficulties, one of them being that the Least Squares estimator of the parameters is no longer consistent. Hence, it has become popular to impose an artificial directionality on the image, thus obtaining a causal model (in fact, recursively computatable is a more correct term).

The two types of causal models typically considered in the literature are the Quarter Plane support models (QP) and the Non-Symmetrical HalfPlane support models (NSHP). In FIG. 21, parametric estimates using the NSHP model are illustrated. It is seen that the spectrum is slightly elongated in a certain direction, when compared to the corresponding periodogram estimate seen in FIG. 22. This phenomenon is due to directional bias which is an effect that is even more pronounced for the QP mode. In order to solve this problem, a Weighted QP (WQP) estimator has been proposed:

$$P_{AV}(f_r, f_c) = \frac{2}{\frac{1}{p_{++}(f_r, f_c)} + \frac{1}{p_{-+}(f_r, f_c)}} \quad (33)$$

where the subscripts ++ and −+ simply refer to the considered quadrant, i.e. the first and the second quadrant. This parametric estimator is widely considered to be among the best parametrical spectral estimators, but it suffers from the drawback that it has no model interpretation.

In FIG. 23, a WPQ estimate is illustrated in which no directional bias is seen.

Using these estimates, features of the type described above, that is: $\lambda_1, \lambda_2, \lambda_2/\lambda_1, \rho = \sigma_{rc}/\sigma_r\sigma_c, \sigma_c^2/\sigma_r^2$, and:

$$\alpha = \cos^{-1}\left(\frac{\sigma_{rc}}{\sqrt{\sigma_{rc}^2 + (\lambda_i - \sigma_r^2)^2}}\right) \quad (34)$$

$$\frac{|\sigma_r^2 - \sigma_c^2|}{\sqrt{(\sigma_r^2 - \sigma_c^2)^2 - 4\sigma_{rc}^2}} \quad (35)$$

$$\sum_{f_r}\sum_{f_c}(f_r^2 + f_c^2)p(f_r, f_c) \quad (36)$$

$$-\sum_{f_r}\sum_{f_c}p(f_r, f_c)\log(p(f_r, f_c)) \quad (37)$$

may be used.

Also, as $\alpha$ describes the principal orientation of the approximating Gaussian, this direction may be used to find the above-mentioned energy ellipses. Thus, also the semi-major and semi-minor axes of these ellipses â and b̂, respectively as well as the features â·b̂, b̂/â may be used.

Extraction of Features Relating to Periodicity

An alternative method of deriving features from the preprocessed image of FIG. 6 is to again subject this image to the two dimensional Fourier transformation and extract the Fourier power spectrum (the periodogram spectrum).

It is presently preferred that the resolution of the image is reduced using a Gaussian pyramid, thus, preserving as much of the information as possible in the high resolution prior to the Fourier transform.

Feature Extraction

It is not surprising that the power spectrum comprises peaks corresponding to periodicity of the vertical trabeculae. It is, however, fortunate that also peaks—however small—corresponding to a periodicity of the horizontal trabeculae may be discerned from the power spectrum.

Information relating to the density of trabeculae, their thickness and the distance between them may be extracted from the height of these peaks relating to the periodicities, the total area under these peaks and/or the "width" thereof.

At present, it is preferred not to extract the peak positions from the Fourier power spectrum, as the periodogram or the power spectrum are very noisy due to the fact that the periodogram estimator of the power spectrum is non-consistent. Instead, a combined algorithm is preferred, where the parametric spectrum is used to identify these peak positions, and the smoothed periodogram is used to estimate the associated energy etc.

In the power spectrum, a total of four peaks are typically present—or more precisely, only two peaks, as the parametric spectrum is symmetric. A line is drawn through the two largest peaks (which relate to the vertical trabeculae) through the DC-value. From the middle of this line, a line is drawn perpendicularly thereto also through the DC-value. It is inherent from the model that the peaks of the horizontal trabeculae are positioned perpendicularly to those of the vertical trabeculae. The maxima on the new line will correspond to the peaks of the horizontal trabeculae.

This method is preferred in order to be independent and insensitive to any rotation of the image.

Smoothing of the spectrum may be performed using a k×k kernel, such as a 5×5 kernel using, e.g., a mean filter, a median filter, a Gaussian filter etc.

From this spectrum, the peak heights, the volume under the peaks a.s.o. may be determined and used in the prediction of the bone quality.

In addition, it is contemplated that also the curvature of the peaks in the parametric power spectrum may be used as a predictor of bone quality, as this curvature also relates to deviations of the periodicity.

EXAMPLE 2

Study of Feature Performance

A data set was used to investigate different image features and compare their performance. Radiographic images were obtained from 97 individuals and each image was ranked by experienced radiologists. The analysis of this data set is described in the following.

Each patient was assigned the score +1 if the radiologist considered the patient to be 'normal' and the score −1 in case of accelerated bone loss (osteoporotic). The four radiologists agreed upon the diagnosis in 52 cases, and only these are used in this preliminary study. In this study of feature performance, a general linear model with the score as response variable and age, sex and textural features as explanatory variables is used. Furthermore, rigorous statistical tests of the significance of the individual features is performed using a backwards elimination procedure.

The features used have been described above, and are all based on first, second and third order statistics measured on transforms of the projected trabecular pattern (PTP) or fitted ellipses on the Fourier power spectrum of the restored images.

The fitted models are of the type $$s_i = \beta_0 + \beta_1 age_i + \beta_2 sex_i + \beta_3 f_{1,i} + \ldots + \epsilon_i \quad (38)$$

where $s_i$ is the score of the i'th patient, $age_i$ the age of the i'th patient, $sex_i$ the sex of the i'th patient (+1: Male, −1: Female in order to make both sexes contribute equally to the mean) and $f_{j,i}$ the j'th image feature of the i'th patient. It is assumed that $\epsilon$ is i.i.d. gaussian white noise. Under this assumption, the LS estimates are equal to the ML estimates. Test statistics are calculated for each parameter in the model. Using a backwards elimination approach, the least significant parameter of the model is eliminated, and the model is subsequently re-estimated with the remaining parameters. This is continued until no more parameters can be eliminated from the model.

Features Based on the Projected Trabecular Pattern

Out of 12 image features, 9 were eliminated using the backwards elimination procedure. The order in which they were eliminated is summarized in the table below:

| Feature number | Feature name | 1 | 2 | 3 | 4 | 5 | 6 | 7 | 8 | 9 |
|---|---|---|---|---|---|---|---|---|---|---|
| 1* | $\mu_D$ | | | | | | | | | |
| 2 | $\sigma_D$ | | | | | • | | | | |
| 3³ | $cv_D$ | | | | | | | | | |
| 4 | $\gamma_D$ | | | • | | | | | | |
| 5 | $\mu_S$ | | | | | • | | | | |
| 6* | $\sigma_S$ | | | | | | | | | |
| 7 | $cv_S$ | • | | | | | | | | |
| 8 | $\gamma_S$ | | | | • | | | | | |
| 9 | $\mu_M$ | | | | | | | • | | |
| 10 | $\sigma_M$ | | | | | | | | • | |
| 11 | $cv_M$ | | • | | | | | | | |
| 12 | $\gamma_M$ | | | | | | | | | • |

The boldfaced features marked with an asterisk are significant parameters that could not be eliminated.

The resulting model is given by $$s_i = \beta_0 + \beta_1 \text{age}_i + \beta_2 \text{sex}_i + \beta_3 \mu_{D,i} + \beta_4 cv_{D,i} + \beta_5 \sigma_S + \epsilon_i \quad (39)$$

A summary of the resulting model is given below:

Call: lm(formula = score[idx4] ~ age +0 sex[idx4] + f[idx4, 1] + f[idx4, 3] + f[idx4, 6])

| Residuals: | | | | |
|---|---|---|---|---|
| Min | 1Q | Median | 3Q | Max |
| −3.755 | −0.8549 | −0.06046 | 0.7199 | 3.854 |

| Coefficients: | | | | |
|---|---|---|---|---|
| | Value | Std. Error | t value | Pr(>|t|) |
| (Intercept) | 50.2650 | 12.2399 | 4.1067 | 0.0002 |
| age | −0.0995 | 0.0141 | −7.0427 | 0.0000 |
| sex[idx4] | 1.1937 | 0.2579 | 4.6281 | 0.0000 |
| f[idx4, 1] | −11.7739 | 2.3699 | −4.9681 | 0.0000 |
| f[idx4, 3] | −37.2419 | 11.0728 | −3.3634 | 0.0016 |
| f[idx4, 6] | 2.7775 | 1.2370 | 2.2454 | 0.0297 |

Residual standard error: 1.746 on 45 degrees of freedom
Multiple R-Squared: 0.7516

| Correlation of Coefficients: | | | | | |
|---|---|---|---|---|---|
| | (Intercept) | age | sex[idx4] | f[idx4, 1] | f[idx4, 3] |
| age | 0.0063 | | | | |
| sex[idx4] | −0.1329 | 0.2430 | | | |
| f[idx4, 1] | −0.6991 | −0.1573 | −0.0231 | | |
| f[idx4, 3] | −0.9837 | −0.0538 | 0.1220 | 0.7305 | |
| f[idx4, 6] | −0.0287 | 0.1205 | 0.1072 | −0.6269 | −0.0918 |

Most of the explanatory effect is contained in the age and the sex. The rest of the variability (approximately 16% point) is explained by the textural features. It may be desired to transform some of the features, or even derive new ones.

From the above, it may be concluded that the considered statistics measured on at least the distance transform and the star area of the projected trabecular pattern, are quite strong features. This investigation, however, does not suggest the maximum distance transform as an optimal feature.

Fourier Features

In the following, four features extracted from the power spectrum will be considered. The only feature eliminated from this set of features is the length of the semi-major axis (â). This is in good agreement with what would be expected, as the erosion of the trabecular structure in osteoporotic patients is mainly in the vertical direction. The performance of the resulting model is comparable to the results obtained using features based on the distance transform.

Again the data were analyzed in the statistical software package Splus, and the following output was obtained for the resulting model:

| Residuals: | | | | |
|---|---|---|---|---|
| Min | 1Q | Median | 3Q | Max |
| −2.852 | −1.114 | −0.3153 | 0.6817 | 4.854 |

| Coefficients: | | | | |
|---|---|---|---|---|
| | Value | Std. Error | t value | Pr(>|t|) |
| (Intercept) | 8.1977 | 2.9152 | 2.8120 | 0.0073 |
| ages[idx4, 2] | −0.1086 | 0.0153 | −7.1036 | 0.0000 |
| sex[idx4] | 1.2674 | 0.2711 | 4.6747 | 0.0000 |
| freq[idx4, 2] | 8.6433 | 2.5788 | 3.3516 | 0.0016 |
| freq[idx4, 3] | −0.2102 | 0.0660 | −3.1845 | 0.0026 |
| freq[idx4, 4] | −88.6948 | 24.0649 | −3.6857 | 0.0006 |

Residual standard error: 1.843 on 45 degrees of freedom
Multiple R-Squared: 0.7232

| Correlation of Coefficients: | | | | | |
|---|---|---|---|---|---|
| | (Intercept) | ages[1dx4, 2] | sex[idx4] | freq[idx4, 2] | freq[idx4, 3] |
| ages[idx4, 2] | 0.0165 | | | | |
| sex[idx4] | 0.0103 | 0.2150 | | | |
| freq[idx4, 2] | −0.2471 | −0.1272 | 0.1435 | | |
| freq[idx4, 3] | 0.2189 | 0.1303 | −0.1491 | −0.9972 | |
| freq[idx4, 4] | 0.1145 | 0.0866 | −0.1543 | −0.9880 | 0.9845 |

Thus, from the results of the above it may be seen that a Multiple Correlation Coefficient better than 0.7 may be obtained using only either the features extracted from the power spectrum or the features extracted from the PTP; only part of the features offered by the method of the invention. Thus, it is contemplated that even higher Multiple Correlation Coefficient may be expected when these groups of features are combined in the estimation procedure. In this connection it should be mentioned that Multiple Correlation Coefficients of this size are quite satisfactory.

EXAMPLE 3

The MORSE Estimator for Mixed Non-causal SARMA Models

The concept of texture is widely recognized as being of great importance in many fields of application, such as, e.g., medical imaging, industrial quality inspection and remote sensing. Visual properties of a given texture are, however, not very tangible and many attempts has been made to extract good and meaningful features in order to describe such properties.

One such approach is to model the spatial correlation structure using texture models. The two mainstream types of models are the Gaussian Markov Random Field (GMRF) models and the Simultaneous Auto-Regressive Moving Average (SARMA) models. The latter type of models is an attempt to extend the very powerful ARMA models (known from time-series analysis and 1-D signal processing) to two dimensions.

Whereas 1-D signals are inherently causal, this is not a natural constraint in two dimensions. Abandoning causality, however, introduces severe problems in important modelling steps as identification and estimation. Therefore, it is very popular to impose an artificial directionality on data and thereby obtaining consistent estimates by minimizing the sum of squared estimation errors—i.e. Least Squares estimates.

The analysis of non-causal SARMA models has been severely constrained, mainly due to the fact that the non-consistency of the LS estimator forces one to consider a very complicated Likelihood function. As a consequence, the analysis has been concentrated solely on pure SAR models. The toroidal ML estimator and an approximative ML estimator has been formulated for pure SAR models. It can be shown that the performance of the approximative estimator may not be adequate when the considered textures is close to non-stationarity.

Considering the exact ML estimates for toroidal SAR models will, in general, give very good results. It is shown, however, that the likelihood function is extremely rippled in the vicinity of non-stationarity. This will, in many cases, cause the optimization routine to get 'caught' in a suboptimal solution. This problem may indeed be serious as visual textures are often characterized by a strong positive correlation structure yielding estimates close to non-stationarity.

Another problem, which is related to the Maximum Likelihood estimator and the traditional Maximum Entropy estimators, is that these tend to overemphasize the high-frequency content of the considered.

Thus, a new, entropy based, estimator is introduced. Instead of maximizing the entropy of the associated model spectrum (as in MEM spectral estimation introduced in "A new algorithm for two-dimensional maximum entropy power spectrum estimation" Lim, J. S. & Malik, N. A. (1981) IEEE Transactions on Acoustics, Speech and Signal Processing, 29, 401–413), the entropy of the residual spectrum is maximized. This estimator is named the MORSE estimator (Maximum Of Residual Spectral Entropy). This estimator is well behaved, even close to non-stationarity, which makes it much simpler to perform the non-linear optimization of the involved objective functional (w.r.t. the parameters). It is possible to write the objective functional for mixed SARMA models (i.e. including Moving Average parts) and obtain very good estimates. To the best of our knowledge there are no results in the literature regarding inference in non-causal SARMA models.

The maximization of the residual spectral entropy seems, intuitively, to be a reasonable criterion as the underlying assumption of the simultaneous models is that the innovation process is white. It is obvious that the optimality of a given model is closely related to the chosen criterion of optimality, and the choice of entropy is by no means the only one to be imagined. Note that no assumptions are made concerning the driving noise (innovation process ????) sequence. We only require it to have a symmetrical distribution.

The Non-causal SARMA Model

Consider a wide sense stationary, zero mean bilateral SARMA process sampled on a square M×M grid of pixels $s=(r,c)\in\Omega$ $$y_s + \sum_{r \in N_{AR}} \phi_r y_{s-r} = \epsilon_s + \sum_{r \in N_{MA}} \theta_r \epsilon_{s-r} \qquad (40)$$

where $r=(r_l,r_r) \in N$. and N. defines the order of the model. The only assumption that is made about the innovation process $\{y.\}$ is that it is independent identically distributed random variables with a symmetrical density.

Contrary to the GMRF models, the bilateral SARMA model does not have to be symmetrical, but opposite neighbors must be associated with identical parameters (i.e. $\phi_r=\phi_{-r}$. This is necessary to ensure the identifiability of the parameters. For the sake of simplicity, the following is restricted to consider only symmetrical models.

In order to facilitate the notation when it is desired to be specific about the order of the model, the notation outlined in the following definitions is introduced:

Definition 1

A rectangle with side lengths 2a+1 and 2b+1, rotated by an angle $\alpha$ around the origin is denoted $R(a,b,\alpha)$. Now the following is defined R(a,b)=R(a,b,0)

R(a)=R(a,a,0)

Definition 2

An ellipse with semi-major axis a and semi-minor axis b, rotated by an angle $\alpha$ around the origin is denoted $\epsilon(a,b,\alpha)$. The following is defined E(a,b)=E(a,b,0)

E(a)=E(a,a,0)

Thus, the order of a given model may be defined in terms of these geometrical shapes as, e.g., SARMA(E(1),E(1)) which means that the auto-regressive part, as well as the moving average part, is the four nearest neighbors.

If the bilateral model is considered, the stationarity condition is greatly weakened; all that is required is that no poles of the transfer function falls on the unit circle:

$$\left\{ 1 + \sum_{(m,n) \in N_{AR}} \phi_{m,n} z_r^{-m} z_c^{-n} \neq 0 \right\} \qquad (43)$$

for all $|z_r|=1$ and $|z_c|=1$.

The transfer function is given as the 2-D z-transform of the impulse response function.

$$H(z_r, z_c) = \frac{X(z_r, z_c)}{E(z_r, z_c)} = \frac{1 + \sum_{(k,l) \in N_{MA}} \theta_{k,l} z_r^{-k} z_c^{-l}}{1 + \sum_{(k,l) \in N_{AR}} \phi_{k,l} z_r^{-k} z_c^{-l}} \quad (44)$$

and the frequency response function is obtained as the 2-D Fourier transform of the impulse response function $$\mathcal{H}(f(s)) = \frac{\left(1 + \underline{\Theta}_{MA}^T \underline{C}(N_{MA})_{f(s)}\right)}{\left(1 + \underline{\Theta}_{AR}^T \underline{C}(N_{AR})_{f(s)}\right)} \quad (45)$$

where $$f(s) = \left(\frac{r}{M} - \frac{1}{2}, \frac{c}{M} - \frac{1}{2}\right)^T \quad (46)$$

is the spatial frequency and $\Theta_{MA} = \text{col}[\theta_r, r \in N_{MA}]$ $\Theta_{AR} = \text{col}[\phi_r, r \in N_{AR}]$ $C(N.)_{f(s)} = \text{col}[\cos(2\pi f(s)^T r), r \in N.] \quad (47)$ In time-series analysis and signal processing, the successful use of ARMA models for spectral estimation has promoted an interest in the extension of these methods to two dimensions.

As for ARMA models, the 2-D parametric spectrum is proportional to the squared magnitude of the frequency response:

$S(f(s)) = \sigma_\epsilon^2 |\mathcal{H}(f(s))|^2 \quad (48)$ where $\sigma_\epsilon^2$ is the variance of the innovation sequence.

Using this approach, the problem of spectrum estimation becomes one of fitting an appropriate model to the observed data. Mostly, parametric spectral estimation in 2-D has been attempted using unilateral models. This typically leads to directional bias. By using a bilateral model, this particular problem should be solved, provided a practically applicable estimation principle is provided. Our preliminary results show that the MORSE estimation principle is a very useful tool for obtaining parametric spectral estimates without directional bias.

Different approaches have been made in order to obtain estimates for the non-causal SAR model. There have, to the best of our knowledge, been no results regarding estimation of mixed non-causal SARMA models. Even for the pure SAR model the estimation of the parameters is not a simple problem. Below, different estimators for the non-causal SAR model will be illustrated and their shortcomings discussed.

The Non-causal (or bilateral) Simultaneous Auto-Regressions (SAR) models, sometimes referred to as NCSAR, were originally introduced by P. Whittle in "On stationary processes in the plane". Biometrika, 41, 343–449. The problem of non-consistency of the LS estimator is addressed in this paper, and a large sample approach based on spectral methods was presented. First, this method will be of use only for very simple models and secondly, many practical situations involve small samples for which the discounting of edge effects may not be negligible. In order to illustrate how the non-consistency of the LS estimator affects the estimates, a simple experiment is carried out. For an isotropic nearest neighbour model, 100 realizations are generated for different parameters. In each case, the parameters are estimated (as if the model was anisotropic). In FIG. 15, the average of the estimated parameter is plotted versus the 'true' parameter (i.e. the parameter with which the texture was simulated). It is seen that the LS estimator does not provide satisfactory estimates. In fact, the order of magnitude is off by a factor two in many cases.

Kashyap, R. & Chellappa, R. proposed an approximation to the exact (toroidal) ML-estimator in "Estimation and choice of neighbors in spatial interaction models of image", IEEE Transactions on Information Theory, 29(1), 60–72. The approximation is based on a Taylor-series expansion of the determinant of the Jacobian (which becomes block circulant with circulant blocks under the torus assumption). Only first- and second-order parts (in the parameters) are included. The improvement of the results is definitely vast, as shown in FIG. 16 where the above experiment is repeated. Nevertheless, as the bias is very pronounced close to non-stationarity, it is seen that this estimator may not be adequate in many practical situations where the textures tend to lie close to non-stationarity, and it is highly preferred to obtain a more suitable estimator not having these disadvantages.

Grunkin investigated the exact (toroidal) ML-estimator in "On The Analysis of Image Data Using Simultaneous Interaction Models" in IMSOR, ph.d thesis # 67, Institute of Mathematical Statistics and Operations Research, Technical University of Denmark, Lyngby, 223pp. The likelihood function involved is complicated and computationally very expensive. Also, the likelihood function is extremely rippled in the vicinity of non-stationarity as shown in FIG. 17. Whether the non-linear optimization routine is 'caught' in a sub-optimal solution or not is very much dependent upon the initial guess and the parameters of the optimization algorithm (such as, e.g., step length). Thus, it may take several re-estimations to be convinced that the correct solution is found. This, of course, is merely a technical problem, and in the simple experiment described above, these problems can be overcome and the exact (toroidal) ML-estimates yield very good results as shown in FIG. 18.

The MORSE Estimator

As mentioned above, the non-consistency of the LS estimator is leads to non-sensical results. The practical application of the exact toroidal ML estimator will, in many cases, be limited, as the likelihood function tends to be extremely rippled in the vicinity of non-stationarity. Thus, it may require several re-estimations to ensure that the 'true' optimum is found. Also, as pointed out earlier, the ML estimator may overemphasize the high-frequent content of the texture. In addition, the computational load involved in obtaining estimates for mixed SARMA models using the ML estimation principle is prohibitive for all practical purposes.

The approach taken here is to consider the spectral content of the residuals. Finally, it will probably be extremely difficult to obtain ML estimates of mixed non-causal SARMA models.

In this Example, a novel estimator is described that gives very good estimation results, has a response surface that (in our experience) is very well behaved and allows for inference in mixed SARMA models.

As the underlying assumption is that the residuals should be white, i.e. uncorrelated, all frequencies should be represented, with the same weight, in the spectrum of the residual process. If the residual spectrum is normalized, the entropy of the residual spectrum obtains its maximum when the spectrum is as flat as possible. This observation is the basis of the Maximum Of Residual Spectral Entropy (MORSE) estimator.

Consider again the difference equation defining the system:

$$y_s + \sum_{r \in N_{AR}} \phi_r y_{s-r} = \epsilon_s + \sum_{r \in N_{MA}} \theta_r \epsilon_{s-r} \quad (49)$$

The output can be viewed as the convolution of the innovation process with the impulse response of the system. Thus, in the frequency domain, the following representation is found:

$$Y(f(s)) = \mathcal{H}(f(s)) \cdot E(f(s)) \quad (50)$$

where Y(f(s)) is the Fourier transform of the output, E(f(s)) is the Fourier transform of the (non-observable) innovation process and $\mathcal{H}(f(s))$ is the Fourier transform of the impulse response function, which is also known of the frequency response function.

Using equation (50), the power spectrum of the innovation process may be expressed in terms of the power spectrum of the observations and the parametric spectrum (assuming that the parameters are known). Thus it is found that:

$$|E(f(s))|^2 = \frac{|Y(f(s))|^2}{|\mathcal{H}(f(s))|^2} = |Y(f(s))|^2 \frac{(1 + \Theta_{AR}^T \underline{C}(N_{AR})_{f(s)})^2}{(1 + \Theta_{MA}^T \underline{C}(N_{MA})_{f(s)})^2} \quad (51)$$

A normalization function depending upon the observations and the parameters may be defined:

$$N(\underline{y}, \Theta_{AR}, \Theta_{MA}) = \quad (52)$$

$$\sum_{f(s)} |E(f(s))|^2 = \sum_{f(s)} \frac{|Y(f(s))|^2}{|\mathcal{H}(f(s))|^2} = M^2 \sigma_\epsilon^2$$

The parameters are subsequently found by maximizing the entropy of the residual spectrum.

Definition 3

The Maximum Of Residual Spectral Entropy (MORSE) estimates are found by maximizing the entropy function $L(y, \theta_{AR}, \theta_{MA})$ with respect to the parameters $\theta_{AR}$ and $\theta_{MA}$:

$$(\hat{\Theta}_{AR}, \hat{\Theta}_{MA}) = \arg \max_{(\hat{\Theta}_{AR}, \hat{\Theta}_{MA})} L(\underline{y}, \Theta_{AR}, \Theta_{MA}) \quad (53)$$

where $$L(\underline{y}, \Theta_{AR}, \Theta_{MA}) - \sum_{f(s)} \frac{|E(f(s))|^2}{M^2 \sigma_\epsilon^2} \log \frac{|E(f(s))|^2}{M^2 \sigma_\epsilon^2} \quad (54)$$

An estimate of the residual variance is obtained as $$\hat{\sigma}_\epsilon^2 = N(y, \Theta_{AR}, \Theta_{MA})/M^2 \quad (55)$$

Clearly, this function is strongly non-linear in the parameters. The optimization may be carried out using, e.g., a Quasi-Newton method. In this work, the IMSL implementation of the BFGS method is applied.

Experimental Results

As illustrated above, the exact (torus-)ML-estimates give very good results. The problem here is of a more technical nature. Firstly, the involved likelihood function (or objective functional) is extremely complicated and computationally expensive to evaluate. Secondly, the likelihood function is very rippled in the vicinity of non-stationarity. Consequently any optimization-routine might easily 'get caught' in a sub-optimal solution.

Above, important problems as centrality, consistency, efficiency of the proposed estimator have not been addressed.

Obviously, questions as these are difficult to answer analytically due to the untractable form of the involved expressions. Below, these questions will be addressed empirically through simulation and estimation experiments.

Estimation of Pure SAR Models

In FIG. 19, the objective functional of the MORSE estimator is shown in the same region as the ML-estimator. It is clear that the objective functional of the MORSE estimator is much smoother—i.e. there are no ripples. It is our experience that the objective functional of the MORSE estimator never exhibits ripples in parameter space—not even outside the admissible region. This makes the non-linear optimization a rather straight-forward task that can be undertaken automatically by most standard software packages.

The experiment carried out for the various estimators above in connection with FIG. 17 is also carried out for the MORSE estimator. The results are shown in FIGS. 20A and 20B and it is seen that the results are very acceptable. Note that the variance decreases as non-stationarity is approached. This is due to the fact that the poles in the transfer function are approached. Such poles (or near-poles) create sharp peaks in the objective functional and thereby a much smaller variance.

Estimation of Mixed SARMA Models

A major advantage of this approach is that an estimator for mixed SARMA models is obtained 'for free'. In order to illustrate that good results are obtained for the mixed SARMA models as well, the following experiment is conducted. A set of parameters are chosen for a SARMA(E (1.0),E(1,o)) model. Furthermore, these parameters are chosen not too far away from non-stationarity so that strong positive spatial auto-covariances are obtained. Now 100 simulations are carried out and the histogram of each parameter is plotted with the 'true' parameter marked as shown in FIGS. 20A and 20B.

Another test is one where 1000 realizations of size 64×64 pixels and 1000 realizations of size 128×128 pixels are generated—also not too far from non-stationarity. For each of these realizations, the MORSE estimator was used to obtain an estimate of the model parameters. The empirical 95%-confidence intervals are calculated for the mean of each parameter. In FIGS. 24A–24E, it is seen that the known values of the parameters fall nicely within these confidence intervals further indicating that the estimator is central. It should also be noted that the width of the confidence intervals decrease as the size of the synthesized texture samples increase. This indicates that the estimator is consistent.

Thus, it is seen that very satisfactory results are obtained also for the mixed non-causal SARMA model.

Distributional Properties of the Estimator

It might intuitively be expected that the distribution of the estimated parameters be Gaussian if the driving noise was Gaussian. As this is hard to prove formally, this is made probable through experiments. Histograms of the parameters, estimated from the 1000 128×128 simulated textures described above, are shown in FIGS. 25A–25D. The hypothesis that the shown histograms represent samples of Gaussian estimates will now be formally tested using the $\chi^2$ test. For each parameter, the estimates are divided into K classes, where K is selected as K=1+3.3$\log_{10}$(N) (where N is the number of observations). In order to make the test as strong as possible, the classes are selected such that the expected number of observations is equal in each class. This is done by generating the splits as the (i·100/k)%-quantile (i=1, ... ,K-1). The test statistic is now computed as:

$$Z = \sum_{i=1}^{K} \frac{\left(Obs_i - \frac{N}{K}\right)^2}{\frac{N}{K}} \quad (56)$$

Where $Obs_i$ is the number of observations in the i'th class. This test statistic is distributed as $X^2$(K−3) (since both mean and standard deviation should be estimated). The tests are summarized in the below table, where it is seen that the distributional hypothesis is easily accepted for all parameters.

| $\tau_i \in N$ | $\theta_i$ | mean of $\theta_i$ | sdev of $\theta_i$ | Z | P{Z > $\chi^2$(8)} |
|---|---|---|---|---|---|
| AR(−1,0) | −0.22314 | −0.22308 | 0.00757 | 5.44 | 0.709 |
| AR(0,−1) | −0.12118 | −0.12126 | 0.00808 | 6.94 | 0.543 |
| MA(−1,0) | 0.11535 | 0.11521 | 0.00772 | 7.512 | 0.483 |
| MA(0,−1) | 0.24066 | 0.24083 | 0.00759 | 6.038 | 0.643 |

Conclusion

The principle on which this estimator lies is intuitively very appealing. The empirical results obtained for this estimator is, indeed, very promising. Using this estimator, also non-causal SARMA models may be considered.

EXAMPLE 4

Test of the Presently Preferred Method

In the present example, a test was performed in order to evaluate the applicability of the present method in the prediction of bone strength on the basis of X-ray pictures of the bone.

Data Set

The data set consisted of 20 samples of the third lumbar vertebrae harvested from cadaveric specimens each of which were exposed to X-ray irradiation in order to obtain an X-ray picture and a BMD measurement of each bone.

Subsequently, an anterior and a posterior core sample of trabecular bone was extracted from each bone, and the optimal fracture load was determined for each of these samples using a three-point test setup as known per se.

The X-ray pictures were scanned with a spatial resolution of 600 lines per cm. In the final resolution, an area is selected centrally positioned between the positions of the drilled-out samples. The positions of the core samples may be partly or fully comprised in the selected area.

It was decided to choose the mean optimal fracture load of the two core samples of a bone as the strength of the bone. This largely corresponds to the strength of the bone in the central part as determined by linear interpolation of the strengths of the two samples. The results of the present test seems to confirm that this decision is reasonable.

Pre-processing of the Image Material

In order to have as good images as possible in the final, much smaller resolution, the scanned X-ray images had a large spatial resolution (600 lines per centimeter).

The present images were so large that a scale reduction using a Burt-Adelson Gaussian pyramid was impossible due to the computer having too little memory. Thus, as a preliminary reduction was performed by firstly smoothing the image using a 3×3 mean filter and subsequently discarding every other pixel in the image.

After this preliminary reduction, the image had a size reducible by the Burt-Adelson Gaussian pyramid to obtain the final resolution (150 lines per centimeter).

Subsequent to the reduction of the image, the image was background corrected by subtracting a 31×31 median filtered version of itself.

From the corrected image, a Region Of Interest (ROI) having a size of 256×256 pixels was selected. Preferably, this ROI was selected close to the center of the bone due to the fact that a large gradient of the thickness of the trabeculae was present close to the anterior and posterior ends of the bone. This effect and the fact that the bone is rounded towards its ends created a number of non-linear effects in the image dynamics which cannot be dealt with in a trivial manner.

Having extracted the Region Of Interest, the image was filtered in order to remove high frequency noise. As the signal-to-noise relation of the present image was very high, the high frequency noise may be removed in a "gentle" manner:

fourtr>fft.$$

htof -CR M <fft.$$ | powerpix -p 1.8>mag.-$$

htof -CR P<fft.$$>pha.$$

combine -pm pha.$$<mag.$$ | inv.fourtr | htof -CR R | scale rm *.$$

This manner is an alternative to the method of algorithm 1 on pages 27 and 28, as, in this method, T=2 and p=1.8.

From this pre-processed image, the Projected Trabecular Pattern (PTP) is extracted in the manner described above in connection with Algorithm 2. Substantially all features described in Example 1 were calculated.

Statistical Methods

It was attempted to construct a General Linear Model for predicting the ultimate strength. In this connection, it is imperative to identify the important parameters and eliminate the unimportant ones. As there are a large number of variables and as only a small number of observations were evaluated, it was not possible to directly use a Backwards Elimination method as $(X_T X)$ typically will be singular in this situation. In addition, there is also the risk of eliminating the wrong variables. Therefore, in the following a method is used which resembles a Forward Elimination method performed as follows:

1. Search through the list of possible features until the first significant feature is identified.
2. Continue the search until another significant feature is identified and included in the model.
3. Test whether previous features should be eliminated.

Steps 2. and 3. are repeated until all features have been investigated. Naturally, a level of significance should be decided for the described tests. In the present investigation, this level is chosen at p=0.10, as the amount of data does not make a very conservative test possible.

It became clear that the optimal fracture load related exponentially to the parameters of the model, whereby the model was performed as a regression with the logarithm to the optimal fracture load as a dependent variable.

Choosing the parameters according to the above principle, only three significant parameters were found: â (See Algorithm 4), Formula (23) squared, and $\mu_s^2$ (See Formula (3)).

In the following, these parameters are evaluated in two models, one using age as a variable and one not using age.

Modeling Without Age

A General Linear Model not using age as a descriptive variable was made. This model will, thus, seek to predict the optimal fracture load on the basis of the extracted structural indices. The result is summarized in the below program printout:

| Residuals: Min | 1Q | Median | 3Q | Max |
|---|---|---|---|---|
| −0.4327 | −0.2409 | 0.03446 | 0.1625 | 0.5578 |

| Coefficients: | Value | Std. Error | t value | Pr(>\|t\|) |
|---|---|---|---|---|
| (Intercept) | 11.2930 | 1.8815 | 6.0020 | 0.0000 |
| â | −70.8473 | 21.1912 | −3.3432 | 0.0044 |
| $\mu_s^2$ | −0.0287 | 0.0037 | −7.8621 | 0.0000 |
| (Formula 23)$^2$ | 143625.7515 | 53274.0853 | 2.6960 | 0.0166 |

Residual standard error: 0.2901 on 15 degrees of freedom
Multiple R-Squared: 0.8158F-statistc: 22.14 on 3 and 15 degrees of freedom, the p-value is 9.17e-06

| Correlation of Coefficients: | (Intercept) | â | $\mu_s^2$ |
|---|---|---|---|
| â | −0.9873 | | |
| $\mu_s^2$ | −0.5412 | 0.4485 | |
| (Formula 23)$^2$ | 0.4347 | −0.5455 | −0.1318 |

Explaining model:
$$F_{av}^{max} = \exp(-70.8473 \cdot (\text{Formula23})^2 - 0.0287 \cdot \hat{a} + 143625.7515 \cdot \mu_s^2 + 11.2930) \quad (57)$$

| No. | log (Msrd) | log (Predicted) | Residual |
|---|---|---|---|
| 238 | 4.574778 | 4.302492 | 0.272286112 |
| 240 | 4.259244 | 4.168912 | 0.090332350 |
| 242 | 4.516842 | 4.742086 | −0.225244419 |
| 247 | 4.677491 | 4.800312 | −0.122820941 |
| 250 | 3.508197 | 3.473737 | 0.034459077 |
| 254 | 4.070737 | 4.402031 | −0.331293705 |
| 258 | 2.501764 | 2.864725 | −0.362961146 |
| 259 | 3.724428 | 3.682320 | 0.042107301 |
| 265 | 4.443404 | 3.885623 | 0.557781393 |
| 267 | 5.382806 | 5.098572 | 0.284233332 |
| 269 | 4.099266 | 3.949321 | 0.149945096 |
| 279 | 4.434097 | 4.125558 | 0.308539021 |
| 280 | 3.844675 | 4.277384 | −0.432709063 |
| 281 | 3.372283 | 3.310585 | 0.061698025 |
| 289 | 3.823039 | 3.808975 | 0.014063294 |
| 293 | 3.779999 | 3.604959 | 0.175040294 |
| 296 | 3.527713 | 3.784313 | −0.256600239 |
| 298 | 3.896777 | 3.886981 | 0.009796051 |
| 313 | 4.397531 | 4.666183 | −0.268651834 |

In FIG. 26 a plot of the logarithmic optimal fracture load against the predicted strength is illustrated. In this figure, the measurement points are represented by their number in the database.

At this point it is, naturally, interesting to know whether the BMD measurements performed on all samples may take part as a statistically significant feature contributing to increasing the multiple R-squared. The result may be seen from the below printout

| Residuals: Min | 1Q | Median | 3Q | Max |
|---|---|---|---|---|
| −0.4342 | −0.2389 | 0.0385 | 0.1615 | 0.5598 |

| Coefficients: | Value | Std. Error | t value | Pr(>\|t\|) |
|---|---|---|---|---|
| (Intercept) | 11.3316 | 2.2940 | 4.9397 | 0.0002 |
| â | −71.1532 | 23.9423 | −2.9719 | 0.0101 |
| $\mu_s^2$ | −0.0288 | 0.0044 | −6.5255 | 0.0000 |
| Formula 23 squared | 144161.1908 | 57644.4790 | 2.5009 | 0.0254 |
| BMD | −0.0190 | 0.5953 | −0.0319 | 0.9750 |

Residual standard error: 0.3002 on 14 degrees of freedom
Multiple R-Squared: 0.8158F-statistic: 15.5 on 4 and 14 degrees of freedom, the p-value is 8.43e-05

| Correlation of Coefficients: | (Intercept) | â | $\mu_s^2$ | Formula 23 squared |
|---|---|---|---|---|
| â | −0.9798 | | | |
| $\mu_s^2$ | −0.6661 | 0.5587 | | |
| Formula 23 squared | 0.5070 | −0.5949 | −0.2583 | |
| BMD | −0.5285 | 0.4009 | 0.5154 | −0.2914 |

It is obvious that BMD is not a significant feature and that it can be eliminated from the model. Using BMD as the only descriptive parameter, a multiple R-squared of $R^2=0.2142$ is obtained indicating that BMD is a poor indicator of the quality of trabecular bone. Thus, the aspects of fracture risk relating to trabecular bone are poorly described by BMD.

Modelling with age

Using age as a describing parameter, the following model is obtained:

| Residuals: Min | 1Q | Median | 3Q | Max |
|---|---|---|---|---|
| −0.3777 | −0.1385 | 0.02544 | 0.1517 | 0.328 |

| Coefficients: | Value | Std. Error | t value | Pr(>\|t\|) |
|---|---|---|---|---|
| (Intercept) | 11.8882 | 1.6616 | 7.1545 | 0.0000 |
| â | −68.3085 | 18.5326 | −3.6858 | 0.0024 |
| $\mu_s^2$ | −0.0236 | 0.0039 | −6.1152 | 0.0000 |
| Formula 23 squared | 152951.1278 | 46677.8586 | 3.2767 | 0.0055 |
| AGE | −0.0160 | 0.0067 | −2.3827 | 0.0319 |

Residual standard error: 0.2533 on 14 degrees of freedom
Multiple R-Squared: 0.8689F-statistic: 23.2 on 4 and 14 degrees of freedom, the p-valve is 4.707e-06

| Correlation of Coefficients: | (Intercept) | â | $\mu_s^2$ | Formula 23 squared |
|---|---|---|---|---|
| â | −0.9658 | | | |
| $\mu_s^2$ | −0.3585 | 0.4028 | | |
| Formula 23 squared | 0.4408 | −0.5378 | −0.0617 | |
| AGE | −0.1503 | −0.0575 | −0.5613 | −0.0838 |

-continued

Explaining model:
$F_{av}^{max} = \exp(-68.3085 \cdot (\text{Formula23})^2 - 0.0236 \cdot \hat{a} + 152951.1278 \cdot \mu_s^2 - 0.016 \cdot \text{AGE} + 11.8882)$ (58)

| No. | log (Msrd) | log (Predicted) | Residual |
|-----|------------|-----------------|----------|
| 238 | 4.574778 | 4.293879 | 0.280898703 |
| 240 | 4.259244 | 4.262127 | −0.002882869 |
| 242 | 4.516842 | 4.505306 | 0.011535494 |
| 247 | 4.677491 | 4.766867 | −0.089375665 |
| 250 | 3.508197 | 3.413527 | 0.094669315 |
| 254 | 4.070737 | 4.435918 | −0.365180333 |
| 258 | 2.501764 | 2.852028 | −0.350263751 |
| 259 | 3.724428 | 3.625144 | 0.099283320 |
| 265 | 4.443404 | 4.238432 | 0.204971765 |
| 267 | 5.382806 | 5.273592 | 0.109213882 |
| 269 | 4.099266 | 3.964857 | 0.134408820 |
| 279 | 4.434097 | 4.106100 | 0.327997388 |
| 280 | 3.844675 | 4.032239 | −0.187563938 |
| 281 | 3.372283 | 3.394572 | −0.022288673 |
| 289 | 3.823039 | 3.797599 | 0.025439956 |
| 293 | 3.779999 | 3.610914 | 0.169084738 |
| 296 | 3.527713 | 3.829923 | −0.302210802 |
| 298 | 3.896777 | 3.656788 | 0.239989248 |
| 313 | 4.397531 | 4.775257 | −0.377726598 |

In FIG. 27 a plot of the logarithmic optimal fracture load against the predicted strength is illustrated. In this figure, the measurement points are represented by their number in the database.

Discussion

From the result of the present example, it is clear that the optimal fracture load of trabecular bone may be predicted using only textural parameters—and even with a high precision. Three image features are used: Formula 23 squared, $\mu_S^2$, and $\hat{a}$ describing the density of the horizontal trabeculae (the thickest), the break down of the trabecular structure, and the global trabecular density, respectively. In addition, it is seen that neither sex nor BMD can add information to the description obtained using the above three image features.

However, it is seen that age is a significant parameter. Including age in the model increases the multiple R-squared to $R^2=0.8689$. It should be noted that the two extreme observations (258 and 267) contribute quite a lot to the value of $R^2$. Omitting these observations gives $R^2=0.7538$, including age, which should still be regarded as a high multiple R-squared.

However, as is described in connection with Algorithm 1, the parameters used in restoring the image will a large effect on the applicability of the features extracted from the resulting image. In fact, using p=1.4 and T=4 instead of p=T=2 in algorithm 1, the feature $\sigma_M$ alone gives a $R^2$ of 0.92.

In FIG. 28, the correlation between $\sigma_M$ and the logarithm to the optimal fracture load is illustrated for a test based on the picture and optimal fracture load—material described above. Even if the extreme point in the lower right corner of the figure is removed, a correlation of 0.88 is obtained.

Thus, a very large difference may be seen depending on the actual manner of obtaining the PTP of the image.

We claim:

1. A method for estimating the bone quality of a vertebrate, on the basis of two-dimensional image data including information relating to the trabecular structure of at least a part of a bone of the vertebrate, the image data being data obtained by exposing at least the part of the bone to electromagnetic radiation, the method including subjecting the image data to a statistical analysis comprising the steps of:

a background correction procedure including at least reducing or optionally removing low frequency information having a frequency significantly lower than the spacing of the projected trabeculae, an image manipulation and feature extraction procedure wherein at least the local image intensity information as well as variation in the local intensity are utilized to extract information related to the trabecular structure of the part of the bone, the image manipulation and feature extraction procedure including subjecting the image data to at least one of the following procedures:

(a) obtaining a parametric estimate of the power spectrum of the image data and extracting features relating to the energy distribution of the parametric estimate, (b) obtaining an estimate of the projected trabecular pattern of the image data by using a Fourier method including subjecting the image data to Fourier transformation, performing a subsequent mathematical transformation of the Fourier transformed data, and converting the transformed data back into the spatial domain, to give prominence to the prevailing information in the image data relating to the trabecular structure, subjecting the information being given prevalence to in the image data relating to the trabecular structure to a grey-scale morphological operation, and performing an operation including a measure for each background pixel based upon determining the distance from the background pixel in a number of given directions in the image data to the nearest foreground pixel and extracting at least one feature relating to the trabecular structure of the estimated projected trabecular pattern from the result of the operation, and an estimation procedure in which the bone quality of the vertebrate is estimated on the basis of the derived features and optionally other features related to the bone or the vertebrate and a predetermined relationship between the features and reference bone quality parameters.

2. A method according to claim 1, wherein the electromagnetic radiation is X-ray radiation.

3. A method according to claim 1, wherein the image data is scanned from an X-ray film and wherein the resolution of the X-ray film preferably is at least 4 pairs of lines per centimeter.

4. A method according to claim 3, wherein the scanning has been performed at a resolution of at least 10 lines per cm.

5. A method according to claim 1, wherein the background correction procedure includes at least reducing or optionally removing low frequency information having a frequency significantly lower than the spacing of the projected trabeculae.

6. A method according to claim 5, wherein information having frequencies half or less than the spacing of the projected trabeculae is at least reduced or optionally removed.

7. A method according to claim 5, wherein the background correction procedure includes generating secondary image data as a result of performing a median filtering with a predetermined kernel size and subtracting this result from the original image data, the kernel size preferably being at the most ½ of the image data.

8. A method according to claim 5, wherein the background correction procedure includes generating secondary image data as a result of performing a mean filtering with a predetermined kernel size and subtracting the result from the original image data, the kernel size preferably being at the most ½ of the image data.

9. A method according to claim 5, wherein the background correction procedure includes globally fitting a two-dimensional polynomial to the image data and generating background corrected image data on the basis of the residuals of the fitting procedure, the order of the polynomial preferably being at most 15.

10. A method according to claim 1, wherein the parametric estimate of the power spectrum is estimated by using a method selected from the group consisting of direct methods, auto-covariance methods and parametric methods.

11. A method according to claim 10, wherein the image data, optionally weighted with a window, is subjected to a Fast Fourier Transformation in order to generate the parametric estimate.

12. A method according to claim 10, wherein the auto-covariance function estimated on the basis of the image data, optionally weighted with a window, is subjected to a Fast Fourier Transformation in order to generate the parametric estimate.

13. A method according to claim 10, wherein one of the methods on the basis of which the parametric estimate is obtained is chosen from the group consisting of: causal Simultaneous Auto-Regressive Moving Average (SARMA) models, non-causal SARMA models, Gaussian Markov Random Field models and Maximum Entropy Spectral Estimates and wherein the order of the model is identified, the parameters of the model are estimated and the spectrum of the estimated model is generated.

14. A method according to claim 13, wherein the method on the basis of which the parametric estimate is obtained, is a non-causal SARMA model, the method for estimating Non-Causal Simultaneous Auto-Regressive Moving Average models in two or more dimensions including optimizing a given direct measure of the flatness of the residual spectrum of the model.

15. A method according to claim 1, wherein at least one feature is related to parameters of a contour encompassing at least a predetermined percentage of the energy of the parametric estimate of the power spectrum.

16. A method according to claim 15, wherein the contour is determined by
(a) defining a contour, in terms of one axis in each dimension, around the center of the parametric estimate of the power spectrum, all points on the contour having substantially the same distance to the center of the power spectrum, and the contour encompassing less than the predetermined percentage of the energy of the parametric estimate of the power spectrum,
(b) for each dimension of the data calculating the percentage of the energy of the parametric estimate of the power spectrum encompassed by a dilated contour in which the axis in the dimension in question is increased by a predetermined distance,
(c) increasing the axis of the contour, in the dimension in which the increase in energy encompassed by the dilated contour is the largest, by the predetermined distance and
(d) repeating steps (b) and (c) until the percentage encompassed by the contour exceeds or equals the predetermined percentage.

17. A method according to claim 15, wherein the contour is ellipsoidal, or optionally spherical.

18. A method according to claim 16, wherein the axes of the contour are orthogonal and are defined along principal directions of the parametric estimate of the power spectrum.

19. A method according to claim 1, wherein procedure (b) is used and wherein the subsequent mathematical transformation is linear or non-linear.

20. A method according to claim 19, wherein the subsequent mathematical transformation is performed by raising the data to a power larger than 1.

21. A method according to claim 1, wherein procedure (b) is used and wherein a third mathematical transformation is performed in order to preserve only part of the magnitude information of the transformed data.

22. A method according to claim 1 wherein procedure (b) is used and wherein the grey-scale morphological operation is a top-hat operation wherein all pixels fitting in the top-hat are assigned a value different from a specified background pixel value.

23. A method according to claim 22, wherein the image data which has been subjected to the top-hat operation is thresholded so as to assign a foreground pixel value to the pixels having a pixel value different from the background pixel value.

24. A method according to claim 1, wherein procedure (b) is used and wherein the image data which has been subjected to the grey-scale morphological operation is subjected to further noise reduction to substantially remove isolated single pixels and pixel groups smaller than a predetermined threshold number of pixels having a pixel value different from the background pixel value.

25. A method according to claim 1, wherein procedure (b) is used and wherein an operation is performed comprising determining, for each background pixel, the distance according to a given metric from the background pixel to the nearest foreground pixel, and herein at least one feature is extracted from the result of the operation.

26. A method according to claim 25, wherein at least one feature relates to a mean value and/or standard deviation and/or the coefficient of variation and/or skewness and/or kurtosis of the determined distances from all background pixels to the nearest foreground pixel.

27. A method according to claim 1, wherein procedure (b) is used and wherein at least one feature relates to a mean value and/or standard deviation and/or the coefficient of variation and/or skewness and/or kurtosis of the determined measures for all background pixels.

28. A method according to claim 1, wherein procedure (b) is used and wherein the measure for each background pixel is a mean value and/or standard deviation and/or the coefficient of variation and/or skewness and/or kurtosis and/or maximum distance of the determined distances in the given directions.

29. A method according to claim 1, wherein at least one feature related to the bone or to the vertebrate, such as age and/or sex, and/or species, and/or race and/or the specific bone considered in the vertebrate, and/or an estimated bone mineral density of the bone, and/or an estimated bone mineral content of the bone, is included in the estimation procedure.

30. A method according to claim 29, wherein the bone mineral density is estimated by including data from a reference object in the exposure of the bone to the electromagnetic radiation and where the bone mineral density is estimated by correlating the absorption of the electromagnetic radiation of the bone and of the reference object.

31. A method according to claim 1, wherein the estimation procedure is based on a statistical model, taking into account the correlation structure in the data set, so as to assign appropriate weights to the significant features in accordance with the predetermined relationship.

32. A method according to claim 1, wherein the reference bone quality is an absolute or relative bone quality of bones for which image data have been processed in accordance with claim 1.

33. A method according to claim 32, wherein the reference bone quality is determined on the basis of measurement of the mechanical bone strength, and/or bone mineral density measurement, and/or on the basis of a bone mineral content measurement, and/or on the basis of a score of the bone strength by a skilled radiologist.

34. A method according to claim 1, wherein the predetermined relationship between the features and reference bone quality parameters is established on the basis of reference bone quality parameters and features extracted according to claim 1.

35. A method according to claim 34, wherein the predetermined relationship is defined in terms of a model taken from the group consisting of: a general linear model, a generalized linear model, an artificial neural network, a causal probabilistic net and classification and regression trees.

36. A method according to claim 1, wherein the image manipulation and feature extraction procedure further includes subjecting the image data to the procedure of obtaining, on the basis of image data on which a Fourier method has been used to give prominence to the prevailing information in the image data relating to the trabecular structure, an estimate of a grey-level co-occurrence matrix and extracting at least one feature on the basis of the estimated co-occurrence matrix.

37. A method according to claim 1, wherein the image manipulation and feature extraction procedure further includes subjecting the image data to the procedure of obtaining, on the basis of a frequency analysis of the parametric estimate of the power spectrum of the image data, features relating to the periodicity of the trabecular structure of the part of the bone.

38. A method according to claim 1, wherein the vertebrate is a human, a horse, a large ape, a great ape, an anthropoid ape, a pig or a cow and wherein the bone is taken from the group consisting of radius, femur, corpus vertebrae (L1, L2, L3, L4, L5, T1, T2, T3, T4, T5, T6, T7, T8, T9, T10, T11, T12, C1, C2, C3, C4, C5, C6, C7), calcaneus, talus, os carpi, metatars, metacarpi, falanges, tibia, fibula, patella, ulna, humerus, mandible, clavicula, scapula, os coxae, os naviculare, os cuboideum, os cuneiform I, os cuneiform II, os cuneiform III, os sacrum, os coccygis.

39. A method according to claim 1, wherein the bone quality of the vertebrate is estimated with a Multiple Correlation Coefficient better than 0.50.

40. A method according to claim 14, wherein the optimization of the given flatness measure is obtained by
   (a) generating a set of initial parameters for the model,
   (b) generating the residual spectrum of the model on the basis of the parameters,
   (c) obtaining the measure of the flatness of the residual spectrum,
   (d) obtaining a new iterate of the parameters on the basis of the flatness measure and a search direction in parameter space,
   (e) repeating steps (b)–(d) until given stop criterion is reached.

41. A method according to claim 14, wherein the measure of flatness of the residual spectrum is obtained as the entropy of the normalized residual power spectrum, disregarding the DC value.

* * * * *

UNITED STATES PATENT AND TRADEMARK OFFICE
CERTIFICATE OF CORRECTION

PATENT NO : 5,915,036
DATED : June 22, 1999
INVENTOR(S): Michael GRUNKIN et al.

It is certified that error appears in the above-identified patent and that said Letters Patent is hereby corrected as shown below:

Column 36, line 27 (Claim 1), after "including" insert --determining--; and line 34, after "and" insert a new paragraph.

Signed and Sealed this

Eighteenth Day of April, 2000

Attest:

Q. TODD DICKINSON

*Attesting Officer*              *Director of Patents and Trademarks*